(12) United States Patent
Hirayama et al.

(10) Patent No.: US 12,103,322 B2
(45) Date of Patent: Oct. 1, 2024

(54) METHOD AND SYSTEM FOR MANUFACTURING CONTAINER PRODUCT

(71) Applicants: Rie Hirayama, Kanagawa (JP); Kazuhiro Fujita, Tokyo (JP); Teruhiro Tadokoro, Tokyo (JP); Keiichi Serizawa, Kanagawa (JP)

(72) Inventors: Rie Hirayama, Kanagawa (JP); Kazuhiro Fujita, Tokyo (JP); Teruhiro Tadokoro, Tokyo (JP); Keiichi Serizawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 198 days.

(21) Appl. No.: 17/488,476

(22) Filed: Sep. 29, 2021

(65) Prior Publication Data

US 2022/0097414 A1 Mar. 31, 2022

(30) Foreign Application Priority Data

Sep. 30, 2020 (JP) .................. 2020-164950
May 31, 2021 (JP) .................. 2021-091311
Sep. 14, 2021 (JP) .................. 2021-149196

(51) Int. Cl.
   *B41J 3/407*     (2006.01)
   *B41J 2/44*      (2006.01)
   *B67C 7/00*      (2006.01)
(52) U.S. Cl.
   CPC .......... *B41J 3/40733* (2020.08); *B41J 2/442* (2013.01); *B67C 7/00* (2013.01)

(58) Field of Classification Search
   CPC ........ B41J 2/142; B41J 3/40733; B41J 2/442; B67C 7/00; B65B 63/005; B65H 63/005
   See application file for complete search history.

(56) References Cited

U.S. PATENT DOCUMENTS

| | | | |
|---|---|---|---|
| 237,664 | A | 8/1881 | Ives |
| 245,501 | A | 8/1881 | Ives |
| 6,544,473 | B1 | 4/2003 | Kenichi et al. |
| 9,950,824 | B2 | 4/2018 | Miyahara et al. |
| 10,150,628 | B2 | 12/2018 | Wolf |
| 2004/0208781 | A1 | 10/2004 | Hayashi et al. |

(Continued)

FOREIGN PATENT DOCUMENTS

| | | |
|---|---|---|
| CA | 3033404 A1 | 8/2020 |
| DE | 22244 C | 5/1882 |

(Continued)

OTHER PUBLICATIONS

Partial European Search Report issued Feb. 16, 2022 in European Application No. 21199421.5.

(Continued)

*Primary Examiner* — Jennifer Bahls
(74) *Attorney, Agent, or Firm* — XSENSUS LLP

(57) ABSTRACT

A method for manufacturing a container product is disclosed. The method includes filling a container with contents; forming information on the container, the information including a number, a letter, and an image, the information being formed by a first pattern, the first pattern being made up of a collection of second patterns; and heating or cooling the container before or after the forming of the information on the container.

21 Claims, 38 Drawing Sheets

(56) References Cited

U.S. PATENT DOCUMENTS

| | | |
|---|---|---|
| 2007/0157559 A1 | 7/2007 | Till |
| 2013/0160405 A1 | 6/2013 | Preckel et al. |
| 2015/0235233 A1 | 8/2015 | Dangmann et al. |
| 2019/0256336 A1 | 8/2019 | Takaku et al. |

FOREIGN PATENT DOCUMENTS

| | | | | |
|---|---|---|---|---|
| DE | 10 2006 001223 A1 | | 7/2007 | |
| DE | 10 2009 058222 A1 | | 6/2011 | |
| EP | 0993964 A2 | | 4/2000 | |
| EP | 2 698 256 A1 | | 2/2014 | |
| GB | 2507810 A | * | 5/2014 | ........... B65D 17/163 |
| JP | 2006-124038 A | | 5/2006 | |
| JP | 2011-011819 | | 1/2011 | |
| JP | 2012061495 A | * | 3/2012 | |
| WO | WO-2007003002 A1 | * | 1/2007 | ............. G06Q 30/02 |
| WO | 2011/072763 A1 | | 6/2011 | |
| WO | WO-2012172516 A1 | * | 12/2012 | ........... B65B 61/025 |
| WO | WO-2012174545 A1 | * | 12/2012 | ......... B23K 26/0006 |
| WO | 2019/098957 A2 | | 5/2019 | |
| WO | WO-2019246342 A1 | * | 12/2019 | ........... B23K 26/359 |

OTHER PUBLICATIONS

Extended European search report issued on May 27, 2022, in corresponding European patent Application No. 21199421.5, 28 pages.

* cited by examiner

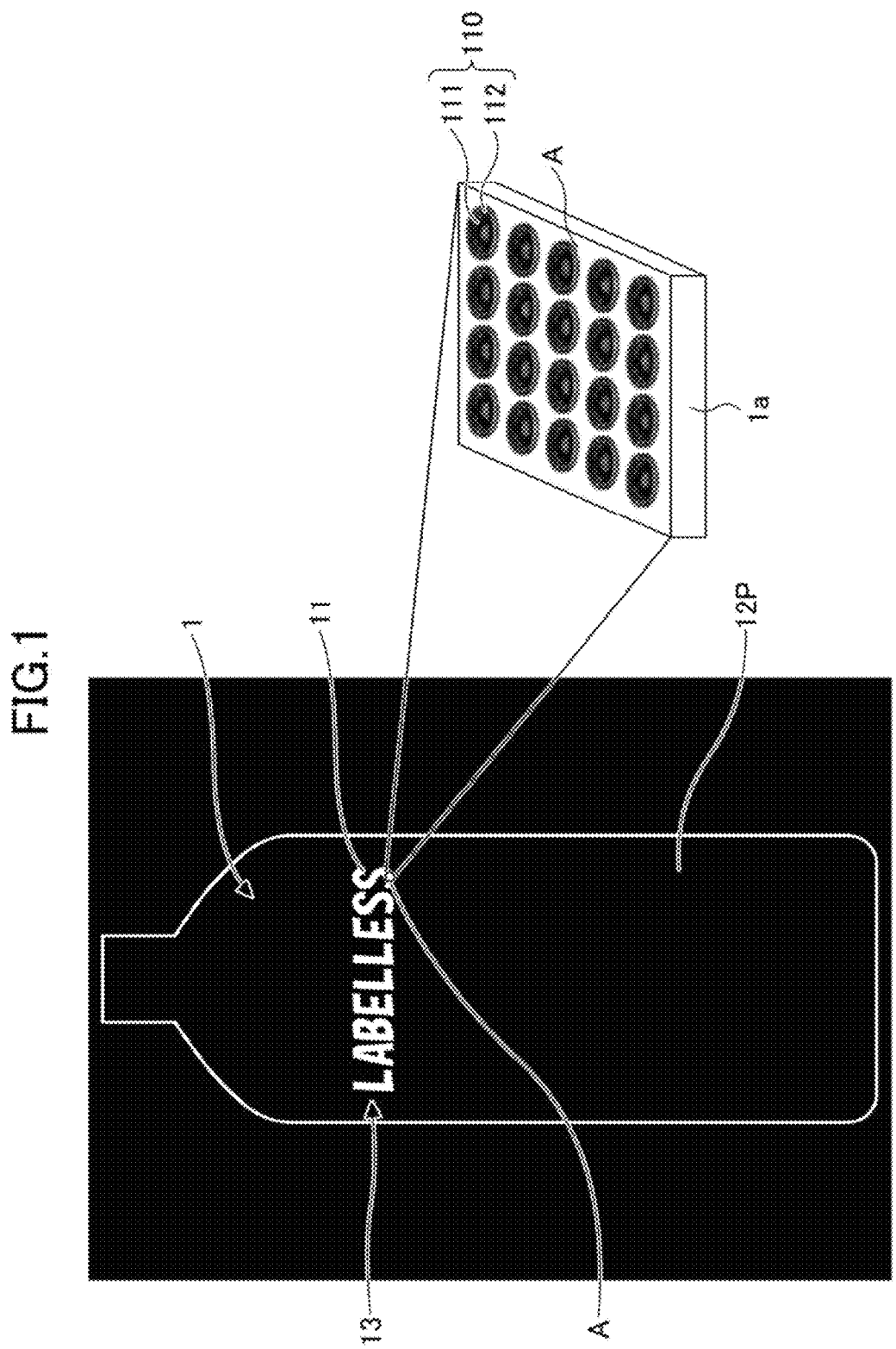

| IDENTIFICATION INFORMATION | TYPE | FILE NAME |
|---|---|---|
| 1 | LETTER | Para1 |
| 2 | BARCODE | Para2 |
| 3 | QR CODE (REGISTERED TRADEMARK) | Para3 |
| 4 | SHAPE | Para4 |
| 5 | PHOTO | Para5 |

| ITEM | PARAMETER |
|---|---|
| TYPE OF SECOND PATTERN | STRAIGHT LINE |
| PERIODICITY | PRESENT |
| INTERVAL | 70 μm |
| THICKNESS (PROCESSING WIDTH) | 50 μm |
| PROCESSING DEPTH | 10 μm |

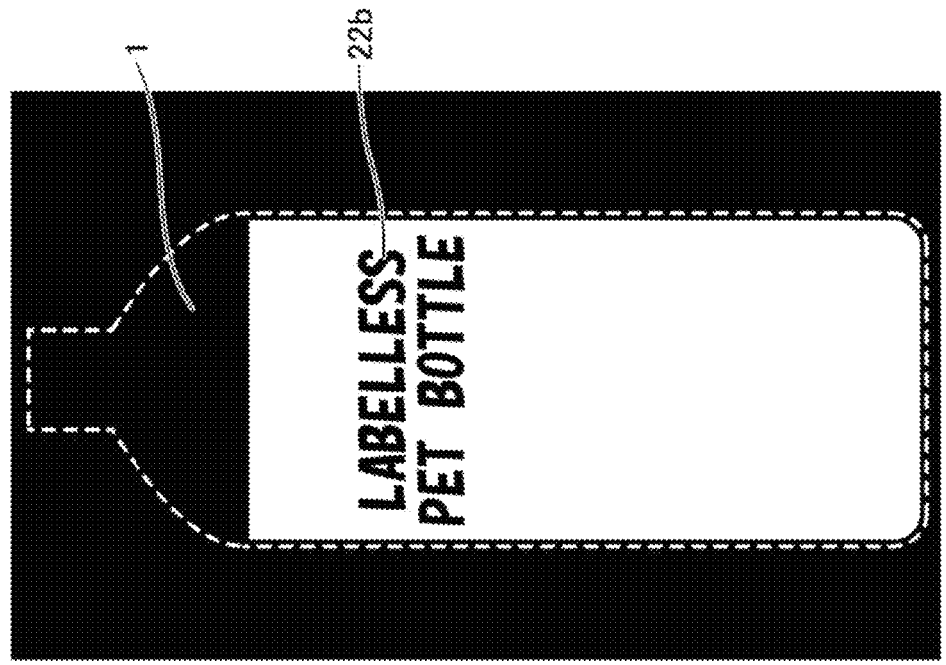
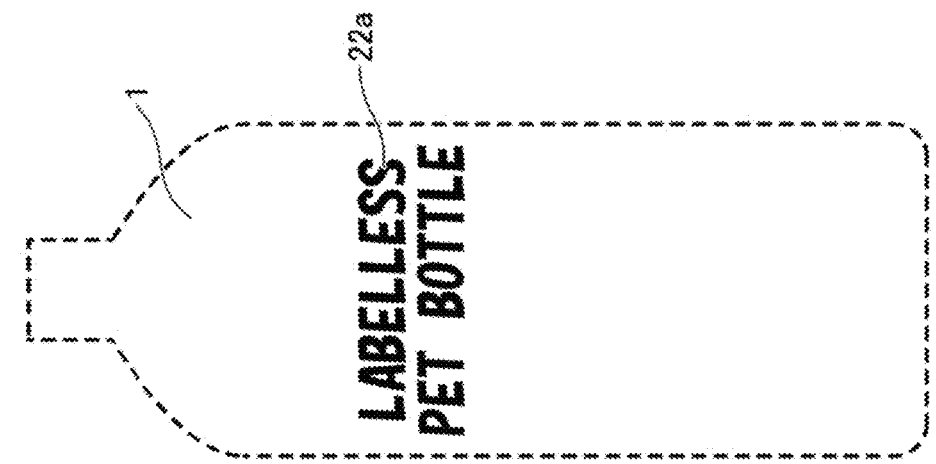

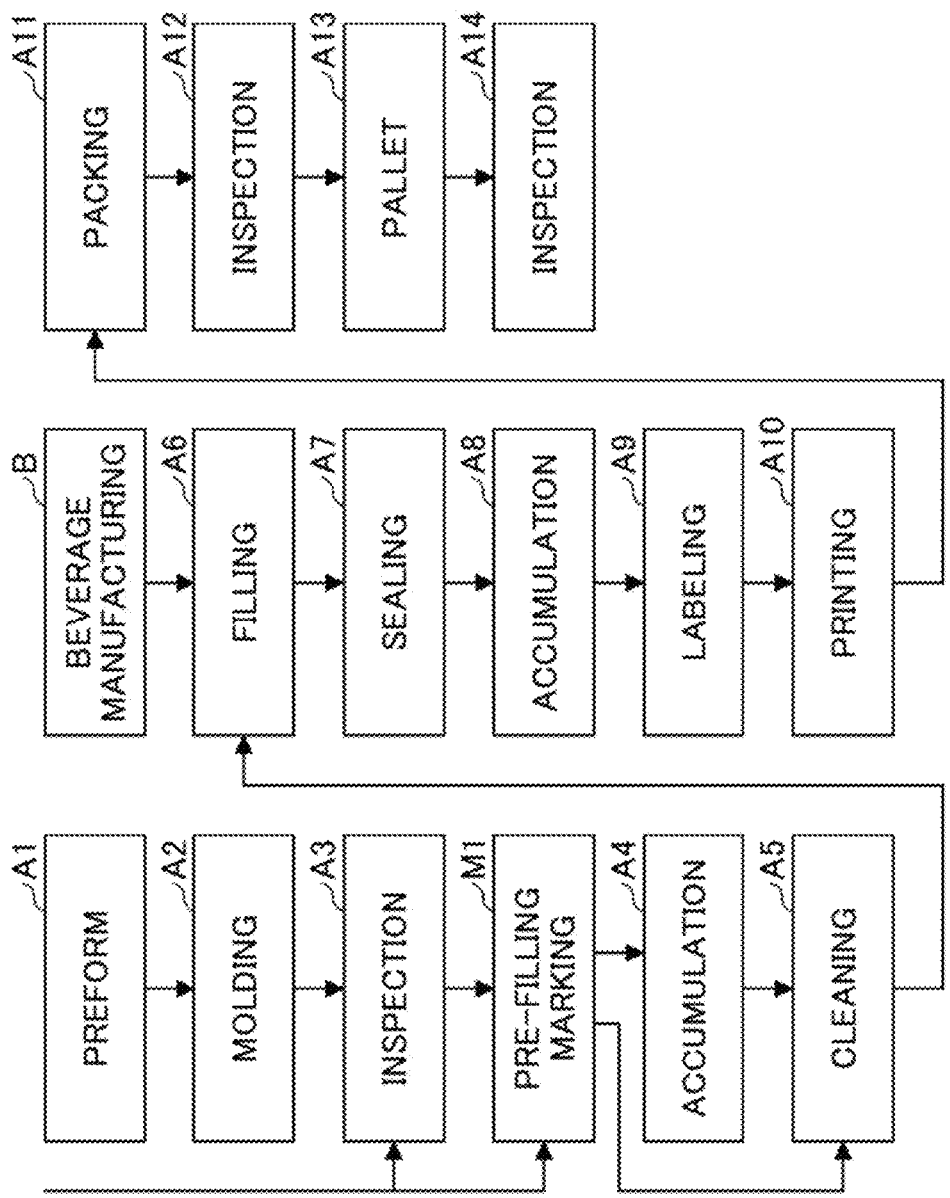

METHOD AND SYSTEM FOR MANUFACTURING CONTAINER PRODUCT

CROSS-REFERENCE TO RELATED APPLICATIONS

The present application is based on and claims priority under 35 U.S.C. § 119 to Japanese Patent Application No. 2020-164950, filed on Sep. 30, 2020, Japanese Patent Application No. 2021-091311, filed on May 31, 2021, and Japanese Patent Application No. 2021-149196, filed on Sep. 14, 2021, content of which is incorporated herein by reference in its entirety.

BACKGROUND OF THE INVENTION

1. Field of the Invention

The disclosures discussed herein relate to a method and a system for manufacturing a container product.

2. Description of the Related Art

Patent Document 1 (Japanese Unexamined Patent Application Publication No. 2011-011819) discloses a configuration of a PET bottle. According to this configuration, notation items are stamped and printed on the bottle 2 by direct heat processing, or by molding.

RELATED ART DOCUMENT

Patent Document

[Patent Document 1]
Japanese Unexamined Patent Application Publication No. 2011-011819

SUMMARY OF THE INVENTION

According to an embodiment of the present invention, a method for manufacturing a container product is provided. The method includes
filling a container with contents;
forming information on the container, the information including a number, a letter, and an image, the information being formed by a first pattern, the first pattern being made up of a collection of second patterns; and
heating or cooling the container before or after the forming of the information on the container.

BRIEF DESCRIPTION OF THE DRAWINGS

FIG. 1 is a diagram illustrating an example of a predetermined shape according to an embodiment of the present invention;

FIG. 2A is a top view, and FIG. 2B is a sectional view cut along a line indicated by the C-C arrows in FIG. 2A;

FIG. 3A is a perspective view viewed from a top direction, and FIG. 3B is a perspective view viewed from a cross sectional direction along a D-D arrow of FIG. 3A;

FIG. 14A illustrates a state of a gap being formed between the beams in a direction perpendicular to the Y direction, FIG. 14B illustrates a state of the fast scan in FIG. 14A, FIG. 14C illustrates a state of the superimposition of the beams in a direction orthogonal to the Y direction, FIG. 14D illustrates a state of the fast scan in FIG. 14C, FIG. 14E illustrates a state of the beams being in contact with each other in a direction orthogonal to the Y direction, and FIG. 14F illustrates a state of the fast scan in FIG. 14E;

FIG. 15A illustrates the shape change due to evaporation, FIG. 15B illustrates the shape change due to melting, FIG. 15C illustrates the crystallization state change, FIG. 15D illustrates the foam state change, FIG. 15E illustrates an enlarged view of an example of the first pattern;

FIG. 19A illustrates the processing depth being less than the non-processing depth, FIG. 19B illustrates the processing depth being deeper than the non-processing depth, FIG. 19C illustrates the processing depth and the non-processing depth being similar, and FIG. 19D illustrates the processing depth and the non-processing depth being changed;

FIG. 22A illustrates the processing data of the second pattern without periodicity, FIG. 22B illustrates a cross-sectional view of the second pattern by crystallization, and FIG. 22C illustrates a plan view of the second pattern by crystallization;

FIG. 33A is a diagram illustrating an example of a first pattern and FIG. 33B is a diagram illustrating another example of the first pattern;

FIG. 34 is a diagram illustrating production methods and production systems (factories) for mass production of container products;

DETAILED DESCRIPTION OF THE PREFERRED EMBODIMENTS

Figure 2B:
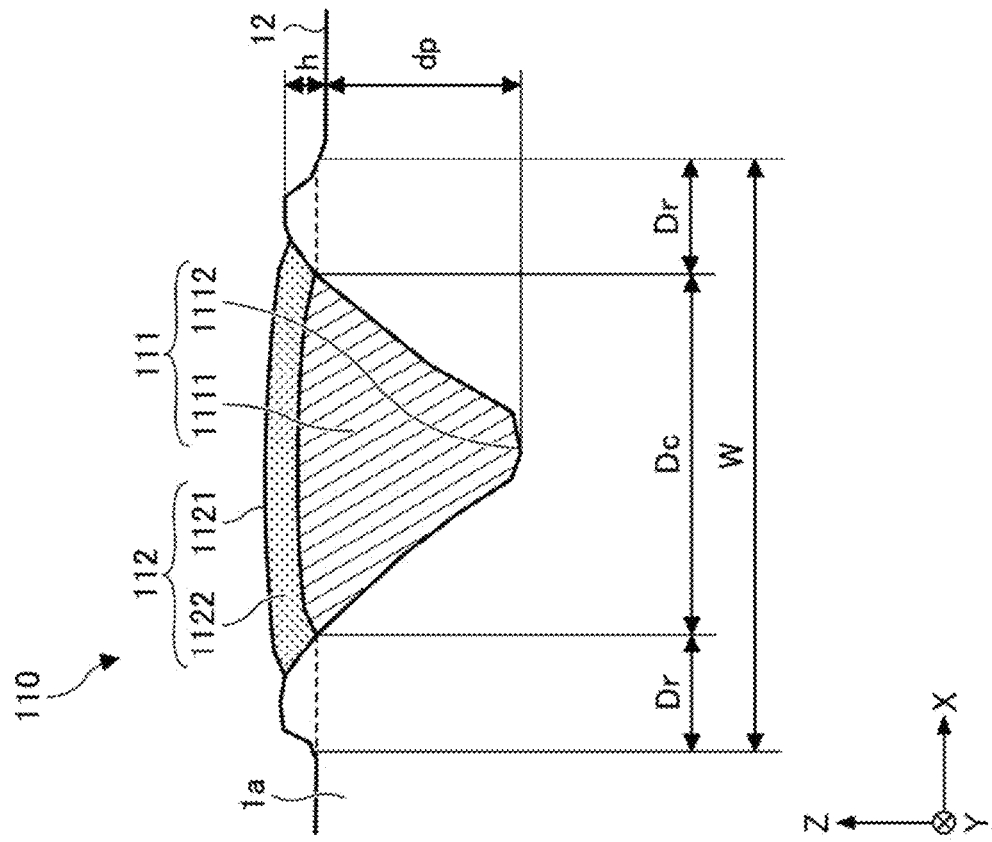
FIGS. 2A and 2B are diagrams illustrating an example of a configuration of a dot portion according to this embodiment, where

According to embodiments of the present invention, it is an object of the present invention to improve the visibility of information formed on a container.

Hereinafter, an embodiment for carrying out the invention will be described with reference to the accompanying drawings. In each drawing, the same components are indicated by the same reference numerals, and duplicated descriptions may be omitted.

A base material according to an embodiment of the present invention is a base material having a pattern formed by a predetermined shape in at least a portion of an area. The base material means a material portion of an object. An example of the object includes, for example, a container. Further, an example of the container is a PET bottle which is composed of a resin such as PET, and is configured to contain a beverage. However, there is no specific restriction on the object, and any object may be used. The shape and material for the container is not particularly restricted, and any shape and any material may be used for the container.

"At least a part of areas" in the base material include areas on the surface of the base material. The surface of the base material means a surface in contact with external air, and the like of the material. In the embodiment, in order to use the term "surface of the base material" as a term that corresponds to the inside of the base material, both the surface and the back surface of the base material are equivalent to the surface of the base material in a case of a plate-like base material. In the case of a cylindrical base material, both the outer and inner surfaces of the base material are equivalent to the surface of the base material.

The pattern includes letters, codes such as barcodes, shapes, images, and the like, indicating information about contents contained in a container. Examples of the information about the contents of the container include the name and identification number of the contents contained in the container, the manufacturer, and date and time of manufactured contents, such as beverages.

For containers such as PET bottles, a recording medium on which the above-described information is recorded may be attached to the surface of the containers in some cases. However, in this embodiment, information is displayed by forming a pattern, which represents the information, on the surface of the base material constituting the container, without using a recording medium.

FIG. 1 is a diagram illustrating an example of a predetermined shape formed on a base material according to the present embodiment. FIG. 1 illustrates a portion of a base material 1a constituting a container 1, where a pattern 11 is formed on a surface of the base material 1a. The container 1 and contents constitute a container product. As an example, the container 1 is made of a PET resin base material 1a that is transparent to visible light. Note that the visible light has a lower bound wavelength of approximately 360 nm to approximately 400 nm and an upper bound wavelength of approximately 760 nm to approximately 1600 nm.

The pattern 11 constitutes a string of letters "LABEL-LESS". An area A is an area which is a portion of the letter "s" in pattern 11. A perspective diagram in FIG. 1 is an enlarged view of the area A, which schematically illustrates the details of the configuration of pattern 11.

As illustrated in the perspective diagram in FIG. 1, the area A includes a plurality of dot portions 110. A dot portion 110 is an example of a predetermined shape, which is formed in at least a portion of an area on the base material and constitutes a pattern. The predetermined shape includes a shape formed on the surface of the base material, and an internal shape, such as a void, formed below the surface of the shape formed on the surface of the base material.

As a visual example, the dot portion 110 is a whitish opaque portion, and includes a recess portion 111 and a protruded portion 112. The recess portion 111 is a portion with respect to the surface of the base material 1a that constitutes the container 1. The recess portion 111 is an example of a predetermined recess portion. The protruded portion 112 is a portion protruded with respect to the surface of the base material 1a that constitutes the container 1. The protruded portion 112 an example of a predetermined protruded portion. The protruded portion 112 is formed around the recess portion 111 so as to surround the recess portion 111.

A plurality of dot portions 110 is formed as a collection of the dot portions 110 on the base material 1a constituting the container 1, thereby constituting a string of "LABELLESS" in the pattern 11. Herein, the collection means a collection of individual objects, and the pattern 11 is composed of a plurality of collections of dot portions 110.

In the base material 1a, a patterned area 13, in which the pattern 11 is formed by the plurality of dot portions 110, corresponds to a first area. A non-patterned area 12 other than the first area on the base material 1a corresponds to a second area.

Since a plurality of dot portions 110 are formed in the patterned area 13, the reflection direction and the diffusivity of the light entering the container 1 differ from those of the non-patterned area 12. Accordingly, at least one of the transmittance or the reflectance of the light incident on the container 1 is different between the patterned and non-patterned areas 13 and 12. The differences in light transmittance or light reflectance enables a viewer of the container 1 to visually perceive the pattern 11 formed on the container 1.

The overall width (dot width) of each of the plurality of dot portions 110 and the spacing (dot spacing) between the plurality of dot portions 110 are small with respect to the pattern 11. Thus, a viewer of the container 1 can visually perceive the letters "LABELLESS" of the pattern 11 without recognizing the dot portion 110 itself.

It is preferable that the gap between the dots be 100 μm or less, although the gap between the dots for a viewer not to recognize the dot portion 110 itself depend on the eyesight of a viewer viewing the container 1 and the distance between the eye and the container 1, or the like. In addition, the smaller the dot width, the better. However, it is preferable that the dot width be smaller than approximately 100 μm, as a viewer cannot identify the dot portion itself with this size of the dot width. This point is described in more detail below.

When a person (human) with an eyesight of approximately 1.5 views the container 1 from a distance of approximately 30 cm, it is generally possible to identify the black and white dots (dots) of 50 μm. This limit is also greater when the black and white contrast is low, but the size of the dots is generally approximately 50 μm. However, a dot of 30 μm may be visually perceived if only the dots are present, and a dot of 10 μm may be perceived if the contrast is high.

When there are two dot portions 110 adjacent to each other, whether the two dot portions 110 are visible depends on the resolution of the human eye or the like. The resolution means the minimum distance that can be recognized as two separated points.

The resolution of the human vision, depending on visual acuity, is generally 100 μm at a distance of 30 cm. The distance of 30 cm corresponds to the distance at which information such as labels displayed on a PET bottle is viewed by a person holding a PET bottle containing drinking water, or the like. In other words, when a person holds the PET bottle with his/her elbow bent lightly, the distance between the human eye and the PET bottle is approximately 30 cm. In view of the human body size, this distance varies in a range from approximately 30 cm to approximately 50 cm. The resolution is approximately 100 μm at a distance of 30 cm, and 160 μm at a distance of 50 cm.

In another indicator, when 200 dpi (dots per inch) is guaranteed as a resolution boundary, the dots will not be decomposed one by one and can be visually perceived as a group provided that the gap between adjacent dots is 130 μm or less.

As described above, the gap between the dots is preferably 160 μm or less, and more preferably 100 μm or less. With this range, the dot portion 110 is visually perceived as a continuous body without being perceived as being separated one by one, and a pattern such as a word "LABELLESS" of the pattern 11 can be visually perceived. Also, when the size of the dot is greater than 100 μm, the change in the shape of the dots itself may be visible. Thus, by making the dot size preferably 160 μm or less, and more preferably 100 μm or less, the dots can be perceived as a uniform pattern even if there is a change in shape of the dots, and a pattern such as a letter that is a collection of the dots can be visually perceived as a uniform pattern without a sense of granularity.

Various processing methods may be applied to form dot portion 110, such as laser processing, electrical discharge processing, etching processing, cutting processing, or molding processing. However, it is preferable that the laser processing method be performed in a non-contact manner with respect to the base material, and the laser beam can be scanned, a light source can be arrayed, or high-speed processing can be performed by pattern exposure or the like.

In laser processing, the size, shape, depth, and the like of the dot portion 110 can be changed by adjusting the light energy of the laser light (laser beam) to be applied, the size of the laser beam, the laser application time, and the like. Also, although the cross-sectional intensity distribution of the laser beam is generally Gaussian, it is possible to adjust the intensity distribution by combining the laser beams of the arrayed light sources, or to create a top hat-like intensity distribution in which the central intensity distribution is flat depending on the design of the illumination optics.

The recess portion 111 in the dot portion 110 is formed by melting, burning, vaporizing, or deforming a portion of the base material 1a at the position of the laser beam application. The protruded portion 112 is formed since a portion of the base material 1a partially separated from the recess portion 111 remains attached to the periphery of the recess portion 111 without being burnt or vaporized, and is solidified. Since the material of the base material 1a is mainly processed using thermal energy, a resin having a relatively low thermal conductivity is preferable as the material of the base material 1a, but other materials such as glass may also be applicable.

Various predetermined shapes, such as dot portion 110, can also be formed by controlling thermal conductivity. For example, thermal conductivity may be controlled by making the base material 1a itself highly thermally conductive, or by making other members having high thermal conductivity closely adhere to the base material 1a, thereby rapidly releasing heat generated by the base material 1a by application of laser light. Other materials having high thermal conductivity include coolants, metals, and the like.

In addition, since events such as melting, evaporation, crystallization, or foaming in laser processing occur irregularly in the laser application area, the surface of the patterned area 13 becomes rough and tends to have a larger surface roughness than the non-patterned area 12. Due to its high surface roughness, the patterned area 13 has a high light diffusivity with respect to the non-patterned area 12 for light incident on the container 1. As a result, the contrast of the pattern 11 is increased and visibility is improved. In view of this point, laser processing may be more preferably applied.

In this embodiment, the pattern is made up of a collection of a plurality of dot portions 110 including at least the recess portions 111 or the protruded portions 112. Since the surface area is increased along the shape of the recess portions 111 and the protruded portions 112, the area having the larger surface roughness is further increased compared to the case in which the pattern is formed as a mass in the groove or the depression. Also, since a collection of dot portions 110 forms a pattern, the surface area is further increased along the shape of the plurality of dot portions 110. This further enhances visibility by increasing light diffusivity and contrast.

Note that in the example illustrated in the perspective diagram in FIG. 1, the dot portion 110 is formed as, but is not limited to, a regular array in a square lattice shape. The dot portion 110 may be formed in an array of triangular lattice shape or honeycombs, or the dot portion 110 may be irregularly formed without being regularly arranged and with different spacing between dot portions 110.

The pattern 11 including the string of letters "LABEL-LESS" is illustrated by way of example, but the pattern 11 is not limited to this example. The pattern 11 may also be constructed by any string of letters, symbols or codes, shapes or photographs, barcodes or QR codes, and combinations of these. The pattern 11 is an image, in other words, an image may be formed by a predetermined shape, such as a dot portion 110.

<Example of Configuration of Dot Portion 110>

Figure 2A:
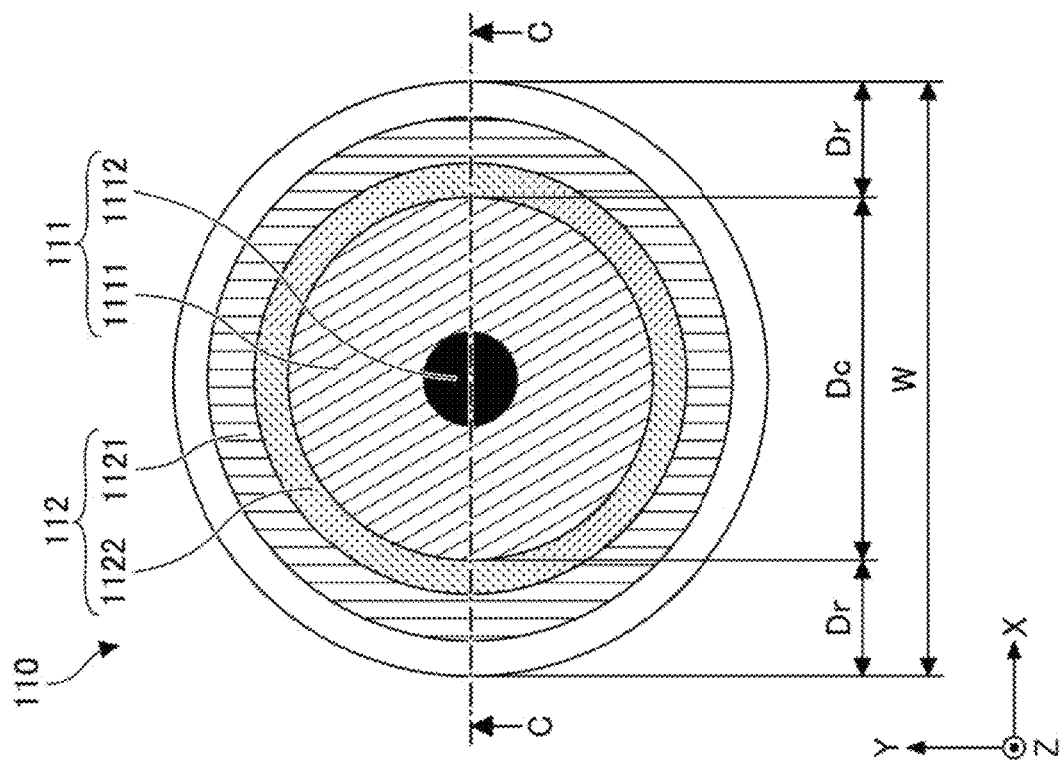
Figure 3B:
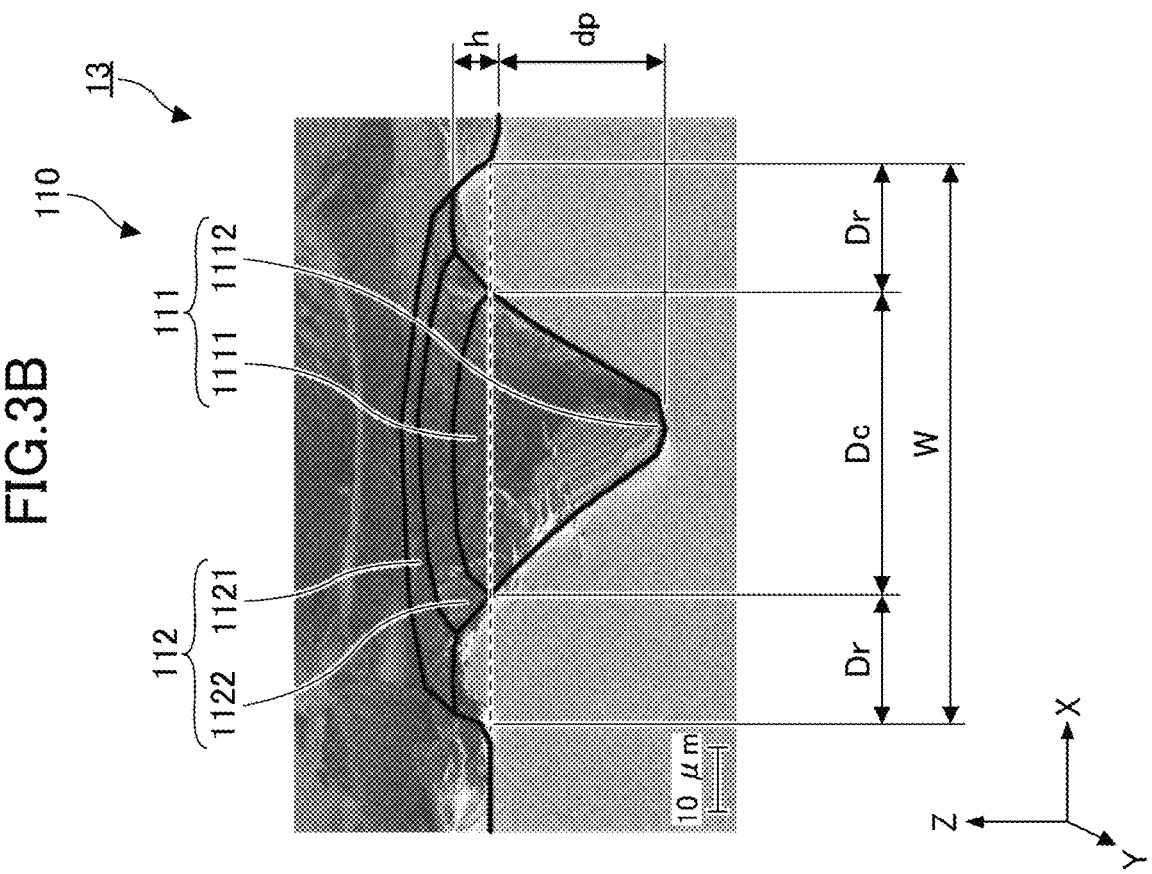
FIGS. 3A and 3B are scanning electron micrographs of a dot according to the present embodiment, where
Figure 3A:
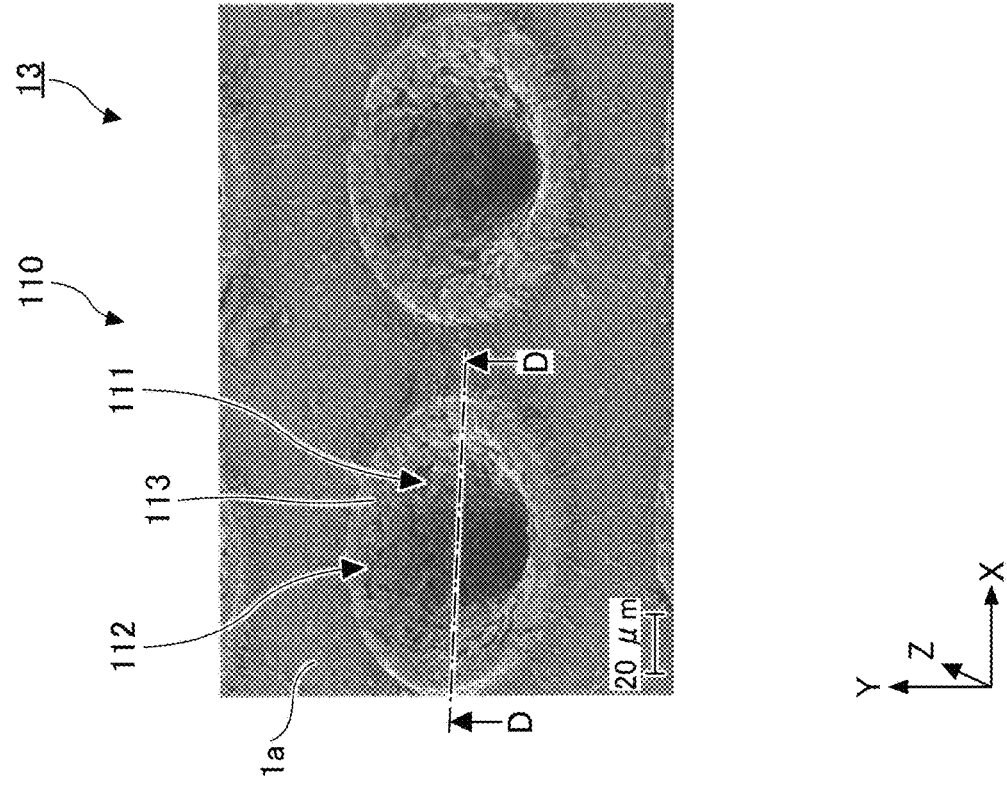

FIGS. 2A and 2B are diagrams illustrating an example of a configuration of the dot portion 110 according to the present embodiment, wherein FIG. 2A is a top view, and FIG. 2B is a cross-sectional view cut along a line indicated by C-C arrows of FIG. 2A. FIGS. 3A and 3B are scanning electron microscope (SEM; Scanning Electron Microscope) photographs of a dot portion 110 according to the present embodiment, where FIG. 3A is a perspective diagram viewed from the top direction, and FIG. 3B is a perspective diagram viewed from a direction of a D-D arrow cross section of FIG. 3A. FIGS. 3A and 3B are SEM photographs of a portion of the patterned area 13 viewed in an enlarged view. In FIG. 3A, the entirety of two of the plurality of dot portions 110 is observed, a small portion of the two dot portions 110 are observed on the positive side of the Y-axis, and a small portion of the two dot portions 110 are observed on the negative side of the Y-axis. The dot width is approximately 100 μm.

As illustrated in FIGS. 2A and 2B and FIGS. 3A and 3B, a dot portion 110 is an example of a second pattern, which includes a recess portion 111 and a protruded portion 112. The recess portion 111 includes a first slope 1111 (a diagonal hatching portion) and a bottom 1112 (a blackened portion), and is formed in a mortar or a bowl. The recess width Dc represents the width of the recess portion 111, and the depth dp represents the height of the bottom 1112 (the length in the Z-axis direction) with respect to the surface of the non-patterned area 12.

The protruded portion 112 also includes a top portion 1121 (vertical hatching portion) and a second slope 1122 (textured hatching portion), and is formed in a torus shape that rises from the surface of the substrate 1a. The protruded portion 112 is an example of a bend portion formed on a part of the outer edge of the second pattern. The torus refers to a surface of revolution (rotation) generated by revolving (rotating) a circle about an axis that is coplanar with the circle. The torus width Dr represents the radial width of the torus portion of the protruded portion 112, and the height h represents the height (length in the Z-axis direction) of the top portion 1121 with respect to the surface of the non-patterned area 12. The width W represents the width of the entire dot portion 110. The first slope 1111 and the second slope 1122 form a continuous surface. A continuous surface means a surface made of the same material without any step.

Further, as illustrated in FIGS. 3A and 3B, each surface of the recess portion 111 and the protruded portion 112 includes a non-uniform microscopic rough portion 113, and the surfaces of the recess portion 111 and the protruded portion 112 thus include rough spotted areas. The microscopic rough portion 113 is an example of a rough portion that is smaller than a predetermined shape. The microscopic rough portion 113 includes recess portions and protruded portions each having a width smaller than the dot width W of the dot portion 110, and typically includes recess portions and protruded portions each having a width of approximately 1 μm to 10 μm. In addition, as illustrated in FIG. 3A, processed pieces due to processing of the dot portion 110 are scattered in the area between the dot portions 110, and the surface is roughened by these processed pieces. In the patterned area 13, the surface roughness due to the roughness of the microscopic rough portion 113 or the processed pieces increases the surface roughness compared to the non-patterned area.

In an area of the microscopic rough portion 113, diffused reflection occurs with respect to light, so that the area appears visually different from the area that is not rough. That is, the area of the microscopic rough portion 113 has different optical reflection characteristics from the other peripheral areas. The area of the microscopic rough portion 113 appears whiter than the area where the surface is not rough (peripheral area), and forms a microscopic white area (white spots) or a microscopic white opaque are (white opaque spots).

The dot portion 110 can be formed, for example, by irradiating the base material 1a with laser light and denaturing the surface of the base material 1a. One dot portion 110 is formed by focusing laser light at one point on the base material 1a. In addition, a plurality of dot portions 110 is formed by two-dimensional scanning of the laser light. Alternatively, a plurality of dot portions 110 may be formed by a plurality of laser beams emitted from each of the plurality of arrayed laser light sources. Further, a plurality of dot portions 110 may be formed in parallel with one exposure by irradiating a mask member having a plurality of light transmitting apertures corresponding to respective positions of the dot portions 110 with expanded laser light, allowing each of transmitted laser light groups to be transmitted through each light transmitting aperture of the mask member.

Various laser light sources may be used as laser light sources to illuminate the laser light. Preferable examples of laser light sources include pulse oscillators that can emit pulses (with a pulse width) from picoseconds to nanoseconds. Examples of solid-state lasers include YAG lasers and titanium sapphire lasers. Gaseous lasers include argon lasers, helium neon lasers, and carbon dioxide lasers. Semiconductor lasers are also small and preferred. The fiber laser, which is a type of solid-state laser that uses optical fiber as an amplification medium, is the optimal light source in terms of its peak energy and compactability.

A container according to an embodiment is a container such as a PET (Polyethylene terephthalate) bottle having a first pattern formed on at least one of the surface, the back surface, or the inside of the base material of the container 1.

The first pattern includes codes such as letters and barcodes, shapes, and the like, indicating information about a container, such as the name, and identification number of the container or the contents contained in the container such as beverage contained in the container, the manufacturer, the distributor, the date and time of the manufacture, and the like, of the container, or the contents of the container.

That is, the first pattern is information such as letters, symbols, marks, images, and the like. Letters of the first pattern are various numbers such as Arabic numerals, Roman numerals, Chinese numerals, and the like, katakana, hiragana, 26 alphabetic letters in upper-case and lower-case letters (abcd, ABCD), Chinese letters, Hangul letters, and the like, and symbols or letters having a complex structure can also be represented. A wide variety of fonts (Gothic, Ming, Arial, Times New Roman, and the like) can be used to form a diverse set of information. Integrated information combining multiple types of fonts is also possible. It is also important to note that letters having these complex structures can be represented with considerable precision (ranging from a desired resolution, e.g., between 50 dpi and 600 dpi) in any size. For example, within a range from a size of 5 mm×5 mm to a size of 5 cm×10 cm, information on numbers, letters, symbols, and Chinese letters of any size can be integrally formed on a container. Information mixed with multiple sizes of numbers, letters, symbols, kanji, and images (as required) can also be integrally formed on a container.

The pitch, which is the spacing between letters and symbols, can also be used selectively as needed, in order to efficiently and integrally form information such as letters and symbols on the container. Examples of the pitch include a fixed pitch, a variable pitch, and a proportional pitch, or mixture of the different pitches. In addition, information can be formed by bolded letters (bolded letters) or bold symbols (bold symbols) that are made up of thickened lines representing letters or symbols, thereby enabling a variety of information representations. Further, an image such as a mark, a design, a pattern, a barcode, a QR code, or the like can be integrally formed on a container within a range of a size of a surface area of the container, such as a range from a size of 5×5 mm to a size of 5×10 cm, or the like. In other words, image information can be integrally formed on the container of any size ranging from the smallest visible size to the size that can be displayed on the container.

Moreover, the image information can be accurately integrally formed on the container with any resolution (e.g., 50 dpi to 600 dpi). A container, such as a PET (Polyethylene terephthalate) bottle, having a first pattern formed on at least one of the surface, the back surface, or the inside of the base material of the container can enhance visual appeal, where the first pattern is a wide variety of information. The base material refers to a material portion of the container such as resin and glass that make up the container.

That is, a container according to an embodiment is a container such as a PET (Polyethylene terephthalate) bottle. A first pattern is formed on at least one of the surface, the back surface, or inside of the base material of the container. Examples of the first pattern formed on the container include information about a material of the container and the recycling properties of the container, the name of contents such as beverages (tea, water, coffee, carbonated water, and the like), information about a raw material of the contents (domestic green tea, and the like), the ingredient indication of the contents, the name of the manufacturer, the name of the seller, the address and the telephone number of the customer center and the like, access information via the Internet (URL information), the product name, the trademark, the manufacturing date and time, the best-before date, and other information. Such information (first pattern) about the container and the contents of the container can be integrally formed by ideogram such as Arabic numbers, alphabetic letters, hiragana characters, katakana characters, or ideographic characters such as kanji, and digital marks such as barcodes and QR codes, and a mark of a predetermined shape such as a recycle mark of the container 1 or the cap.

In addition, bolding (increasing the thickness) of the numbers, the letters, the symbols, or the like indicating the information to be appealed to the customer, can be integrally formed on the container as the first pattern.

In an embodiment, a first pattern is formed on a container as a collection of second patterns (microscopic patterns formed on the container) that differ from the first pattern. Herein, the collection is a collection of multiple elements. In other words, in an embodiment, an image formed by a collection of microscopic configurations is formed on a container.

For example, a line shape as an example of the first pattern may be formed by a plurality of thin lines further narrower than the line of the line shape or may be formed by a plurality of points having a smaller diameter with respect to the thickness of the line of the line shape or the like. Each of these thin lines and small points is an example of the second pattern (see FIG. 17). In other words, a collection of the second patterns, each of which are a finer pattern than the first pattern, is embedded in order to form the first pattern. That is, a predetermined image is integrally formed on a base material by a collection of tiny areas including at least a portion of a bend.

The first pattern, which is made up of a collection of the second patterns, increases the light diffusivity due to the first pattern of light (hereinafter referred to as ordinary light) around the container, thereby improving the contrast of the first pattern. Even if the first pattern is a pattern with a large amount of information including a fine line, a letter, an image, a shape, or the like, the first pattern can be visually perceived with high contrast.

Figure 4A:
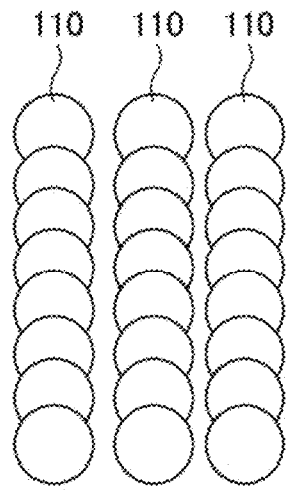
FIGS. 4A to 4D are diagrams illustrating a pattern according to the present embodiment.
Figure 4B:
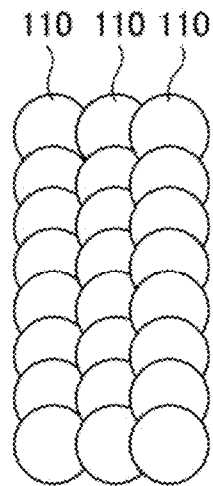
Figure 4C:
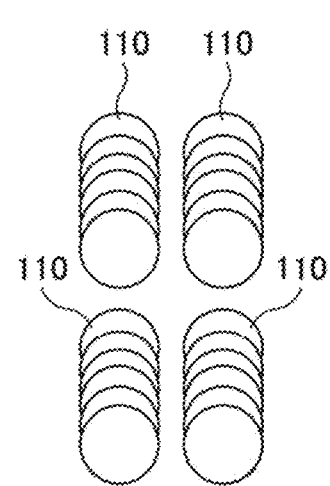

FIGS. 4A to 4D are diagrams illustrating a pattern according to an embodiment. As illustrated in FIGS. 4A to 4D, a second pattern, which is a microscopic pattern, may be formed partly in a continuous or discontinuous manner to form a first pattern. Specifically, a dot portion 110, as an example of the second pattern, is superimposed as illustrated in FIG. 4A, a dot portion 110 is superimposed in either of the main- and sub-laser scanning directions as illustrated in FIG. 4B, or a dot portion 110 is partially increased to form a small shape as illustrated in FIG. 4C, thereby forming the first pattern. By such a form, even though the light diffusion degree of the individual second patterns is small, the number of sets of the second patterns increases the light diffusivity of the formed first pattern, and thus the formed first pattern exhibits the high contrast and the improved viewability.

Figure 4D:
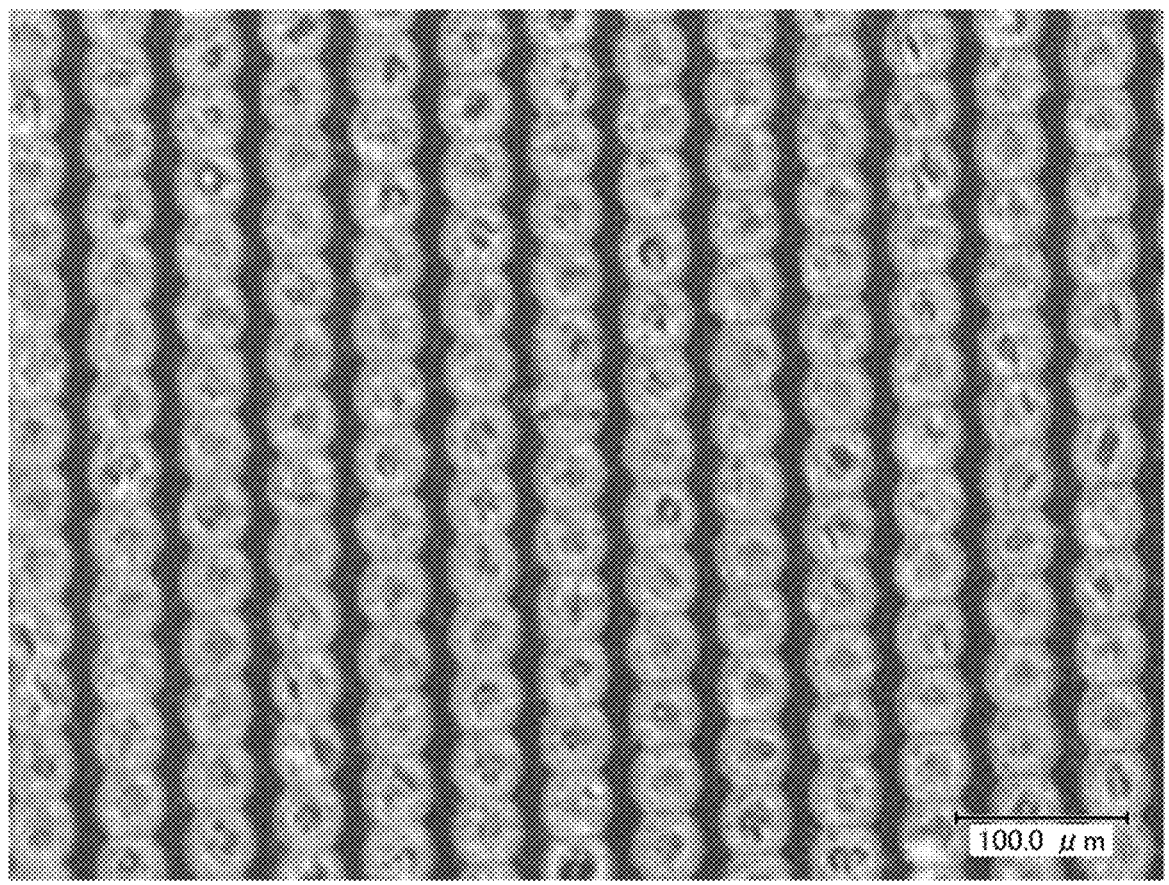

FIG. 4D is a photograph illustrating the pattern actually formed on a transparent base material. As an example of a forming condition, a circular pattern of a second pattern having an outer diameter of about 40 μm was continuously formed with a pitch equal to or greater than the outer diameter size of 40 μm. In this way, the second pattern is superimposed such that the edges on the line do not become a straight line, and the circular arc with a partially cut off portion of the non-superimposed portion is successively bordered. This state also exhibits a higher light diffusion performance than the linear state, thus providing a higher light diffusivity and better visibility at higher contrast.

The present embodiment is characterized in that a pattern is formed by applying laser light locally and utilizing a change in morphology in a laser-applied very fine area. Thus, the present embodiment does not limit the manner in which morphological changes occur. For example, when the laser beam is applied locally, gas bubbles are generated in the base material due to the laser thermal effect, and the vaporized bubbles are sealed near the surface layer of the base material, resulting in a whitish rise, or the like as the first pattern. Also, the first pattern may be formed by absorbing laser energy, and increasing the molecular density and condensation due to the laser thermal effect. In addition, when the pigment or the like is contained in the base material, color develops by chemical change of component composition, such as by change in molecular structure due to laser application or change in the amount of hydration in the crystal, and by increase in the concentration of the pigment or the like, is also included in the formation of the first pattern. In any of the first pattern formations, the first pattern can be formed by the application of local energy. That is, pulse-driven processing is desirable and the first pattern can be formed by using a pulse laser of femtosecond, nanosecond, or picosecond.

Further, when the first pattern according to the present embodiment is formed on a transparent base material, so that the first pattern can obtain, as a collection of the second patterns, the high contrast due to transmission or scattering of the light. This greatly improves the effect of the perception. However, the object is not necessarily limited to the transparent base material. The first pattern and the second patterns may also be formed on either a colored base material or a base material having a low light transmittance. In this case, the scattering effect by the first pattern provides contrast with a portion where the first pattern is not formed, thereby allowing for easy viewability of letters, barcodes, and the like.

First Embodiment

<Example of Configuration of Manufacturing Device 100>

Figure 5A:
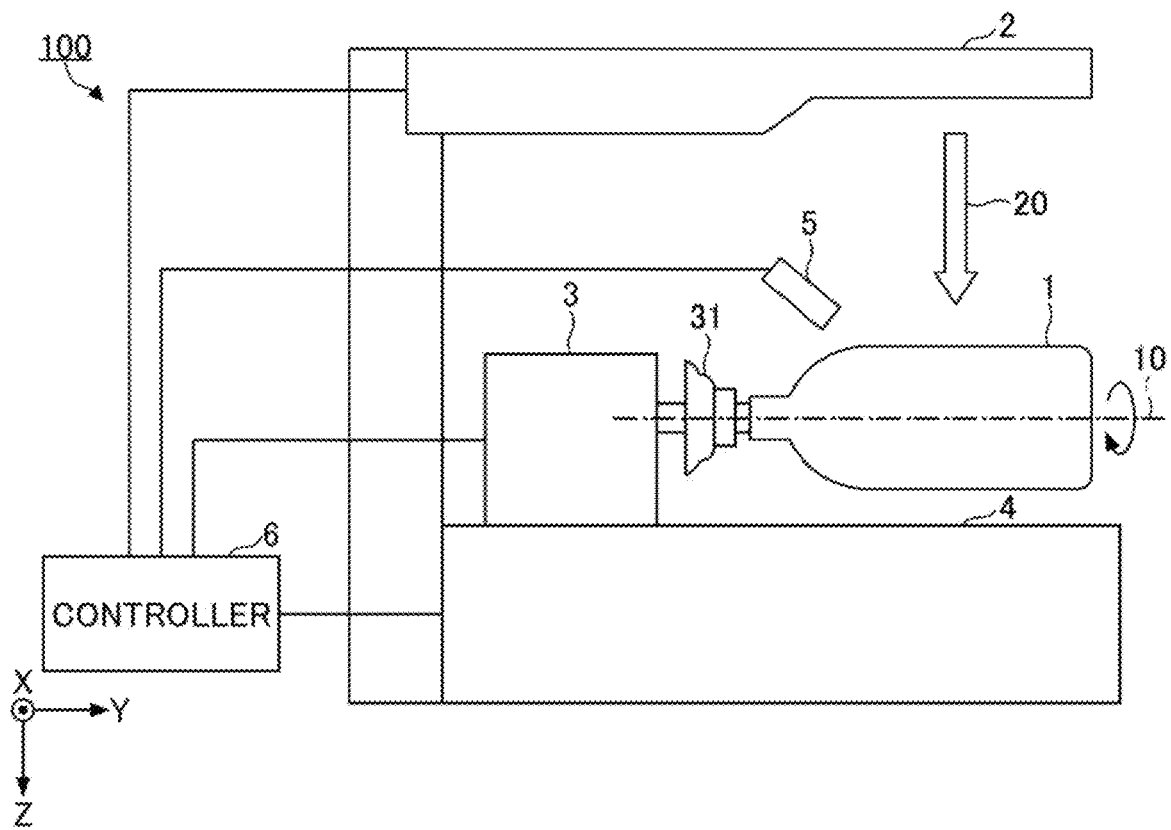
FIGS. 5A and 5B are diagrams illustrating an example of a configuration of a manufacturing device (optical marking device) and a laser application unit of a container according to an embodiment.

The following describes a configuration of a manufacturing device 100 (an optical marking device) of a container 1 according to a first embodiment will be described with reference to the accompanying drawings. FIG. 5A illustrates an example of a configuration of a manufacturing device (optical marking device) 100. The manufacturing device (optical marking device) 100 is a device for integrally forming a first pattern made up of a collection of second patterns on at least one of the surface or inside of the base material forming the container 1 by changing the properties of the base material constituting the container 1. Herein, the properties of the base material mean the properties or conditions of the base material. The manufacturing device 100 is an example of a pattern forming device, an information forming device, and a laser processing device.

As illustrated in FIG. 5A, a manufacturing device (optical marking device) 100 includes a laser application unit 2, a rotating mechanism 3 configured to collect processed pieces, a holder 31, a moving mechanism 4, a dust collector 5, and a controller 6. The manufacturing device 100 rotatably holds the container 1, which is a cylindrical container, about a cylindrical axis 10 of the container 1 via a holder 31. Then, by irradiating the container 1 with laser light from the laser application unit 2 and changing the properties of the base material constituting the container 1, a first pattern made up of a collection of second patterns is formed on the surface of the container 1. Herein, the cylindrical axis 10 is an example of a "predetermined axis". Hereinafter, for the purpose of simplifying the description, the first pattern, which is made up of a collection of second patterns, may be referred to as the first pattern as appropriate.

As an example of an application unit, the laser application unit 2 scans laser light emitted from the laser light source in the Y direction of FIG. 5A and applies the processing laser beam 20 as an example of the laser beam toward the container 1 positioned in the positive Z direction. The laser application unit 2 will be described in detail with reference to FIG. 5B.

As an example of a rotating portion, a rotating mechanism 3 holds the container 1 through a holder 31. The holder 31 is a coupling member connected to the motor shaft of the motor (not illustrated) as a drive unit provided by the rotating mechanism 3, and one end of the holder 31 is inserted into a mouth (opening) of the container 1 to hold the container 1. By rotating the motor shaft, the holder 31 rotates to rotate the container 1 held in the holder 31 about the cylindrical axis 10.

The moving mechanism 4 as an example of the moving unit is a linear motion stage having a table, and the rotating mechanism 3 is mounted on the table of the moving mechanism 4. The moving mechanism 4 moves the table in the Y direction to integrally move the rotating mechanism 3, the holder 31, and the container 1 in the Y direction.

A dust collector 5 is an air suction device positioned in the vicinity of the portion of the container 1 to which the processing laser beam 20 is applied. The plume and dust generated when forming the first pattern by application of the processing laser beam 20 are collected by suction of air to prevent the manufacturing device 100, the container 1, and the periphery of the container 1 from contamination with the plume and dust.

The controller 6 is electrically connected to each of the laser light source 21, the scanner 23, the rotating mechanism 3, the moving mechanism 4, and the dust collector 5 via a cable, and the controller 6 outputs a control signal to control each operation.

The manufacturing device 100 applies the processing laser beam 20 scanned in the Y direction onto the container 1 by the laser application unit 2 under the control of the controller 6 while rotating the container 1 by the rotating mechanism 3. Then, the first pattern is formed in two dimensions on at least one of the surface or the back surface of the base material or the inside of the container 1.

Herein, the range of the scanning area of the processing laser beam 20 in the Y direction by the laser application unit 2 may be limited. Thus, when the first pattern is formed in a wider range than the scanning area, the manufacturing device 100 moves the container 1 in the Y direction by the moving mechanism 4 so that the applied position of the processing laser beam 20 on the container 1 is shifted in the Y direction. Thereafter, when the processing laser beam 20 in is scanned in the Y direction by the laser application unit 2 while rotating the container 1 again by the rotating mechanism 3, a first pattern is formed on at least one of the surface or the inside of the base material forming the container 1. This allows a first pattern to be formed in a wider area of the container 1 (any area from the opening to the bottom of the bottle).

<Example of Configuration of Laser Application Unit 2>

Figure 5B:
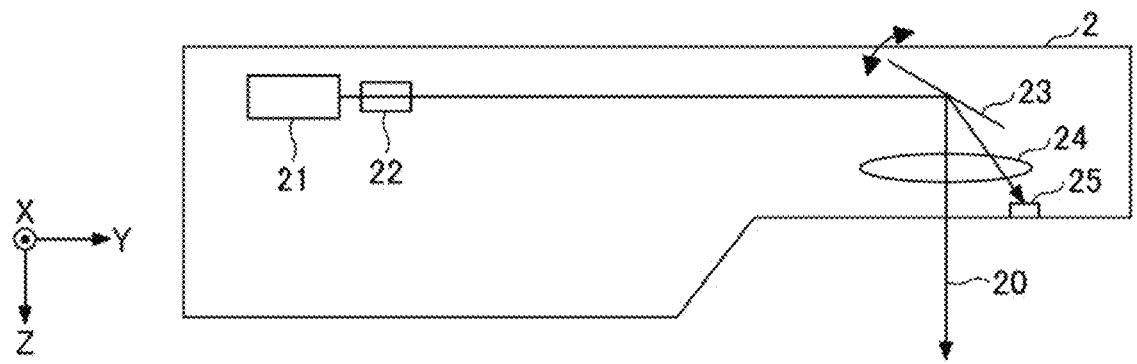

Next, the configuration of the laser application unit 2 will be described. FIG. 5B is a diagram illustrating an example of a configuration of the laser application unit 2. As illustrated in FIG. 5B, the laser application unit 2 includes a laser light source 21, a beam expander 22, a scanner 23, a scanning lens 24, and a synchronization detector 25.

The laser light source 21 is, for example, a pulsed laser that emits laser light. The laser light source 21 emits laser light at an output power (optical intensity) suitable for varying the properties of at least one of the surface or the inside of the base material of the laser-applied container 1.

The laser light source 21 allows for control of the on/off of the laser light emission, control of the emission frequency, control of the optical intensity, and the like. As an example of a laser light source 21, a laser light source with a wavelength of 532 nm, a laser light pulse width of 16 picoseconds, and a mean output power of 4.9 W may be used. Preferably, the diameter of the laser light in the area where the properties of the base material of the container 1 are changed is 1 μm or less and 200 μm or less.

The laser light source 21 may also be made up of one laser light source or a plurality of laser beams sources. In the case where multiple laser light sources are used, the control of on/off, the control of the emission frequency, the optical intensity, and the like may be performed independently for each laser light source, or may be the same among the multiple laser light sources.

The laser light emitted from the laser light source 21 is enlarged in diameter by the beam expander 22, and the enlarged laser light enters the scanner 23.

The scanner 23 includes a scanning mirror that changes the reflected angle by a driving unit such as a motor. By changing the reflected angle by the scanning mirror, incoming laser light is scanned in the Y direction. The scanning mirror may be a galvanic mirror, a polygon mirror, a MEMS (Micro-Electro Mechanical System) mirror, or the like.

In the embodiment, an example in which the scanner 23 scans the laser light in the Y direction in one dimension is illustrated, but embodiment of the present invention is not limited thereto. The scanner 23 may scan the laser light in two dimensions in the XY directions using a scanning mirror that changes the reflected angle in two orthogonal directions. However, when the laser light is applied to the surface of the cylindrical container 1, and the two-dimensional scanning is performed in the XY directions, the beam spot diameter on the surface of the container 1 changes in response to the scanning in the X direction. In such a case, the one-dimensional scanning is preferable.

The laser light scanned by the scanner 23 is applied as a processing laser beam 20 onto at least one of the surface or the inside of the base material of the container 1.

A scanning lens 24 is a fθ lens that keeps the scanning speed of the processing laser beam 20 scanned by scanner 23 constantly and focuses the processing laser beam 20 at a predetermined position on the surface of the base material or at least one of the inside of the container 1. Preferably, the scanning lens 24 and the container 1 are arranged to minimize the beam spot diameter of the processing laser beam 20 in the area that changes the properties of the base material of the container 1. The scanning lens 24 may be configured by a combination of a plurality of lenses.

A synchronization detector 25 outputs a synchronization detection signal used to synchronize the scanning by the processing laser beam 20 with rotation of the rotation mechanism 3 of the container 1. The synchronization detector 25 includes a photodiode for outputting an electrical signal according to the received optical intensity, and outputs an electrical signal by the photodiode as a synchronization detection signal to the controller 6.

Figure 6:
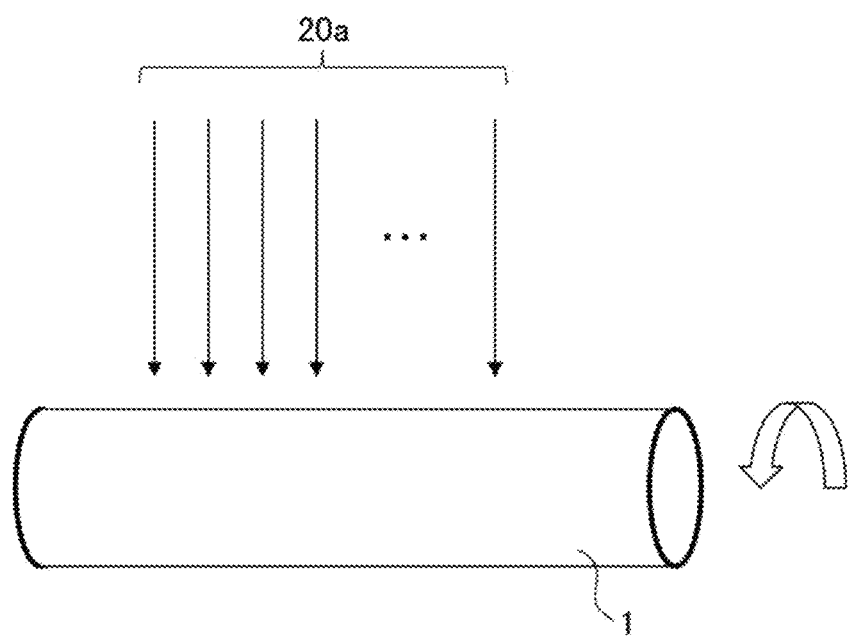
FIG. 6 is a diagram illustrating the application of laser light by a processing laser beam array.

FIG. 5B illustrates an example of scanning by a processing laser beam. However, it is also possible to provide a large number of processing laser beams in the range of the printing width, for example, to construct a processing laser beam array. In this configuration, the container 1 is scanned in one direction with a large number of laser beams by rotating the container 1. FIG. 6 is an example of this illustration, illustrating a processing laser beam array comprising a plurality of laser beams in parallel with a container 1.

<Example of Hardware Configuration of Controller 6>

Figure 7:
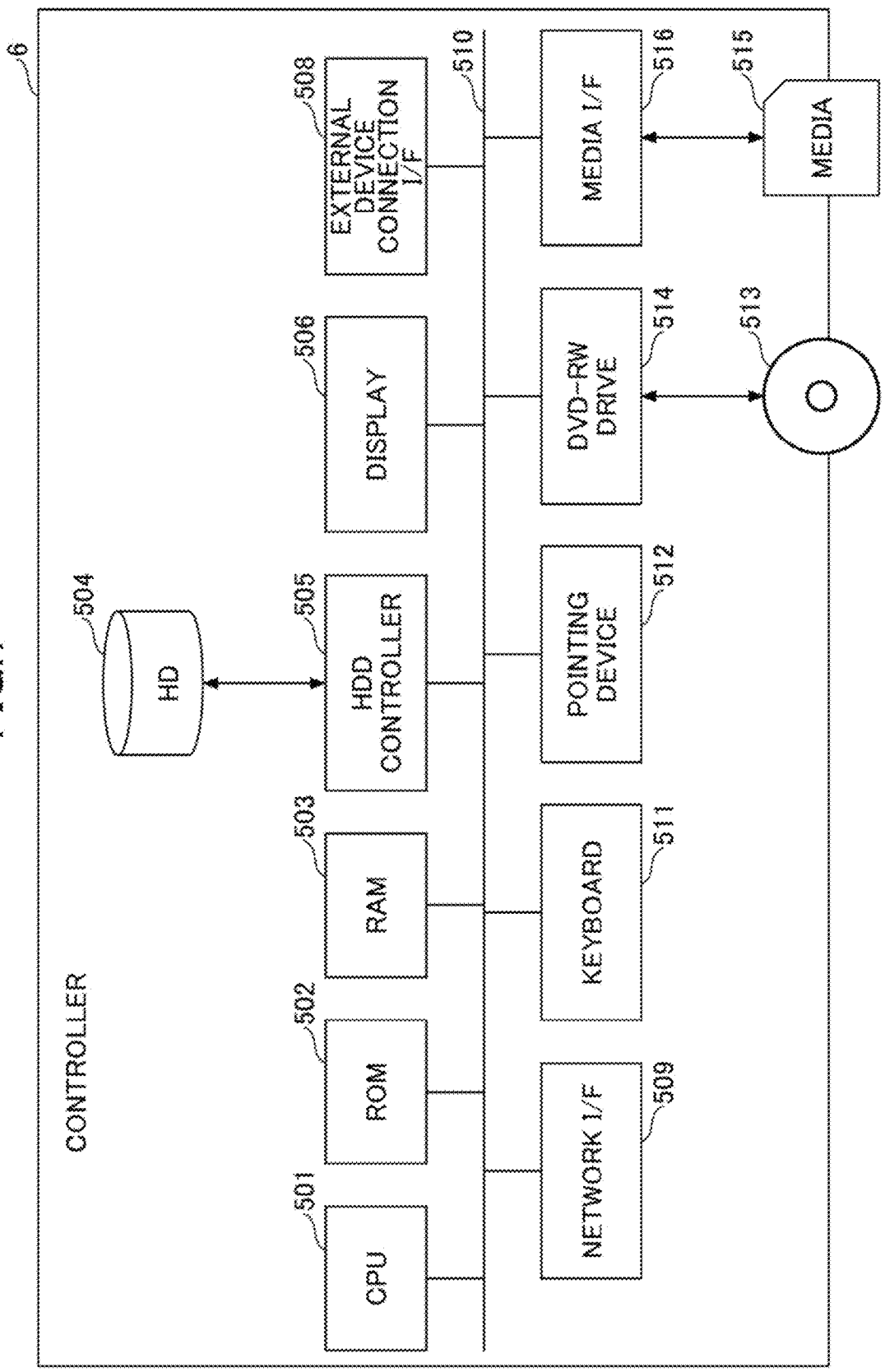
FIG. 7 is a block diagram illustrating an example of a hardware configuration of a controller according to an embodiment.

Next, a hardware configuration of a controller 6 included in the manufacturing device 100 will be described. FIG. 7 is a block diagram illustrating an example of a hardware configuration of the controller 6. The controller 6 is constructed by a computer.

As illustrated in FIG. 7, the controller 6 includes a CPU (Central Processing Unit) 501, a ROM (Read Only Memory) 502, a RAM (Random Access Memory) 503, a HD (Hard Disk) 504, an HDD (Hard Disk Drive) controller 505, and a display 506. The controller 6 includes an external device connection I/F (Interface) 508, a network I/F 509, a bus line 510, a keyboard 511, a pointing device 512, a DVD-RW (Digital Versatile Disk Rewritable) drive 514, and a media I/F 516.

Of these, the CPU 501 is a processor and controls the operation of the entire controller 6. A ROM 502 is a memory for storing programs used to drive the CPU 501, such as an IPL (Initial Program Loader).

The RAM 503 is a memory used as a work area of the CPU 501. The HD 504 is a memory for storing various data such as a program. Digital data regarding various numbers such as Arabic numerals, Roman numerals, Chinese numerals, and the like integrally formed on a container as a first pattern, kanaka, hiragana, 26 alphabetic letters in upper and lower case letters, (abcd, ABCD), kanji, Hangul letters, symbols, and a wide variety of fonts (Gothic bodies, Ming bodies, Arial, Times New Roman, and the like) representing the respective letter information representable by letters having a complex structure are stored in this HD 504. The HDD controller 505 controls the reading or writing of various data with respect to the HD 504 according to the control of the CPU 501.

The display 506 displays various information such as cursors, menus, windows, letters, or images. The external device connection I/F 508 is an interface for connecting various external devices. In this case, the external devices include a laser light source 21, a scanner 23, a synchronization detector 25, a rotating mechanism 3, a moving mechanism 4, and a dust collector 5. However, the USB (Universal Serial Bus) memory, printer, and the like can also be connected.

The network I/F 509 is an interface for performing data communication using the communication network unit. The network I/F 509 may be an interface with respect to a communication network, such as a wireless LAN, such as Wi-Fi, or a wired LAN via an Ethernet cable. The network I/F 509 or the communication network unit can be used to input to the controller 6 from the outside, font data such as material data of a material to be processed, such as a container, processing parameter information according to a material such as a material of a container, and various letters or symbols integrally formed on a container, and the like. The bus line 510 is an address bus, a data bus, or the like for electrically connecting components such as the CPU 501 illustrated in FIG. 7.

The keyboard 511 is a type of input unit with a plurality of keys for inputting letters, numbers, various instructions, and the like. The pointing device 512 is a type of input unit for selecting and executing various instructions, selecting a processing target, moving a cursor, and the like.

The DVD-RW drive 514 controls the reading or writing of various data to the DVD-RW 513 as an example of a removable recording medium. The DVD-RW drive 514 is not limited to DVD-RW, but may be DVD-R, and the like. The media I/F 516 controls the reading or writing (storing) of data to a recording medium 515, such as a flash memory.

<Example of Functional Configuration of Controller 6>

Figure 8:
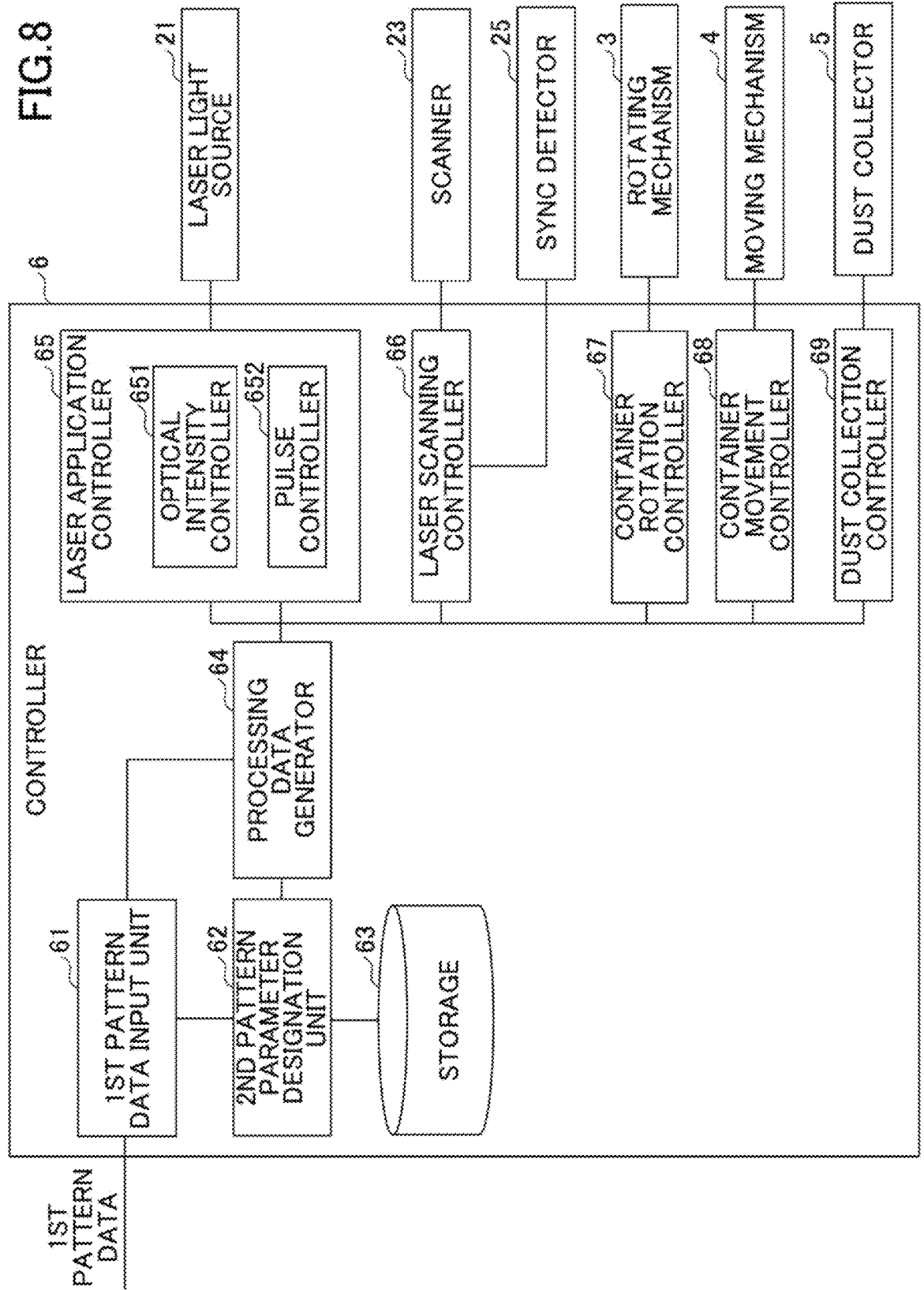
FIG. 8 is a block diagram illustrating an example of a functional configuration of a controller according to an embodiment.

Next, a functional configuration of the controller 6 will be described. FIG. 8 is a block diagram illustrating an example of a functional configuration of a controller 6.

As illustrated in FIG. 8, the controller 6 includes a first pattern data input unit 61, a second pattern parameter designation unit 62, a storage 63, a processing data generator 64, a laser application controller 65, a laser scanning controller 66, a container rotation controller 67, a container movement controller 68, and a dust collection controller 69. The material data to be processed includes information on processing parameters according to the material such as resin.

Among these, the functions of the first pattern data input unit 61, the second pattern parameter designation unit 62, the processing data generator 64, the laser application controller 65, the laser scanning controller 66, the container rotation controller 67, the container movement controller 68, and the dust collection controller 69 are implemented by causing the CPU 501 of FIG. 7 to perform a predetermined program to output a control signal via the external device connection I/F 508. However, electronic circuits or electrical circuits such as ASIC (Application Specific Integrated Circuit) and FPGA (Field-Programmable Gate Array) may be added to the hardware configuration of the controller 6, and a part or all of the functions of each of the above components may be implemented by electronic circuits or electrical circuits. The function of the storage 63 is implemented by an HD 504 or the like.

The first pattern data input unit 61 inputs, from an external device such as a PC (Personal Computer) or a scanner, pattern data of the first pattern formed on at least one of the surface or the inside of the base material of the container 1. The pattern data of the first pattern is electronic data including information representing a code, such as a barcode or a QR code, a letter, a shape, a photograph, or the like, and information representing the type of the first pattern.

However, pattern data is not limited to those input from external devices. The first pattern data, which is generated by a user of the manufacturing device 100 using the keyboard 511 of the controller 6 or the pointing device 512, can also be input.

The first pattern data input unit 61 outputs the input pattern data of the first pattern to the processing data generator 64 and to the second pattern parameter designation unit 62, separately.

The second pattern parameter designation unit 62 designates a processing parameter for forming the second pattern. As described above, the second pattern may be a line or point or the like having a length or a width smaller than that of the first pattern, or may be a line or point or the like having a length and a width smaller than those of the first pattern so as to act to increase the contrast of the first pattern and improve visibility.

The processing parameters of the second pattern are information designating the type and length of lines as the second pattern, the thickness, the processing depth, or the spacing or arrangement of adjacent lines, the density, and the like in a collection of lines. Alternatively, the processing parameters of the second pattern are information designating the type, the size, the processing depth of the points as the second pattern, or the spacing or arrangement of adjacent points in a collection of points, the density, and the like.

The type of lines is information indicating straight lines, curves, and the like. The type of points is information indicating the shape of points such as circles, ovals, rectangles, diamonds, and the like. In a collection of second patterns, the second pattern may be configured to be periodic or non-periodic. However, it is preferable that the second pattern be configured to have periodicity because the parameter designation can be simplified.

The processing parameters of the second pattern suitable for improving visibility corresponding to the type of the first pattern, such as letters, codes, shapes, or photographs, are predetermined by experiments and simulations. The storage 63 stores a table representing a relationship between the type of the first pattern and the processing parameters. The outer frame of the first pattern may or may not be processed. Processing the outer frame of the first pattern will clarify the contour. Rendering efficiency improves without processing the outer frame of the first pattern.

The second pattern parameter designation unit 62 can acquire and designate the second pattern processing parameters by referring to the storage 63, based on information indicating the type of the first pattern input from the first pattern data input unit 61.

However, the method of designation by the second pattern parameter designation unit 62 is not limited to those described above. The second pattern parameter designation unit 62 may receive a user's instruction through the keyboard 511 or the pointing device 512 of the controller 6 and acquire the second pattern processing parameters by referring to the storage 63 based on the received instruction.

The second pattern parameter designation unit 62 may acquire the processing parameters of the second pattern generated by a user of the manufacturing device 100 using the keyboard 511 or the pointing device 512 of the controller 6.

The processing data generator 64 generates processing data for forming a first pattern configured by a collection of the second pattern based on the pattern data of the first pattern and the processing parameters of the second pattern.

The processing data includes rotation condition data for rotation of the rotating mechanism 3 to rotate the container 1, scan condition data for scanning the processing laser beam 20 by the laser application unit 2, and laser application condition data for applying the processing laser beam 20 by the laser application unit 2 in synchronization with the rotation of the container 1. The moving mechanism 4 includes movement condition data for moving the container 1 in the Y direction and dust collection condition data for performing the dust collection operation of the dust collector 5.

The processing data generator 64 outputs the generated processing data to each of the laser application controller 65, the laser scanning controller 66, the container rotation controller 67, the container movement controller 68, and the dust collection controller 69.

The laser application controller 65 includes an optical intensity controller 651 and a pulse controller 652 for controlling the application of the processing laser beam 20 to the container 1 by the laser light source 21, based on the laser application condition data. The laser application controller 65 controls the laser application timing of the processing laser beam 20 with respect to the container 1 in synchronization with the rotation of the container 1 by the rotating mechanism 3, based on the synchronization detection signal from the synchronization detector 25. Since the known techniques disclosed in such as Japanese Unexamined Patent Application Publication No. 2008-073894 can be applied to the laser application timing control using the synchronization detection signal, the detailed description will not be repeated herein.

When the laser light source 21 includes a plurality of laser beams sources, the laser application controller 65 performs the above-described control independently for each of the plurality of laser beams sources.

The optical intensity controller 651 controls the optical intensity of the processing laser beam 20, and the pulse controller 652 controls the pulse width and laser application timing of the processing laser beam 20.

The laser scanning controller 66 controls the scanning of the processing laser beam 20 by the scanner 23 based on the scanning condition data. Specifically, the laser scanning controller 66 performs the on/off control of the drive of the scanning mirror, the control of the drive frequency, and the like.

The container rotation controller 67 controls the on/off of the rotation drive of the container 1, the rotation angle, the rotation direction, and the rotation speed by the rotating mechanism 3, based on the rotation condition data. The container rotation controller 67 may rotate the container 1 consecutively in a predetermined rotation direction or may reciprocate (oscillate) the container 1 within a predetermined angle range such as ±90 degrees while switching the rotation direction.

The container movement controller 68 controls the on/off of the movement drive, the movement direction, the movement amount, and the movement speed of the container 1 by the moving mechanism 4, based on the movement condition data.

The dust collection controller 69 controls the on/off control of dust collection by the dust collector 5, the air flow rate to be sucked or the flow rate, and the like, based on the dust collection condition data. A mechanism for moving the dust collector 5 may be provided, and movement of the dust collector 5 by the mechanism may be controlled so that the dust collector 5 is disposed near a position where the processing laser beam 20 is applied.

<Example of Manufacturing Method Using Manufacturing Device 100>

Figure 9:
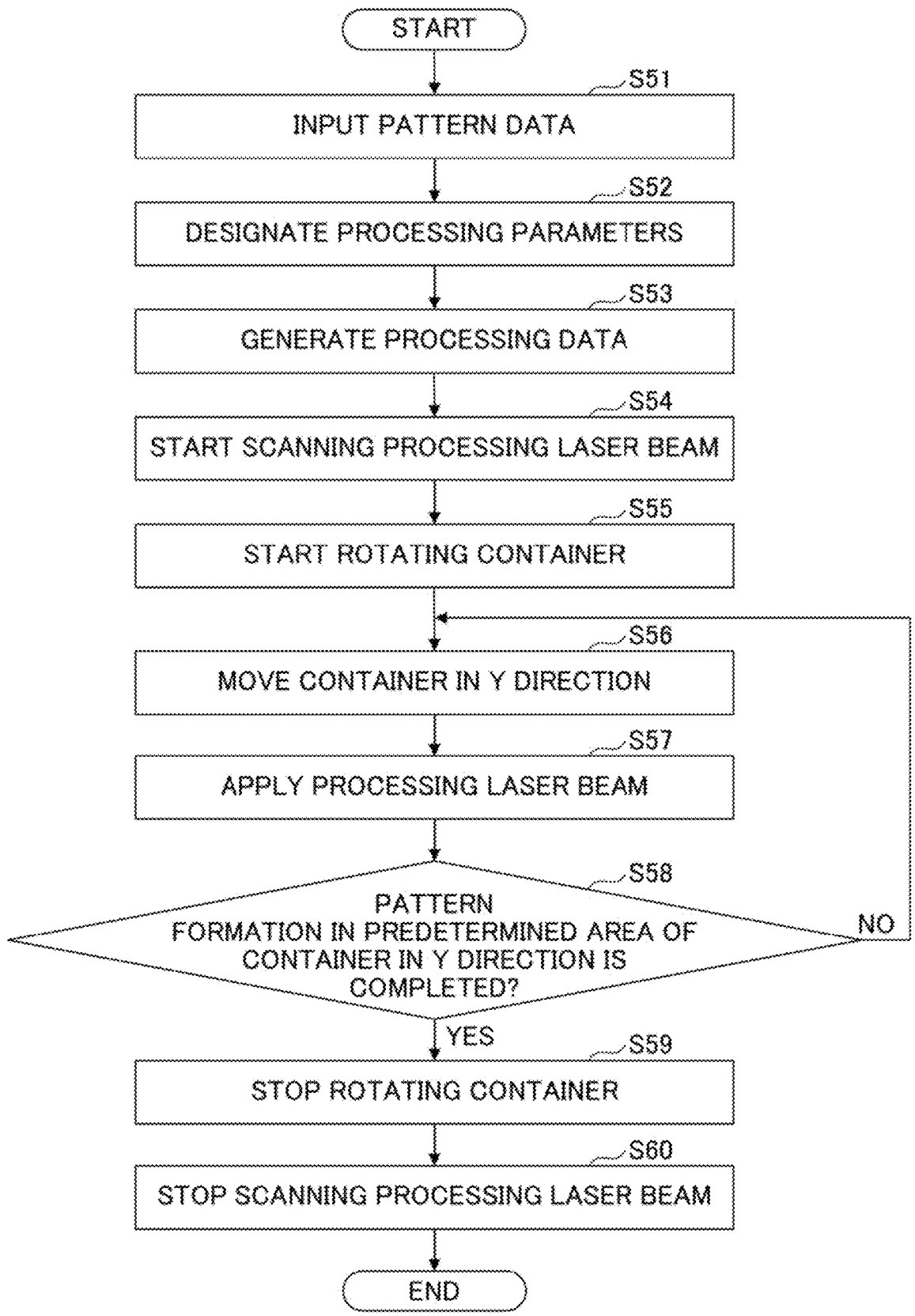
FIG. 9 is a flowchart illustrating an example of a manufacturing method according to an embodiment.

Next, a manufacturing method performed by a manufacturing device 100 will be described. FIG. 9 is a flowchart illustrating an example of a manufacturing method performed by a manufacturing device 100.

First, in step S51, the first pattern data input unit 61 inputs pattern data of the first pattern from an external device such as a PC or a scanner. The first pattern data input unit 61 outputs the input pattern data of the first pattern to the processing data generator 64 and to the second pattern parameter designation unit 62, separately.

Subsequently, in step S52, the second pattern parameter designation unit 62 designates processing parameters for forming the second pattern. The second pattern parameter designation unit 62 acquires and designates the second pattern processing parameters by referring to the storage 63, based on information indicating the type of the first pattern input from the first pattern data input unit 61.

The operations of step S51 and step S52 may be appropriately changed, or these steps may be executed in parallel.

Subsequently, in step S53, the processing data generator 64 generates processing data for forming the first pattern configured by a collection of the second patterns, based on the pattern data of the first pattern and the process parameters of the second patterns. The generated processing data is output to the laser application controller 65, the laser scanning controller 66, the container rotation controller 67, the container movement controller 68, and the dust collection controller 69, separately.

Subsequently, in step S54, the laser scanning controller 66 starts the scanning of the processing laser beam 20 in the Y direction, based on the scanning condition data. In an embodiment, in response to the start of the scanning, the scanner 23 continues the scanning of the processing laser beam 20 in the Y direction until the instruction to stop is given.

Subsequently, in step S55, the container rotation controller 67 starts rotation driving of the container 1 by the rotating mechanism 3, based on the rotation condition data. In an embodiment, in response to the start of the rotation driving, the rotating mechanism 3 continues the rotation driving until an instruction to stop the rotation of the container 1 is given.

Subsequently, in step S56, the container movement controller 68 moves the container 1 to an initial position in the Y direction by a moving mechanism 4 so that the processing laser beam 20 is applied to a predetermined position of the container 1, based on the movement condition data. After completion of the movement to the initial position of the container 1, the container movement controller 68 stops the moving mechanism 4.

It should be noted that the order of the operations in steps S54 to S56 may be switched appropriately, or these steps S54 to S5 may be performed in parallel.

Subsequently, in step S57, the laser application controller 65 starts the laser application control of the processing laser beam 20 with respect to the container 1.

Specifically, the laser application unit 2 scans one line along the Y direction and applies the processing laser beam 20 onto the container 1. Thereafter, the rotating mechanism 3 rotates at a predetermined angle about the cylindrical axis 10 of the container 1. After rotating at a predetermined angle, the laser application unit 2 scans the next one line to apply the processing laser beam 20 onto the container 1. Thereafter, the rotating mechanism 3 rotates at a predetermined angle about the cylindrical axis 10 of the container 1. By repeating such operations, a first pattern is sequentially formed on at least one of the surface or the inside of the base material of the container 1.

Subsequently, in step S58, the laser application controller 65 determines whether or not the formation of the first pattern has been completed in a predetermined area of the container 1 in the Y direction.

When the laser application controller 65 determines that the formation of the first pattern has not been completed in step S58 (No in step S58), the processes from step S56 are repeated again.

Conversely, when the laser application controller 65 determines that the formation of the first pattern has been completed in step S58 (steps S58 and Yes), the rotating mechanism 3 stops the rotation driving of the container 1 in step S59 in response to an instruction to stop by the container rotation controller 67.

Subsequently, in step S60, the scanner 23 stops scanning the processing laser beam 20 in response to an instruction to stop given by the laser scanning controller 66. The laser light source 21 stops application of the processing laser beam 20 in response to an instruction to stop given by the laser application controller 65.

It should be noted that the order of the operations in steps S59 and S60 can be appropriately switched, or the steps S59 and S60 may be performed in parallel.

In this manner, the manufacturing device 100 can form a first pattern made up of a collection of second patterns on at least one of the surface or the inside of the base material of the container 1.

<Examples of Various Data>

Next, examples of various data used in the manufacture of the container 1 will be described.

(Example of Pattern Data)

Figures 10, 11:
FIG. 10 is a diagram illustrating an example of pattern data.
FIG. 11 is a diagram illustrating an example of a correspondence table of the type of a first pattern and processing parameters.

FIG. 10 is a diagram illustrating an example of pattern data of the first pattern input by the first pattern data input unit 61.

As illustrated in FIG. 10, the pattern data 611 includes letter data 612 called "LABELLESS", and the letter data 612 is an object formed on the container 1 as a first pattern. A set of lines forming nine letters "LABELLESS" corresponds to the data for the first pattern. Data other than the letter data 612 in the pattern data 611 is not subject to formation on the container 1.

The pattern data 611 is provided as an image file, such as a bitmap, as an example. The header information of the image file that provides the pattern data 611 includes information representing the type of the first pattern. In this example, the type of the first pattern is a "letter".

The first pattern data input unit 61 outputs the pattern data 611 including information representing "letters" to the second pattern parameter designation unit 62 and to the processing data generator 64, separately.

(Example of a Correspondence Table of the Type of the First Pattern and the Processing Parameters)

FIG. 11 illustrates an example of the correspondence table stored in the storage 63. The correspondence table 631 illustrated in FIG. 11 illustrates the correspondence between the type of the first pattern, such as letters, codes, shapes or photographs, and processing parameter for the second pattern suitable for improving the visibility of the first pattern. This correspondence is predetermined by experiments and simulations.

The numeric values illustrated in the "Identification Information" column of the correspondence table 631 indicates identification information (number) of the first pattern, and the information illustrated in the "Type" column indicates a type of the first pattern. The information illustrated in the "File name" column indicates a file name in which the processing parameters corresponding to the type of the first pattern are recorded.

The second pattern parameter designation unit 62 reads in a file corresponding to information representing the type of the first pattern by referring to the correspondence table 631 and acquires a processing parameter. In the example of FIG. 10, since the type of the first pattern is a "letter", the second pattern parameter designation unit 62 reads out the file "para1" corresponding to the identification information "1" representing the "letter", acquires the processing parameter, and outputs the acquired processing parameter to the processing data generator 64.

(Examples of Processing Parameter)

Figures 12, 13:
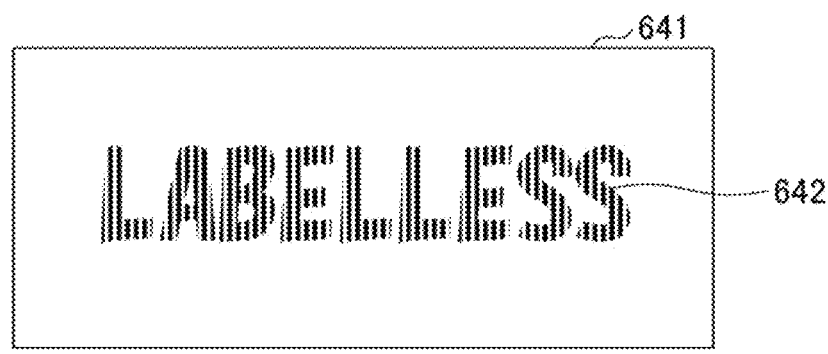
FIG. 12 is a diagram illustrating examples of processing parameters.
FIG. 13 is a diagram illustrating an example of processing data.

FIG. 12 is a diagram illustrating an example of a processing parameter acquired by the second pattern parameter designation unit 62. Depending on the items in the "Item" column of process parameter 621, parameters are illustrated in the "Parameter" column.

(Example of Processing Data)

FIG. 13 is a diagram illustrating an example of processing data generated by the processing data generator 64. The letter data 642 in the processing data 641 is made up of a plurality of straight-line data corresponding to a second pattern. The black area of the processing data 641 corresponds to the area where the properties of the base material of the container 1 are changed by the application of the processing laser beam 20.

<Example of Processing Laser Beam 20>

Next, FIGS. 14A to 14D illustrating examples of the application of the processing laser beam 20 with respect to the container 1, and specifically illustrate three types of laser application examples.

FIGS. 14A to 14D also illustrate a beam spot 201 of the processing laser beam 20 on the surface of the container 1, and three beam spots 201 arranged in a direction perpendicular to the scanning direction (Y direction) of the processing laser beam 20 are scanned in the Y direction.

Such three beam spots 201 can be obtained by juxtaposing the three laser light sources 21 in a direction perpendicular to the Y direction, and applying the processing laser beam 20 from each of the three laser light sources 21.

Figure 14A:
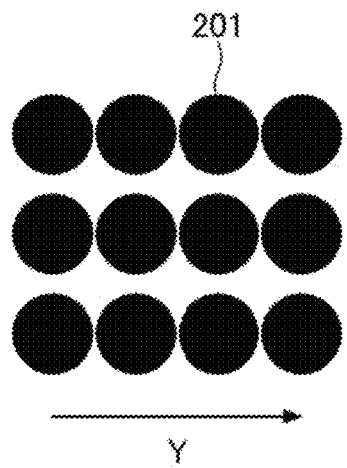
FIGS. 14A to 14F are diagrams illustrating patterning examples formed by being irradiated with a processing laser beam, where
Figure 14B:
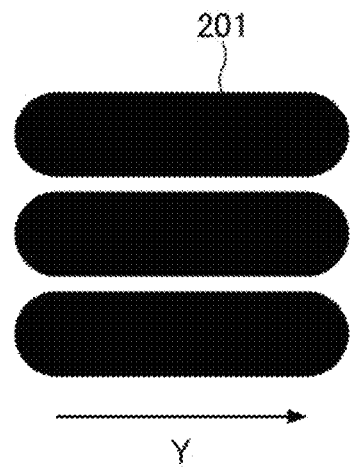

FIGS. 14A and 14B are first examples in which there is a gap between the beam spots 201 in the direction perpendicular to the Y direction. FIG. 14A illustrates a state where there is a gap between the beam spots 201 in a direction perpendicular to the Y direction, and FIG. 14B illustrates a state where the beam spots 201 in FIG. 14A are scanned at a high speed in the Y direction. By high speed scanning, three scan lines are formed by three beam spots 201, and there is a gap between the scan lines in the Y direction. By scanning the beam spots 201 in the arrangement of FIGS. 14A and 14B, the efficiency of the formation of the pattern can be increased.

Figure 14C:
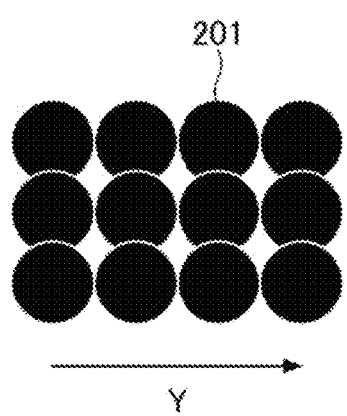
Figure 14D:
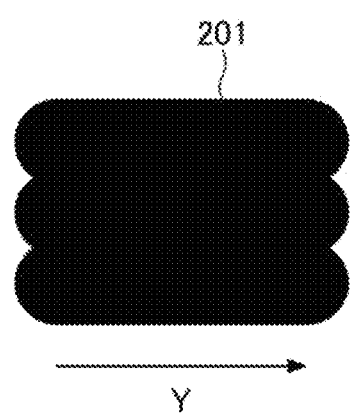

FIGS. 14C and 14D are second examples where the beam spots 201 are superimposed in a direction perpendicular to the Y direction. FIG. 14C illustrates a state in which the beam spots 201 are superimposed in a direction perpendicular to the Y direction, and FIG. 14D illustrates a state in which the beam spots 201 in FIG. 14C are scanned at a high speed in the Y direction. Three scan lines are formed by the beam spots 201 with high speed scanning, and the scan lines are superimposed with each of the in the Y direction. By scanning the beam spots 201 in the arrangement of FIGS. 14C and 14D, the contrast of the pattern can be increased.

Figure 14E:
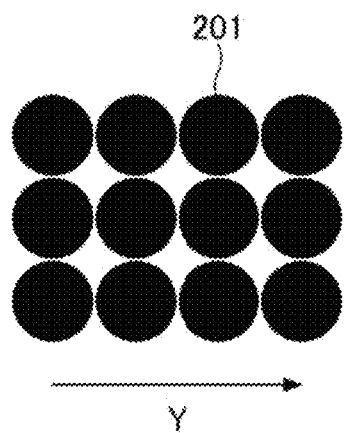
Figure 14F:
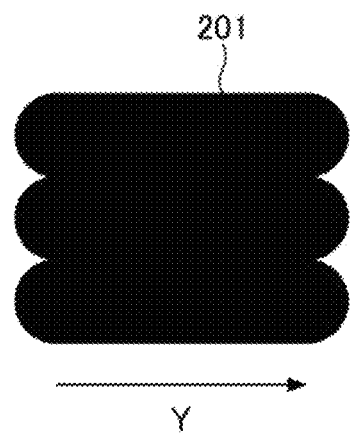

FIGS. 14E and 14F illustrate third examples in which the beam spots 201 come into contact with each other in a direction perpendicular to the Y direction. FIG. 14E illustrates a state in which the beam spots 201 come into contact with each other in a direction perpendicular to the Y direction, and FIG. 14F illustrates a state in which the beam spots 201 in FIG. 14E are scanned at a high speed in the Y direction. Three scan lines are formed by the beam spots 201 with high speed scanning, and the scan lines come into contact with each other in the Y direction. By scanning the beam spots 201 in the arrangement of FIGS. 14E and 14F, the pattern formation efficiency and contrast can be balanced.

These types of laser application examples of the processing laser beam 20 may be combined to form a first pattern formed by a collection of second patterns on the container 1. It should be noted that the number of processing laser beams 20 is not limited to three, and may be one or may be increased even more. The greater the number of processing laser beams 20, the shorter the time it takes to form a pattern.

The diameter of the beam spot 201 is 42.6 μm as an example, and the gap between the laser spots 201 in the direction perpendicular to the Y direction in FIGS. 14A and 14B is 23.6 μm as an example.

FIGS. 14A to 14D are diagrams illustrating the examples in which the processing laser beams are periodically positioned, but the arrangement of the processing laser beams is not limited thereto, and processing laser beams can be arranged in a non-periodic manner.

<Example of Change in Properties of Base Material>

Next, a change in the properties of the base material of the container 1 due to the application of the processing laser beam 20 will be described. FIGS. 15A to 15D are diagrams illustrating examples of a change in the properties of the base material of the container 1 due to the application of the processing laser beam 20.

Figure 15A:
FIGS. 15A to 15E are diagrams illustrating an example of change in shape of the base material of the container, where
Figure 15B:

FIG. 15A illustrates a recess portion shape formed by evaporating the base material on the surface of the container 1, and FIG. 15B illustrates a recess portion shape formed by melting the base material on the surface of the container 1. In the case of FIG. 15B, the periphery of the recess portion is raised, compared to the recess portion in FIG. 15A.

Figure 15C:
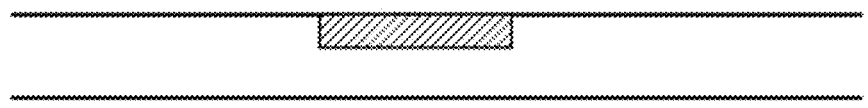
Figure 15D:
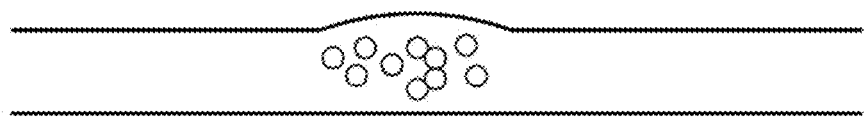

FIG. 15C illustrates a change in crystallization state of the surface of the base material of the container 1, and FIG. 15D illustrates a change in foaming state of the base material inside of the container 1.

Thus, by changing the shape of the surface of the container 1 or the properties such as the crystallization state of the surface of the base material or the foaming state of the inside of the base material, a first pattern made up of the collection of the second patterns can be formed on the surface of the container 1 or the inside of the container 1.

As a method of forming a recess portion shape by evaporating a base material of the surface of the container 1, a pulse laser is applied, for example, with a wavelength of 355 nm to 1064 nm and a pulse width of 10 fs to 500 nm or less. This allows the base material to be vaporized over the area irradiated with the laser beam, forming a microscopic recess portions on the surface.

Illustration of Enlarged View of Second Pattern and First Pattern

FIG. 15F is an enlarged diagram illustrating an example of a second pattern in which a base material of a portion irradiated with a laser beam is evaporated and an area made up of a small recess portion and a protruded portion is formed on the surface of the base material. In the second pattern of this example, there is a mortar-like recess portion and an torus protruded portion raised from the surface of the base material, and a spotted-like area with rough surface is formed in the recess portion and the protruded portion. The surface of this rough area is non-uniformly shaped. In this microscopic area, diffuse reflection of light occurs, so that it is visually distinct from the non-rough area. That is, the microscopic areas including the bend on at least a portion of the outer edge have different optical reflection properties compared to the other peripheral areas. This rough, microscopic area, i.e., the microscopic light-reflective area, appears whiter than the non-rough area (peripheral area), and forms either a microscopic white area (white dot) or a microscopic whitish opaque area (whitish opaque dot).

FIG. 15F illustrates an example of a second pattern. Specifically, the second pattern represents a microscopic area including a bend on at least a portion of the outer edge, the surface of which is non-uniform.

In other words, FIG. 15F illustrates, as an example of a second pattern, a microscopic area including a bend on at least a portion of the outer edge, the surface shape of which is differing from the peripheral area.

Figure 15E:
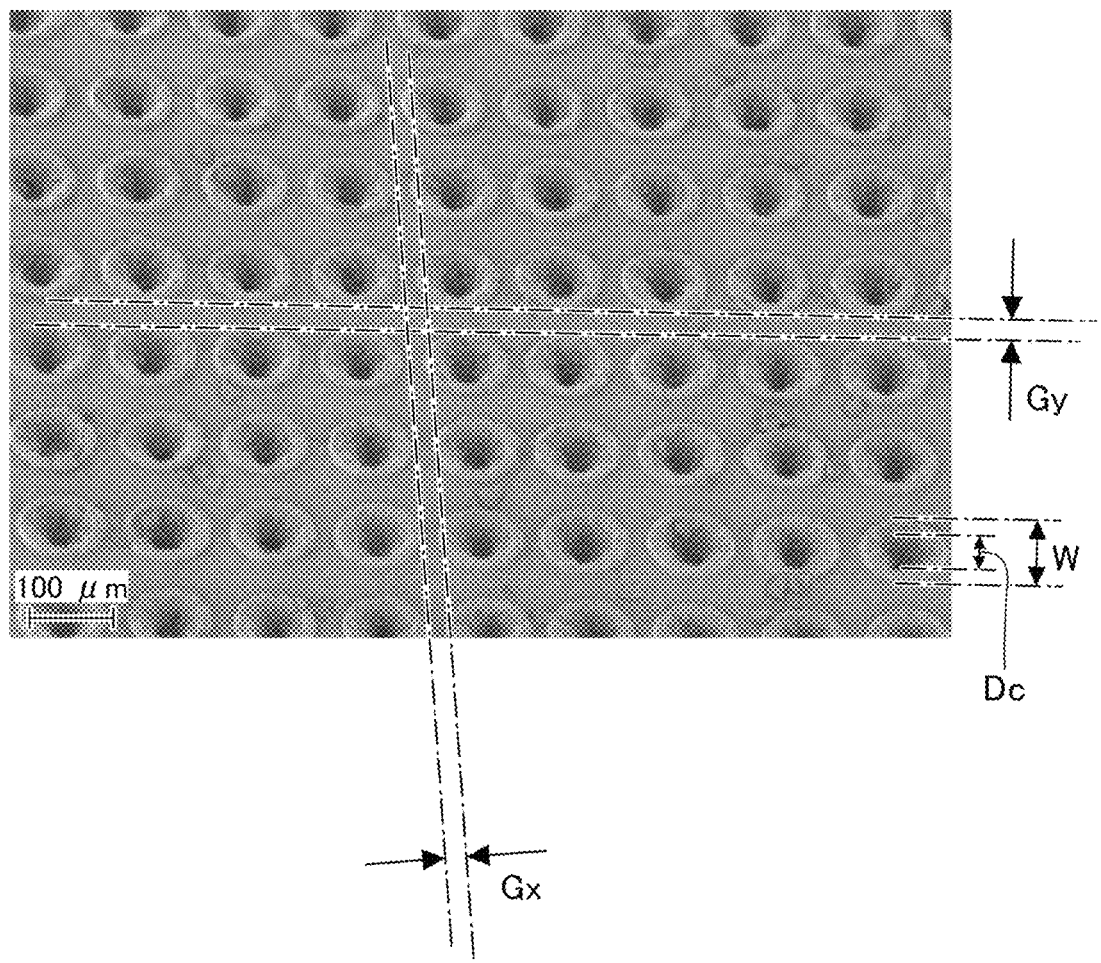

FIG. 15E is an enlarged diagram illustrating an example of a first pattern formed on a base material surface by a collection of second patterns that are microscopic areas. The recognition of the second patterns varies depending on factors such as the number, density, distance, and size of the microscopic areas that are the second pattern.

In general, the greater the number of microscopic areas that are components of the second pattern, the higher the density, and the shorter the distance between the two areas, the higher the recognition or the whiteness of the first pattern.

Also, by application of a CW (Continuous Wave) laser with a wavelength of 355 nm to 1064 nm, a base material may be melted to form a recess portion. If the laser continues to be applied to the base material even after the base material has melted, the inside and the surface of the base material may be foamed to be opacified.

In order to change the crystallization state, for example, a base material PET can be crystallized and opacified by application of a CW laser having a wavelength of 355 nm to 1064 nm, rapidly raising the temperature of the base material, and then slowly cooling down by reducing the power. When the temperature is increased and the laser beam is turned off, and the like, the PET becomes amorphous and transparent.

The change in the properties of the base material of the container 1 is not limited to those illustrated in FIGS. 15A to 15G. The properties of the base material may be changed by yellowing, oxidation reaction, surface modification, or the like of the base material made of a resin material.

<Example of a Container 1 According to the First Embodiment>

Figure 16:
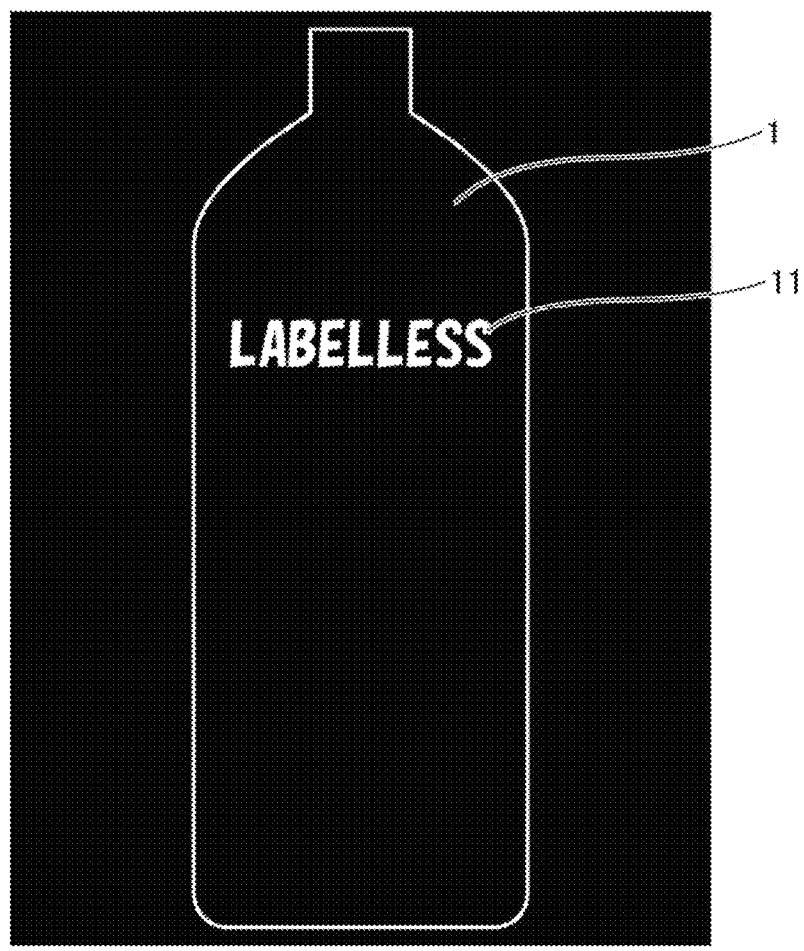
FIG. 16 is a diagram illustrating an example of a container according to a first embodiment.

Next, a container 1 according to the first embodiment will be described. FIG. 16 is a diagram illustrating an example of a container 1. The container 1 is a cylindrical bottle made of resin (transparent resin) that is transparent to visible light.

FIG. 16 illustrates a container 1 in front of a black screen as a background. A black screen background is seen through the transparent container 1. Alternatively, black liquid may be seen in the container 1 through the transparent container 1.

As described above, the container 1 may be a colored base material or a base material having a low light transmittance, and a contrast can be obtained from the portion where the first pattern is not formed by the scattering effect by the first pattern so that the display of letters, barcodes, or the like can be easily viewed.

A string of letters "LABELLESS" 11 is formed on the surface of the container 1. With respect to the background black or the black color of the liquid in the container 1, the string of letters 11 is opacified and visually perceived by diffusion of ordinary light.

A collection of multiple lines constituting nine letters of "LABELLESS" corresponds to a string of letters 11, and the string of letters 11 is an example of the first pattern and is also an example of a first area. The areas of the container 1 on which the letters 11 are not formed are also examples of other areas.

Examples of the resins for the base material of the container 1 include polyvinyl alcohol (PVA), polybutylene adipate/terephthalate (PBAT), polyethylene terephthalate succinate, polyethylene (PE), polypropylene (PP), polyethylene terephthalate (PET), vinyl chloride (PVC), polystyrene (PS), polyurethane, epoxy, biopolypolybutylene succinate (PBS), polylactic acid blend (PBAT), starch blend polyester resin, polybutylene terephthalate succinate, polylactic acid (PLA), polyhydroxy butyrate/hydroxyhexanoate (PHBH), polyhydroxyalkanoic acid (PHA), Bio-PET30, biopolyamide (PA) 610,410, and 510, Bio-PA 1012, and Bio-PA 10T, Bio-PA 11T, and Bio-PA MXD10, biopolycarbonate, Bio-PE, Bio-PET 100, Bio-PA11, Bio-PA1010 or the like.

Of these, biodegradable resins such as polyvinyl alcohol, polybutylene adipate/terephthalate, and polyethylene terephthalate succinate can be used to reduce the environmental burden, and thus are suitable. It is preferable that the biodegradable resin be 100%, but the biodegradable resin may be partially used. For example, a combination of approximately 5%, 10%, and 30% biodegradable resins and other conventional resins can be expected to reduce the environmental burden.

Figure 17:
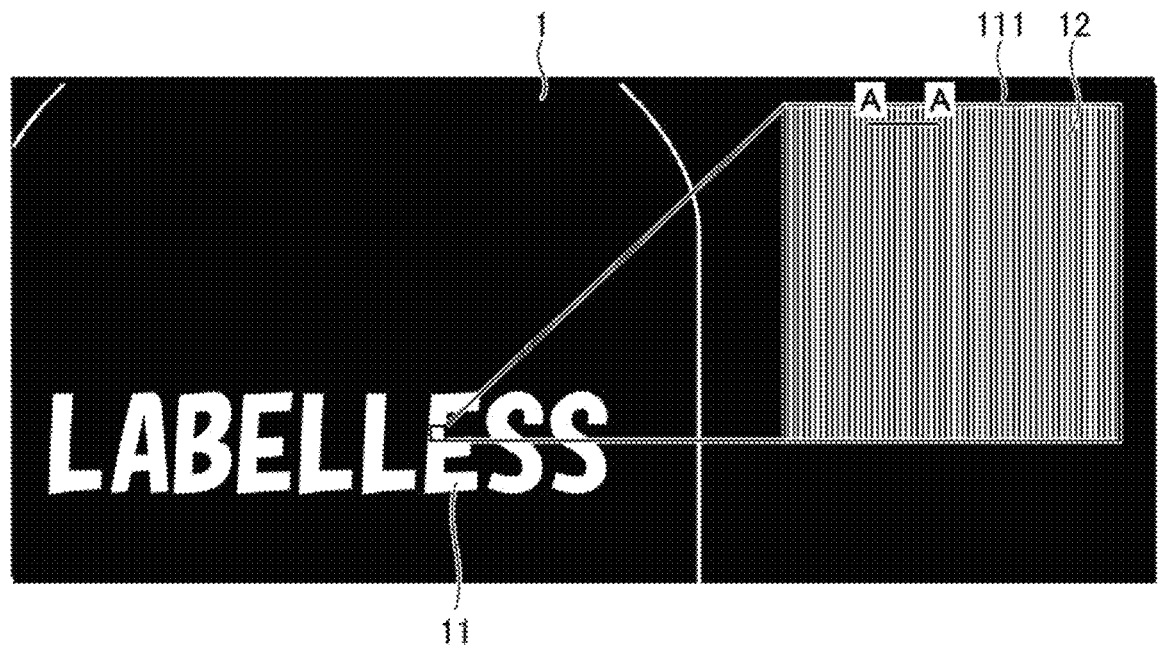
FIG. 17 is a diagram illustrating an example of a relationship between the first pattern and a second pattern.

FIG. 17 is a diagram illustrating an example of the relationship between the first pattern and the second pattern formed on the container 1. The enlarged view 111 in FIG. 17 is an enlarged representation of a portion of the letters 11. As illustrated in FIG. 17, a string of letters 11 of "LABELLESS" is formed on the surface of the container 1, and as illustrated in the enlarged view portion 111 of the diagram in FIG. 17, the string of letters 11 is composed of a plurality of straight lines 12. In other words, the string of letters 11 made up of a collection of straight lines 12. In FIG. 17, straight lines 12 are illustrated only in an area corresponding to the enlarged view portion 111, but the entire string of letters 11 is made up of a collection of straight lines 12.

The white area in the collection of straight lines 12 represents the area where the properties of the base material have changed, and the straight line 12 corresponding to a straight line of one of the plurality of lines indicated in the white area is an example of the second pattern, and is also an example of the second area. A plurality of straight lines 12 is an example of a collection of straight lines 12. The straight line 12 is a pattern smaller than a letter 11. More specifically, the straight line 12 is a pattern having an area of line portions that is less than the sum of the areas of the plurality of line portions forming a letter 11. Thus, the letter 11 is formed including a collection of (fine) straight lines 12 smaller than the letter 11.

Figure 18:
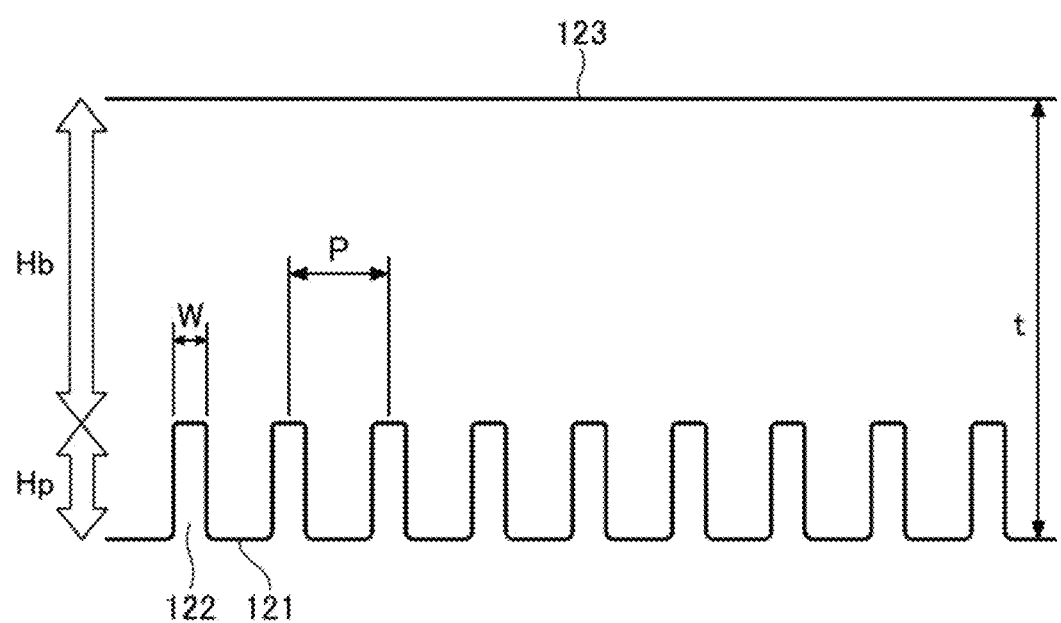
FIG. 18 is a cross-sectional diagram cut along A-A in FIG. 17.

FIG. 18 is a cross-sectional diagram cut along an A-A in the enlarged view portion 111 in FIG. 17. The outer surface portion 121 represents the outer surface of the base material of the container 1. The recess portion 122 also represents a portion formed by evaporation of the surface of the base material of the container 1 upon the application of the processing laser beam 20, and the recess portion 122 corresponds to the straight line 12. The inner surface portion 123 illustrates the surface of the base material inside the container 1 (inside of the container 1).

The thickness t indicates the thickness of the base material of the container 1 and the processing depth Hp indicates the depth of the recess portion 122. The unprocessed depth Hb indicates the depth of the unprocessed portion. The depth of the unprocessed portion is the depth obtained by subtracting the processing depth Hp from the thickness t of the base material of the container 1.

Herein, the distance between adjacent second patterns means the distance between the centers of adjacent second patterns. The spacing P in FIG. 18 illustrates the spacing between adjacent straight lines 12. The width W also indicates the thickness of straight line 12. Since the straight lines 12 in this embodiment is formed with periodicity, the spacing P also corresponds to the period at which the straight line 12 is formed.

Here, it is preferable that the spacing P be 0.4 µm or more and 130 µm or less. By increasing the spacing P to 0.4 µm or more, ordinary light can be diffused without being limited by the wavelength limit of visible light, thereby improving the contrast of the letter 11 which is made up of a collection of straight lines 12.

Further, by setting the spacing P to be 130 µm or less, the resolution of 200 dpi (dots per inch) is guaranteed, and at the same time, the collection of straight lines 12 itself is prevented from being visible, thereby enabling the letters 11 to be visually perceived as a whitish opaque pattern with high contrast. The spacing P of 50 µm or less is more preferred because the spacing P of 50 µm or less ensures that the second pattern itself is not visible.

The above example has been described as a suitable value for the spacing P. When the second pattern has a periodicity, the above preferred value can also be applied to the period. Although FIG. 18 illustrates an example of the constant spacing P, multiple kinds of spacing P may be present without being constant. For example, P1=50 µm, P2=30 µm, P3=60 µm, and P4=100 µm.

FIG. 17 illustrates an example of a second pattern with a narrow spacing with respect to the processing data of the second pattern illustrated in FIG. 13. That is, the letter data 642 of FIG. 13 and the string of letters 11 of FIG. 17 are not associated with each other.

Also, the enlarged view portion 111 in FIG. 17 is a collection of straight lines 12 formed with equal periodicity, but the collection of the second patterns is not limited to the collection of straight lines 12. The second pattern may be made up of a plurality of straight lines 12 formed at different spacing in a non-periodic manner, or the second pattern may be made up of a plurality of points formed periodically or non-periodically, or the like. If the second pattern is a pattern of points, the pattern of points is less than the first pattern, such as the letter 11.

In this embodiment, a second pattern is formed with a rough shape including an outer surface portion 121 corresponding to a protruded portion and a recess portion 122. In the case where the second pattern is formed by the rough shape as described above, it is preferable that the depth difference between the outer surface portion 121 and the recess portion 122 be 0.4 µm or more. The depth difference being set at 0.4 µm or more allows ordinary light to diffuse without being limited by the wavelength limit of visible light, thereby improving the contrast of the letters 11 which are composed of a collection of straight lines 12. Note that an outer surface portion 121 is illustrated as an example of a protruded portion. In a case where the depth is shallower than the recess portion 122, a portion of the outer surface of the container 1 vaporized by applying the processing laser beam 20 may be a protruded portion.

Next, FIGS. 19A to 19D are diagrams illustrating various examples of processing depths Hp.

Figure 19C:
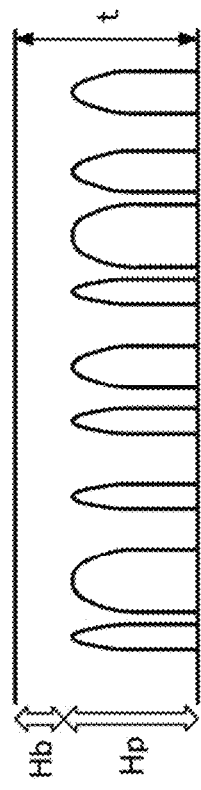
FIGS. 19A to 19D are diagrams illustrating various examples of processing depth, where
Figure 19D:
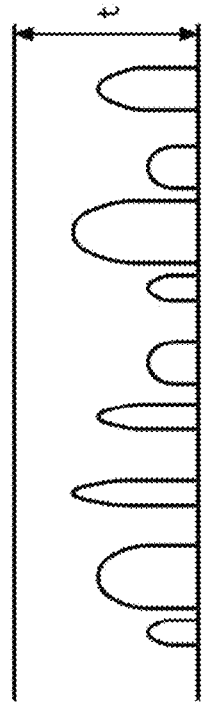
Figure 19A:
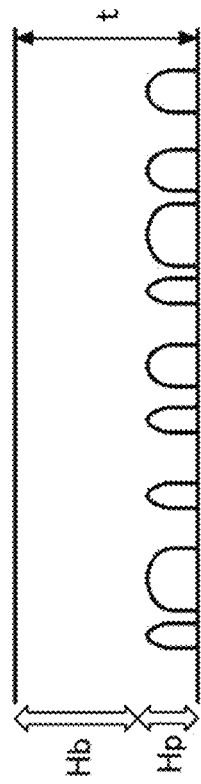

FIG. 19A illustrates a case where the processing depth Hp is shallower than the non-processing depth Hb of the base material. More specifically, the ratio of the processing depth Hp to the non-processing depth Hb is in a ratio range of from 1 or less to 9 or more through to 3 to 7. In this case, the stiffness (mechanical strength) of the second pattern is improved. For example, if the thickness of the base material of the container 1 is between 100 µm and 500 µm, the processing depth Hp is 10 µm.

Figure 19B:
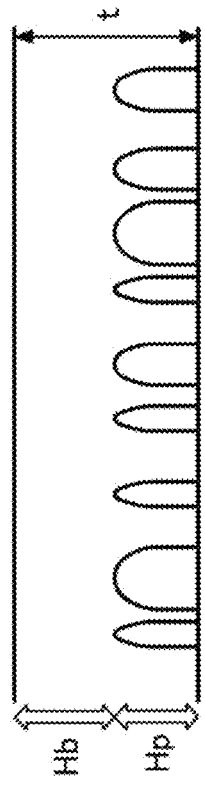

FIG. 19B illustrates a case where the processing depth Hp is deeper than the non-processing depth Hb of the base material. More specifically, the ratio of the processing depth Hp to the non-processing depth Hb is 7:3 to 9 or more:1 or less.

FIG. 19C illustrates a case where the processing depth Hp and the non-processing depth Hb of the base material are similar. More specifically, the ratio of the processing depth Hp to the non-processing depth Hb is 4:6 to 6:4.

FIG. 19D illustrates a case where the processing depth Hp and the non-processing part depth Hb of the base material are changed.

As illustrated in FIGS. 19A through 19D, the optical intensity controller 651 of the laser application controller 65 can be adjust the depth of the processing depth Hp by controlling the optical intensity of the laser light emitted by the laser light source 21.

In the case of a bottle for carbonated beverages (container 1), the thickness of the base material may be thicker than that of a bottle for non-carbonated beverages (container 1) because greater strength is required for the bottle for carbonated beverages compared to the strength required for the bottle for non-carbonated beverages (container 1). In such a case, it is preferable to ensure a sufficient non-processing depth Hb to obtain sufficient strength. For example, a non-processing portion depth Hb of 250 μm to 450 μm is suitable. If a processing depth Hp is required to ensure a renderability, it is preferable to further increase the thickness of the resin to ensure sufficient non-processing depth Hb and processing depth Hp.

<Example of Correspondence Between Laser Light Source and Processing Parameters>

The laser light source 21 used in the manufacturing device 100 is, for example, a pulsed laser having a wavelength of 355 nm, a wavelength of 532 nm, and a wavelength of 1064 nm, with pulse widths ranging from several tens of fs to several hundreds of ns. The CW lasers can also be used, with modulated CW lasers.

The shorter the wavelength of the laser light source as the laser light source 21, the smaller the beam spot diameter, which is suitable for forming a first pattern made up of a collection of finer second patterns.

<Effect of Action of Container 1>

Containers such as PET bottles are widely used because of a variety of advantages such as preservability in the distribution and sale of beverages. Containers distributed in the market are often labeled with trade names, ingredient labels, best before dates, barcodes, QR codes, recycle marks, logos, and the like, to control and promote the sale. Labels can provide useful information to consumers. In addition, by labeling the design to appeal to consumers, it is possible to demonstrate the uniqueness of the product and improve competitiveness.

On the other hand, the problem of marine plastic waste has been reported in recent years, and moves to eliminate environmental pollution caused by plastic waste are becoming increasingly active worldwide. This is not an exception for PET bottles and other containers, and measures are being taken to reduce plastic waste from the viewpoint of reducing waste with consideration for the environment.

Amid this situation, there is a growing demand for recycling of containers. Recycling of containers refers to the recycling of used containers that have been separated and collected into flakes, which are used as the raw materials for containers to produce containers again.

In order to proceed smoothly with recycling, it is preferable to thoroughly separate and collect the containers, labels, caps and other base materials having different materials, such as PET bottles and the like, during the recycling process. In order to thoroughly separate and collect the containers and the like, consumers are required to separate caps and labels from each container. Specifically, the removal of labels is a manual task, which can be troublesome for general consumers and municipal resource recovery companies. Thus, the removal of labels from containers is one of the limitations for thorough separation and collection.

In order to handle such limitations, a technology to provide unlabeled containers is being studied. For example, a method for eliminating labels by printing a pattern onto a container product in an ink-jet fashion for displaying information has been studied.

However, printing ink may be undesirable because residual ink in the recycling process after bottle collection increases impurities. Removal of ink from the container products during recycling to reduce impurities may be undesirable due to lack of control information.

Alternatively, the use of CO2 lasers (carbon dioxide lasers) to form a pattern for displaying information on a main body of a container has been studied.

However, since the wavelength of the laser light source, such as a CO2 laser, is long, the resolution of forming a pattern on the main body of the container decreases due to the increase in the beam spot diameter. As a result, when a pattern with a large amount of information, such as an image, is formed on the container, the contrast of the pattern may be reduced and visibility may be reduced.

In order to handle such limitations, in this embodiment, a container 1 having a first pattern formed by a second pattern is provided on at least one of the surface, the back surface, or the inside of the base material of the container.

The first pattern composed of the second pattern has a higher diffusion property of ordinary light than the first pattern composed of a single stroke. Note herein that a single stroke means that a line or a shape is drawn while continuously applying laser light without interruption. As a result, the contrast of the first pattern to the areas where the first pattern is not formed on the container 1 is improved. In this embodiment, due to the light diffusion effect by the second pattern, the first pattern is visually perceived as being whitish opaque with respect to the area in which the first pattern is not formed, and the whitish opaque area is visually identified as being whiter due to the improved contrast.

Accordingly, even if the first pattern is a pattern having a large amount of information including fine lines or letters, the first pattern can be visually perceived with a high contrast, and the container 1 on which the pattern having a large amount of information is formed with an excellent visibility can be provided. Further, it is possible to provide a base material having images or drawings formed with good visibility as a base material for forming a container 1.

In addition, since the first pattern can be formed without applying impurities such as ink to the main body of the container, the process of removing impurities in the recycling process is unnecessary, and missing management information by removing ink as impurities can be prevented.

Further, by coloring, whitening, and opacifying the first pattern, even when a transparent plastic or transparent glass that is transparent to the visible light is used as a base material of the container 1, the first pattern can be visualized with good contrast. As described above, the container 1 may be a colored base material or a base material having a low light transmittance, and a contrast can be obtained from the portion where the first pattern is not formed by the scattering effect by the first pattern so that the display of letters, barcodes, or the like can be easily viewed.

In this embodiment, an example in which a first pattern is made up of a collection of second patterns by a processing laser beam 20 is illustrated. However, the present invention is not limited to this example, and other processing methods such as mechanical processing are applicable.

Also, laser processing techniques may be applied as means of changing at least one of the shape, crystallization, or foam state of the base material to change the properties of the base material. Since the laser processing techniques enable high-speed processing and preventing the generation of cutting debris, the first pattern made up of the collection of the second patterns can be formed in a cleaner environment.

In this embodiment, the processing depth Hp of the second pattern is adjusted by controlling the optical intensity of the processing laser beam 20 based on the laser application condition data. Thus, it is possible to optimize the contrast of the first pattern or the stiffness of the second patterns.

It is also preferable that the diameter of the processing laser beam 20 in the area where the properties of the base material are varied on the surface or the inside of the container 1 be 1 μm or more and 200 μm or less. The diffusion efficiency of the ordinary light by the first pattern, which is made up of a collection of the second patterns, can be improved, and the formation efficiency of the first pattern can be secured.

When the beam spot diameter is smaller than 1 μm, the wavelength of the laser beam becomes approximately the wavelength of the visible light, so that it is impossible to scatter the light with the structure processed with the beam spot diameter, and thus the whitish opacification cannot be achieved. Also, if it is larger than 200 μm, the structure can be recognized by the human eye. It is preferable that the diameter of the processing laser beam 20 be 1 μm or more and 200 μm or less by such use. Further, it is further preferred to have a fabricated laser beam diameter of 1 to 100 μm or less in order to ensure that even a person with good vision cannot see the structure.

In addition, it is preferable that the spacing between the adjacent second patterns be 0.4 μm or more and 130 μm or less. By setting the spacing to 0.4 μm or more, the ordinary light is diffused without being limited by the wavelength limit of visible light, thereby improving the contrast of the first pattern. In addition, by setting the spacing to 130 μm or less, the resolution of 200 dpi (dots per inch) is guaranteed, and the second pattern itself is prevented from being visualized, so that the first pattern can be visualized with high contrast as a whitish opaque pattern.

In addition, it is preferable that the second pattern be formed at a predetermined periodicity, so that the periodic information can be used as a processing parameter, and the processing parameter for forming the second pattern can be simplified.

In addition, when the second pattern is configured with a rough shape, it is preferable that the difference in the depth between the recess portion and the protruded portion in the rough shape be set at 0.4 μm or more. In this way, the diffusion of the ordinary light by the second pattern can be ensured, and the contrast of the first pattern can be improved.

In addition, it is preferable that the collection is composed of in a range of two or more second patterns to five or less second patterns, the whitish opacification can be better performed by the number of the second patterns with this range.

Moreover, if biodegradable resin is used as the base material of the container 1, it is possible to reduce the environmental burden. Hence, the biodegradable resin is more suitable because the biodegradable resin does not generate resin waste. In this case, it is preferable that the ratio of the biodegradable resin with respect to the resin constituting the container 1 be 100%, but even when this ratio is approximately 30%, the environmental burden is significantly reduced.

Figure 20:
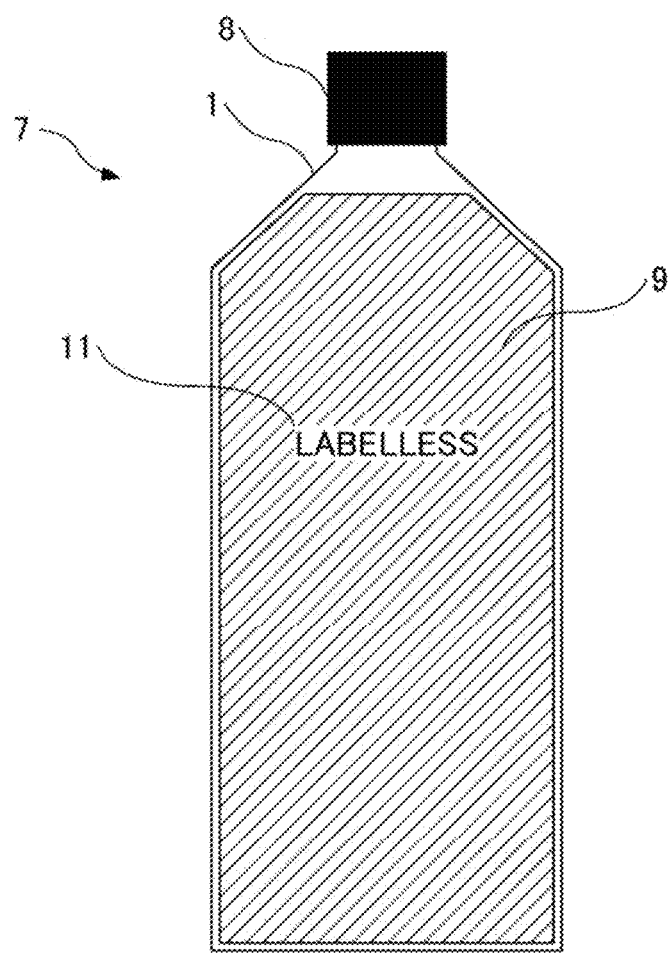
FIG. 20 is a diagram illustrating an example of a container product according to an embodiment.

The embodiments also provide a container product configured to by a container 1 filled with contents. FIG. 20 is a diagram illustrating an example of such a container product 7. The container product 7 includes a container 1, a sealing member 8, such as a cap, and contents 9, such as a liquid beverage contained in the container 1. A string of letters 11 "LABELLESS" is formed on the surface of the container 1.

The contents 9 often have a color such as black, brown, or yellow. A mouth (opening) of the container product 7 is provided with a threaded portion for screwing and fixing with the sealing member 8. Further, a threaded portion is provided inside the sealing member 8 for screwing with the threaded portion provided in a mouth (opening) of the container product 7.

A method for manufacturing a container product 7 includes the following three modes.

Mode 1:

A method for manufacturing a container product 7 includes
  forming a pattern on a container 1;
  subsequently filling the container 1 with contents 9; and
  then sealing the container 1 filled with contents 9 with a sealing member 8.

Mode 2:

A method for manufacturing a container product 7 includes
  filling a container 1 with contents 9;
  sealing with a sealing member 8 the container 1 filled with the contents 9; and
  then forming a pattern on the container 1 sealed with the sealing member 8.

Mode 3:

A method for manufacturing a container product 7 includes
  forming a pattern on a container 1 while the container 1 is filled with contents 9; and
  then sealing with a sealing member 8 the container 1 filled with contents 9.

Second Embodiment

Next, a second embodiment will be described.

In the second embodiment, an image is applied as the first pattern formed on the container 1, and each of a plurality of pixels constituting the image is configured by a collection of the second patterns. In addition, by making the spacing between the second patterns as the difference between pixels, the image as the first pattern can be represented with a multi-value gradation.

Figure 21:
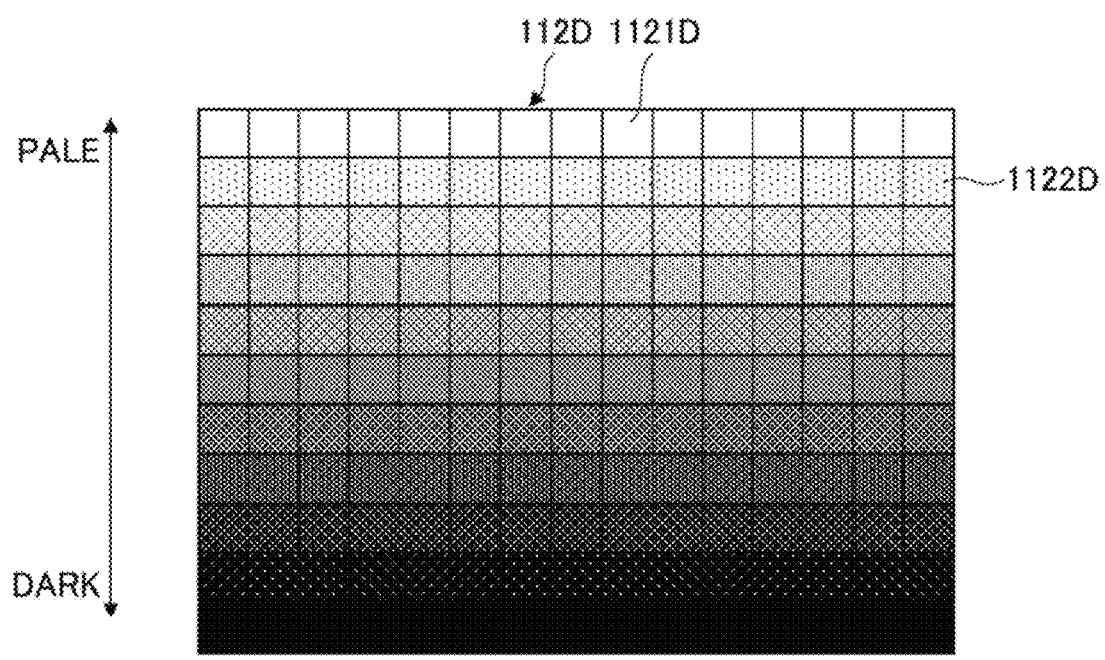
FIG. 21 is a diagram illustrating an example of a gradation expression represented by a second pattern.

FIG. 21 is a diagram illustrating an example of a gradation expression in which the spacing between the second patterns is represented by the difference between pixels, and In FIG. 21, the processed image data 112D corresponds to the first pattern formed on the container 1. The pixels 1121D represented by the square in FIG. 21 indicate the pixels forming the processed image data 112. The processed image data 112D is composed of a plurality of pixels 1121D.

In this embodiment, the second pattern is a pattern of points, each of the plurality of pixels 1121D being composed of a collection of point data 1122D. The point data 1122D illustrated in the black area in the processed image data 112D corresponds to the area where the properties of the base material are changed by the application of the processing laser beam 20.

In FIG. 21, the spacing between adjacent point data 1122D is widened as the arrow is directed upward, and the spacing between adjacent point data 1122D is narrowed as the arrow is directed downward. The wider the spacing between adjacent point data 1122D, the lower the diffusion of ordinary light and the lower the concentration of the whitish opaque first pattern when the pattern of points is formed on the container 1. Meanwhile, as the spacing between adjacent point data 1122D is narrowed, the diffusion of ordinary light increases and the concentration of the whitish opaque first pattern increases when the pattern of points is formed on the container 1.

As described above, the gradation (gray scale) of the image is represented by making the spacing between the second patterns as the difference between pixels.

Herein, FIG. 21 illustrates an example in which the gradation is represented by a pattern of points having periodicity, but the gradation expression method is not limited to this example. For example, a gradation may be expressed by making the uneven shape of the surface of the container 1 not perpendicular to the surface 1 of the container but at a certain angle to the surface of the container 1. Such a rough shape processing can be performed by applying the processing laser beam 20 at a certain angle rather than perpendicular to the surface of the container 1. This maintains the strength of the container 1 and enhances the pattern by the angle (direction of visualization).

In addition to angular processing in one direction for one container 1, a plurality of angular processing (e.g., processing of shoulder portions and processing of side surface) may be performed. A process of tilting in multiple directions in a single process step may be performed.

Figure 22A:
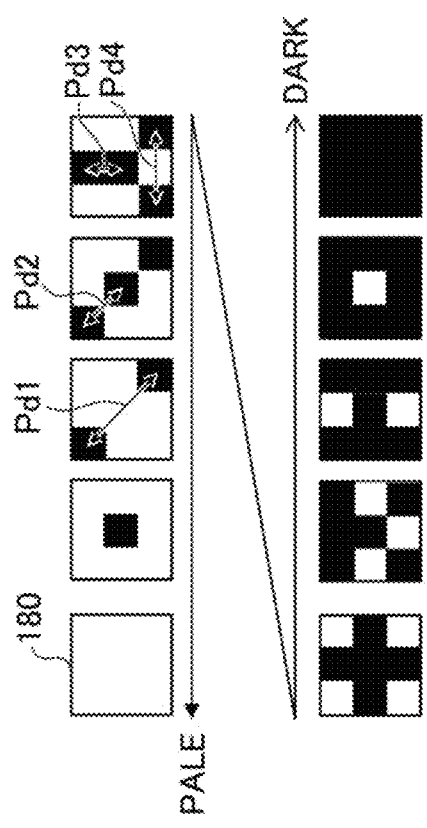
FIGS. 22A to 22C are diagrams illustrating another example of a gradation expression represented by the second pattern, where
Figure 22B:
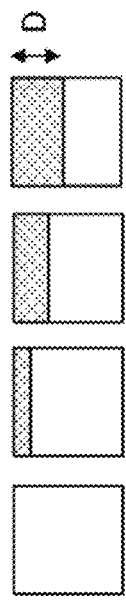
Figure 22C:
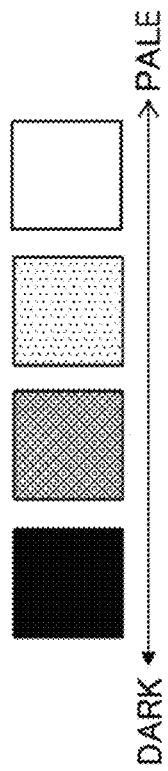

FIGS. 22A to 22C are diagrams illustrating other examples of a gradation expression with second patterns. FIG. 22A is a diagram illustrating the processing data of the second patterns without periodicity. In FIG. 22A, a pixel 180 represents one pixel and the pixel 180 consists of rectangular point data in non-periodic arrangement. The direction of the arrow illustrated indicates the shading of pixel density, and the more point data in the pixel 180, the denser the density.

The spacing Pd1 to Pd4 in FIG. 22A illustrates the spacing between adjacent point data in the arrangement of the various point data in the pixel 180, which corresponds to the spacing between point patterns formed on the container 1.

Meanwhile, FIG. 22B is a diagram illustrating a cross-section of second patterns formed by a change in crystallization state. FIG. 22C is a plan view of FIG. 22B.

FIGS. 22B and 22C illustrate an example in which the diffusion of ordinary light due to the second patterns is changed and the concentration of the first pattern is changed by changing the crystallization depth D to crystallize the base material of the container 1. The deeper the crystallization depth D, the greater the diffusion of ordinary light and the greater the white concentration in whitish opacification (becomes white).

Figure 23:
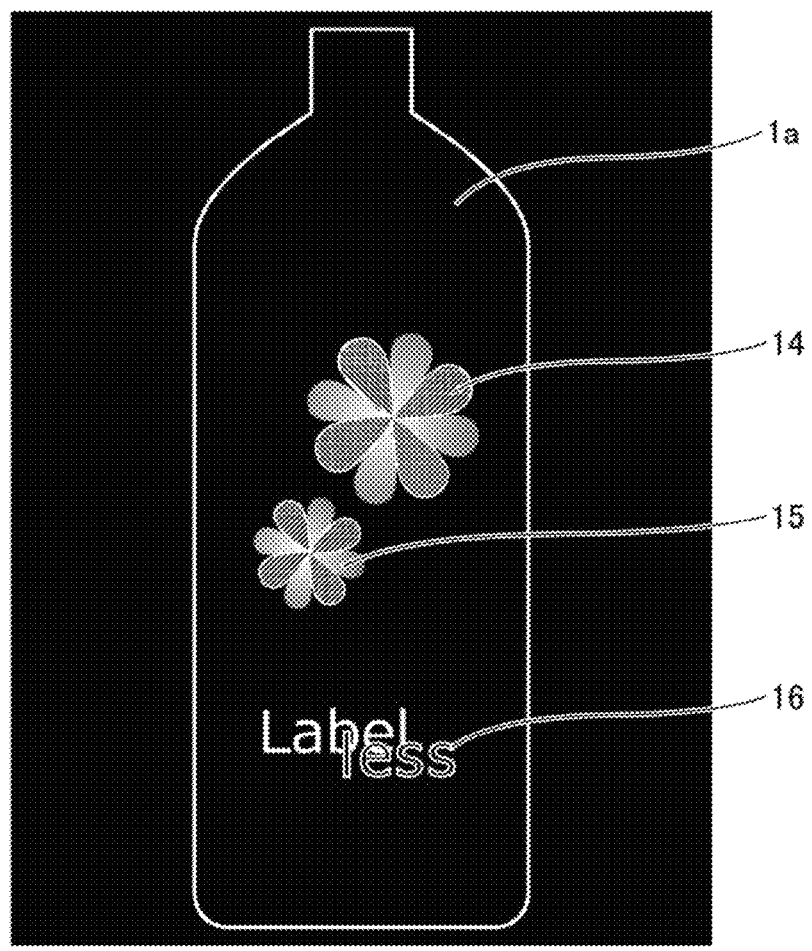
FIG. 23 is a diagram illustrating an example of a container according to a second embodiment.

Next, FIG. 23 is a diagram illustrating an example of a container 1a according to the second embodiment. Images 14 and 15 represented by multi-valued gradations are formed on the container 1a. Further, an image 16 formed by superimposing letters is formed.

Each of images 14, 15, and 16 is made up of a plurality of pixels, each pixel being made up of a collection of point patterns as a second pattern. The gradation is expressed by making the spacing between adjacent point patterns represented by the difference between pixels. Each of such images 14, 15, and 16 is an example of a first pattern.

As described above, in this embodiment, the first pattern formed on the container 1 is an image, each of the plurality of pixels constituting the image is composed of the collection of the second patterns, and the spacing between the second patterns is the difference between the pixels. Thus, by changing the diffusivity for each pixel, the concentration of the first pattern formed on the container 1 can be changed for each pixel, and the first pattern can be represented by a multi-value gradation.

Third Embodiment

Next, a container 1b according to a third embodiment will be described.

The container 1b according to the third embodiment includes a mouth (an opening), a shoulder connected to the mouth, a body connected to the shoulder, and a bottom connected to the body. A first pattern made up of a collection of second patterns is formed on the shoulder of the container 1b, thereby making the first pattern more visible when the container 1b is viewed from the mouth (opening) side.

Figure 24:
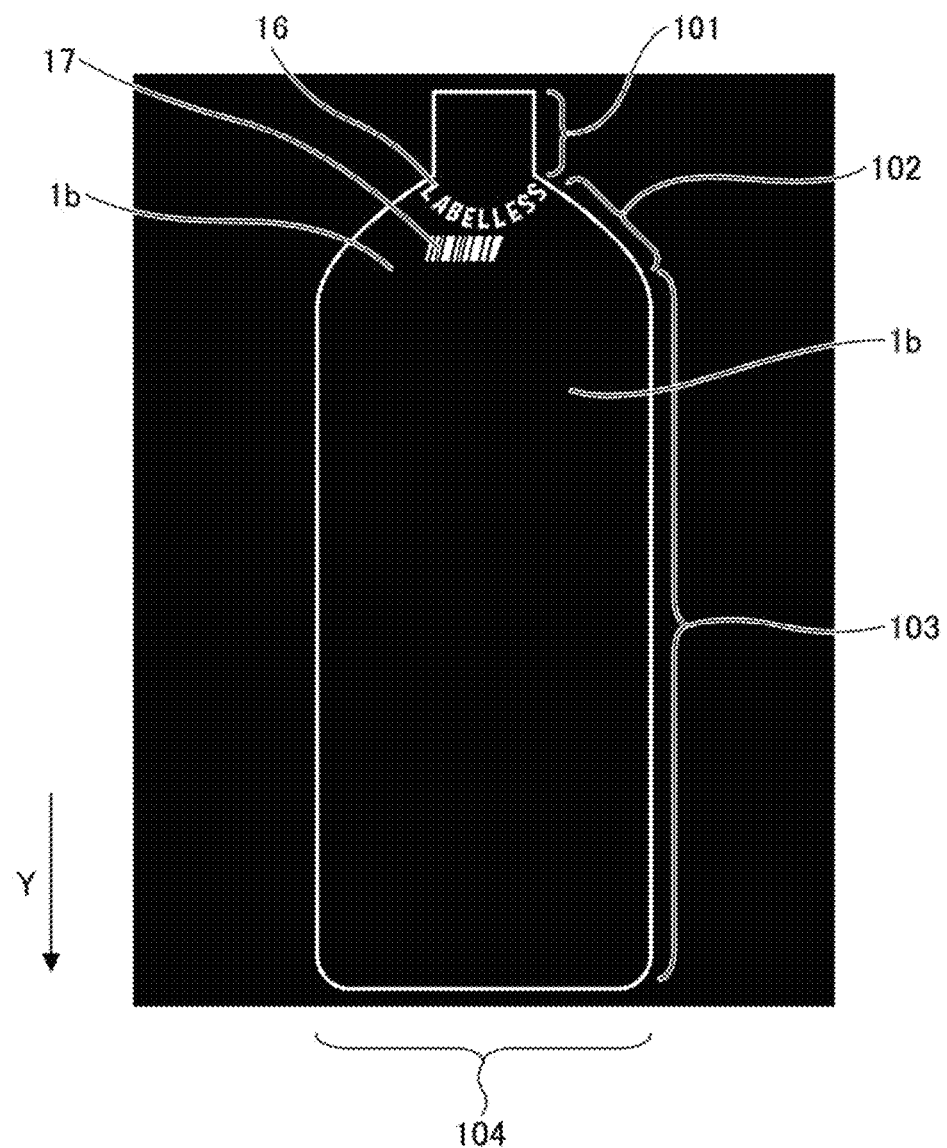
FIG. 24 is a diagram illustrating an example of a container according to a third embodiment.

FIG. 24 is a diagram illustrating an example of a container 1b according to the present embodiment. As illustrated in FIG. 24, the container 1b is a cylindrical bottle that includes a mouth (opening) 101, a shoulder 102, a body 103, and a bottom 104.

The mouth 101 is a portion of an inlet for introducing contents such as a beverage into the container 1b. A cap may be provided on the container 1b to plug the container 1b so that the contents contained within the container 1b does not spill.

The shoulder 102 is a conical portion connected to the mouth 101 with the mouth 101 side being located at the vertex. The body 103 is a cylindrical portion connected to the shoulder 102 and having an axis along the Y-direction indicated by an arrow in FIG. 24 as a cylindrical axis. The shoulder 102 is inclined with respect to the cylindrical surface of the body 103.

The bottom 104 is a bottom portion of the container 1b connected to the body 103.

A string of letters "LABELLESS" 16 and a barcode 17 are formed on the shoulder 102 of the container 1b. Each of the letters 16 and the barcode 17 is composed of a collection of second patterns.

Figure 25:
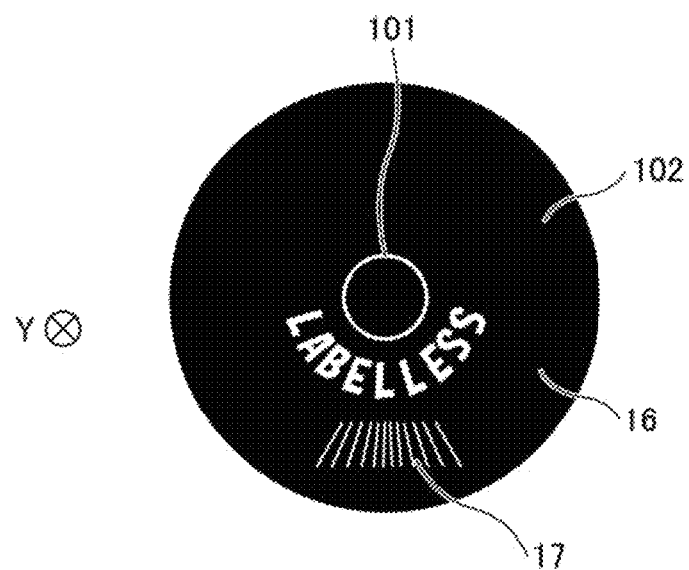
FIG. 25 is a diagram illustrating a container according to the third embodiment viewed from an opening side.

FIG. 25 is a view of the container 1b viewed from the mouth 101 side. In other words, FIG. 25 is a view of the container 1b viewed from a positive Y direction toward a negative Y direction. As illustrated in FIG. 25, when the letters 16 and the barcode 17 are formed on the shoulder 102, the shoulder 102 is inclined with respect to the body 103, so that when a user (consumer) of the container 1b is viewed from the mouth 101 side, the letters 16 and the barcode 17 are oriented toward the user. Thus, compared to the case where the letters 16 and the barcode 17 are formed on the body 103, the user can easily see the letters 16 and the barcode 17.

Figure 26:
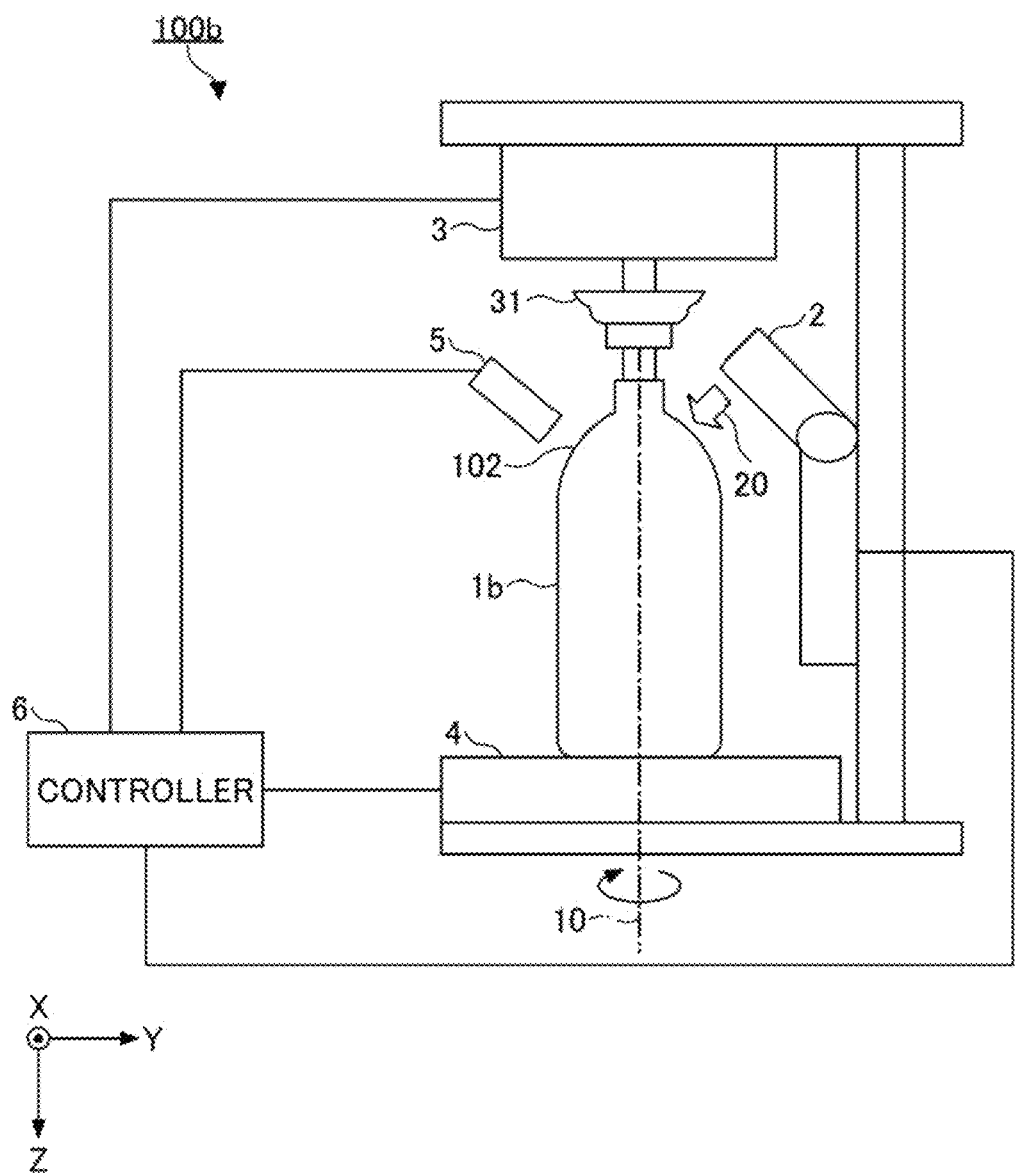
FIG. 26 is a diagram illustrating a configuration example of a manufacturing device (optical marking device) of a container according to the third embodiment.

Next, FIG. 26 is a diagram illustrating an example of a configuration of a manufacturing device 100b for manufacturing the container 1b. The manufacturing device 100b holds the container 1b such that the cylindrical axis 10 of the container 1b is directed along the Z direction. The laser application unit 2 is disposed at a position facing the shoulder 102 of the container 1b so as to apply the processing laser beam 20 toward the shoulder 102 of the container 1b. The laser application unit 2 is fixed to a main body of the manufacturing device 100b by means of a fixing member such as a screw or a bolt for adjusting the angle of the laser application.

This configuration of the manufacturing device 100b allows the processing laser beam 20 to scan the shoulder 102 at a position facing the shoulder 102, making it easier to form a first pattern made up of a collection of second patterns onto the shoulder 102, which is an inclined portion of the container 1.

Figure 27:
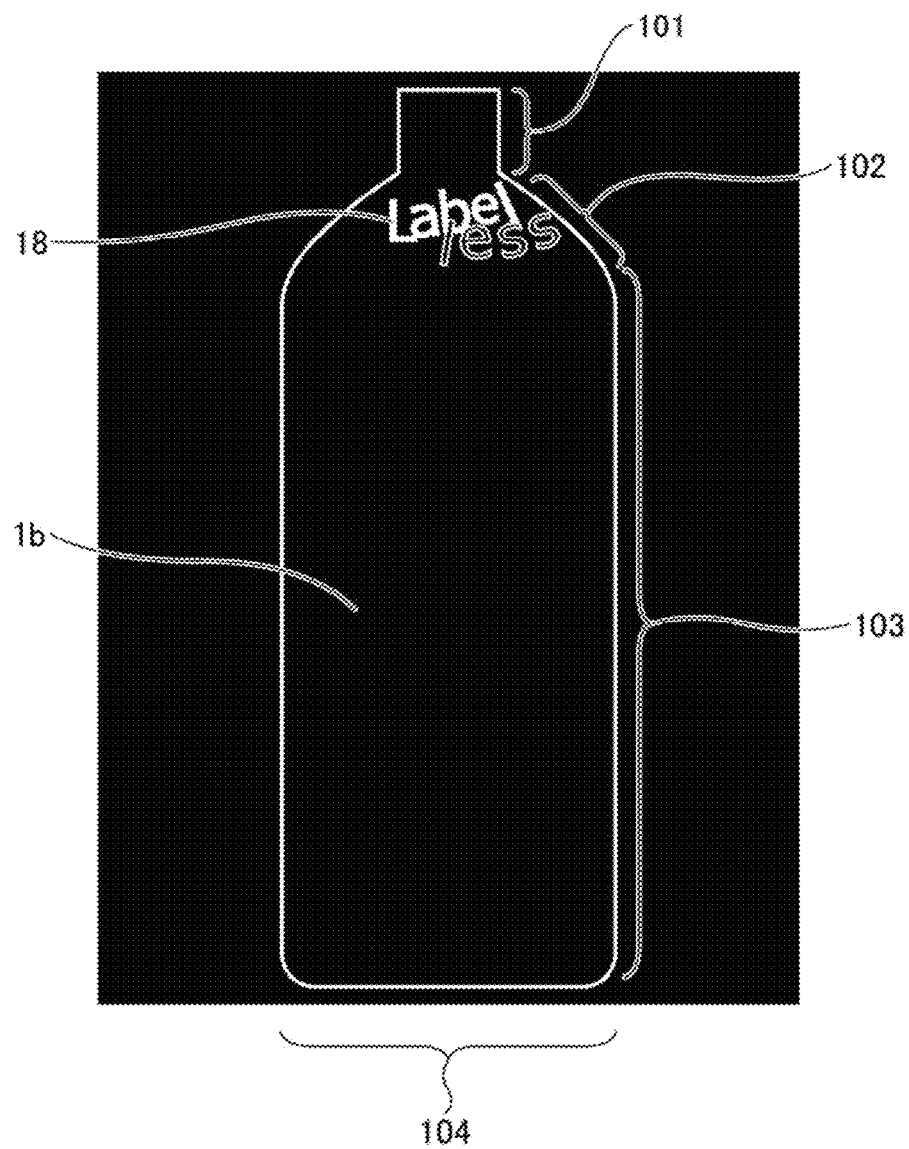
FIG. 27 is a diagram illustrating another example of a container according to the third embodiment.

FIG. 27 illustrates another example of the container 1b. A string of letters 18 is a pattern formed by superimposed letters, and the string of letters 18 is formed on the shoulder 102 of the container 1b.

As described above, in this embodiment, a first pattern constituted by a collection of second patterns is formed on the shoulder 102 of the container 1b, which includes a mouth 101, a shoulder 102 connected to the mouth 101, a body 103 connected to the shoulder 102, and a bottom 104 connected to the body 103. Thus, when the container 1b is viewed from the mouth 101 side, the first pattern is easily visible.

As a result, for example, even when the bottom 104 of the container 1b is placed in a storage case or the like with the bottom 104 facing downward, the information indicated by the first pattern can be easily viewed without removing the container 1b from the storage case, thereby efficiently managing the container 1b or the contents of the container 1b. A case in which the bottom 104 of the container 1b is placed in a box or the like with the bottom 104 facing downward includes, for example, a case in which the container 1b is a PET bottle for beverage and a plurality of PET bottles are stored in a storage case.

In addition, a first pattern may be formed on the bottom 104 of the container 1b in a case where the bottom of the storage case is transparent or a through hole is provided at the bottom of the storage case, so that the container 1b is visible from the bottom of the storage case.

Figure 28:
FIG. 28 is a diagram illustrating a container according to the third embodiment viewed from a bottom side.

FIG. 28 is a diagram illustrating an example in which a first pattern composed of a collection of second patterns is formed on the bottom 104 of the container 1b. As illustrated in FIG. 28, a string of letters 19 "LABELLESS" is formed as an example of the first pattern on the bottom 104.

Since the first pattern is formed on the bottom 104, the information displayed by the first pattern is easily visible from the bottom side of the storage case without removing the container 1b from the storage case, thereby efficiently managing the container 1b or the contents of the container 1b.

Fourth Embodiment

Figure 29A:
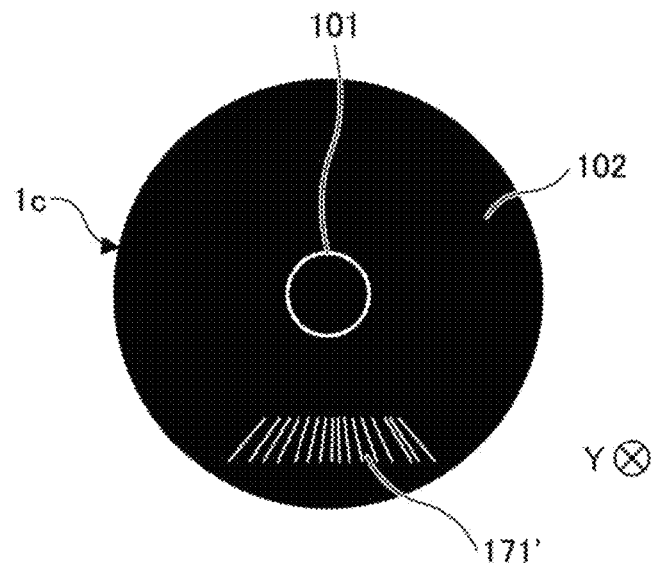
FIG. 29A is a diagram illustrating a barcode according to a comparative example viewed from an opening side.
Figure 29B:
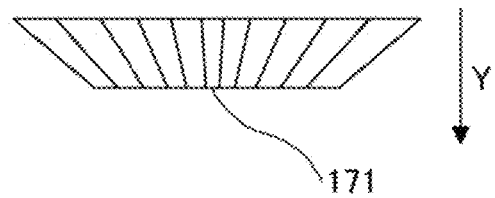
FIG. 29B is a diagram illustrating a barcode according to a fourth embodiment.
Figure 29C:
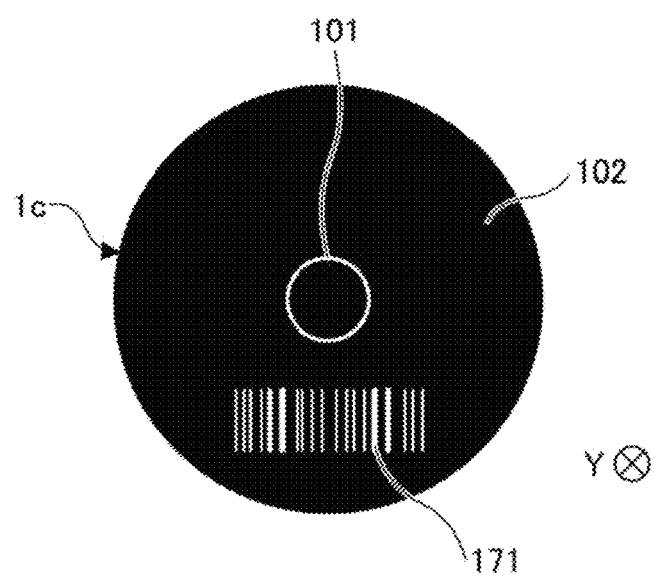
FIG. 29C is a diagram illustrating the barcode according to the fourth embodiment viewed from an opening side.

Next, a fourth embodiment will be described. FIGS. 29A to 29C are diagrams illustrating examples of a container 1c according to the fourth embodiment. A barcode is formed on the container 1c as an example of a first pattern composed of a collection of second patterns.

Herein, when the shoulder of the container is formed in a conical shape with the mouth side being located at the vertex, and the first pattern formed on the shoulder is viewed from the mouth side, the width of the first pattern may be visually perceived as being widen as the shoulder is moved away from the mouth side.

FIG. 29A is a diagram illustrating a barcode 171' as the first pattern according to a comparative example formed on the shoulder 102 of the container 1c viewed from the mouth side. As illustrated in FIG. 29A, the rectangular barcode 171' is perceived as more spread out when viewed further away from the mouth 101. Accordingly, the barcode 171' may not be properly read from the mouth 101 side.

Accordingly, in the fourth embodiment, a barcode 171 formed on the shoulder 102 is perceived as narrower when viewed further away from the mouth 101. FIG. 29B illustrates an example of such a barcode 171. The negative Y direction in FIG. 29B corresponds to the mouth 101 side, and the barcode 171 is narrowed as the barcode 171 is viewed further away from the mouth 101.

FIG. 29C is a diagram illustrating the barcode 171 formed on the shoulder 102 of the container 1c viewed from the mouth 101 side. The barcode 171 is a pattern that is narrowed as the barcode 171 is viewed further away from the mouth 101. When the barcode 171 is viewed from the mouth 101 side, the widening of the barcode 171 is cancelled out as the barcode 171 is viewed further away from the mouth 101, and is correctly viewed as a rectangular barcode. The width of the barcode 171 is preferably adjusted to correspond to the inclined angle of the shoulder 102 with respect to the body 103.

Thus, in fourth embodiment, the barcode 171 is formed on the shoulder 102 that becomes narrower as the barcode 171 is viewed further away from the mouth 101. This prevents the barcode 171 from being broadened and perceived as the barcode 171 is viewed further away from the mouth 101, and allows appropriate reading of codes such as the barcode 171 and QR code from the mouth 101 side. The reading of the code includes not only reading the code visually by a user but also reading the code by a reading device such as a barcode reader or a QR code reader.

While the embodiments have been described above, the present invention is not limited to the above specifically disclosed embodiments, and various modifications and alterations are possible without departing from the scope of the claims.

The moving mechanism 4 (see FIG. 5A) in the manufacturing device 100 may be a conveyor or the like that continuously moves, and the holding of the container 1 achieved by the weight of the container 1 and the contents, and the holding of the container 1 containing the contents may be achieved by merely being placed.

Figure 30:
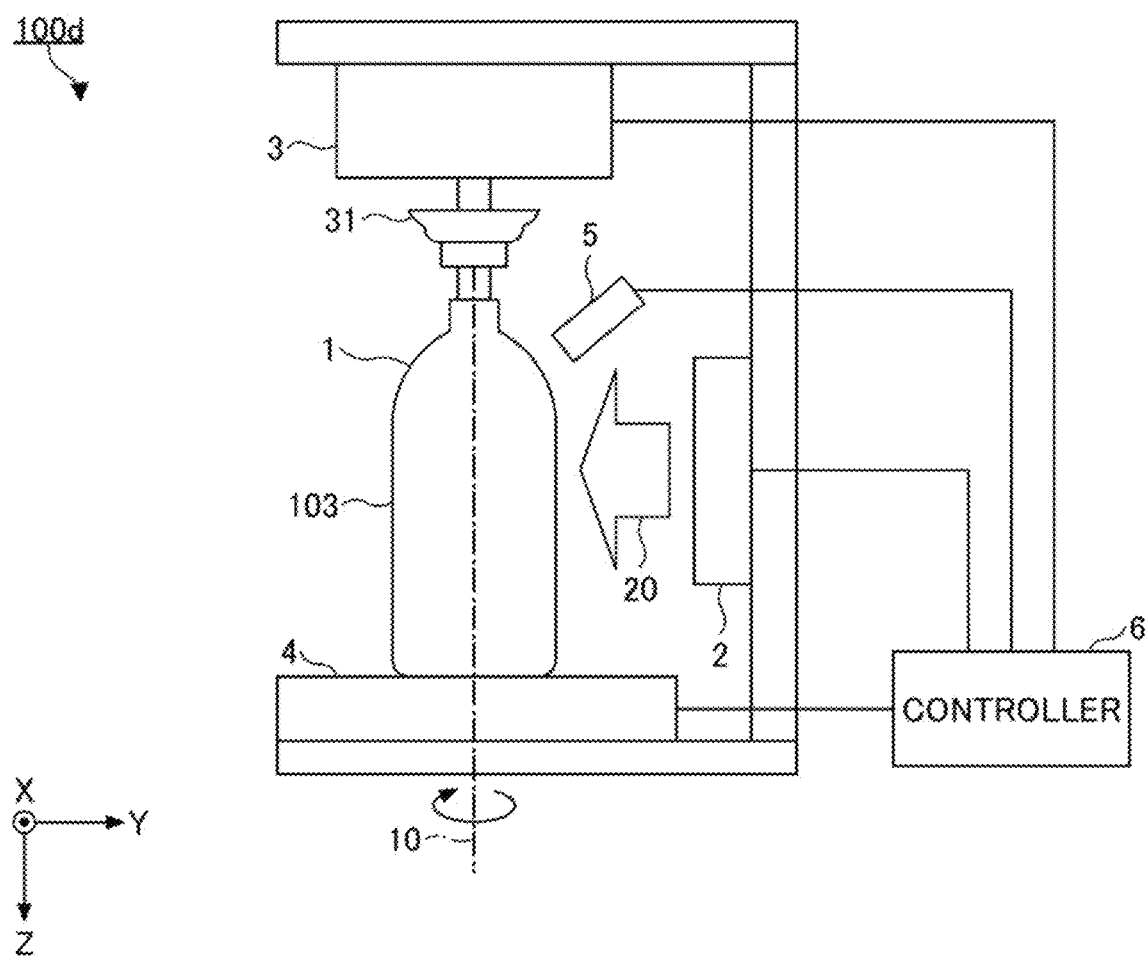
FIG. 30 is a diagram illustrating a configuration example of a manufacturing device (optical marking device) of a container according to a first modification.

FIG. 30 is a diagram illustrating an example of a configuration of a manufacturing device 100d according to a first modification. The manufacturing device 100d holds the container 1 so that the cylindrical axis 10 of the container 1 is directed along the Z direction. The laser application unit 2 is disposed at a position facing the body 103 of the container 1 so as to apply the processing laser beam 20 toward the body 103 of the container 1.

Figure 31:
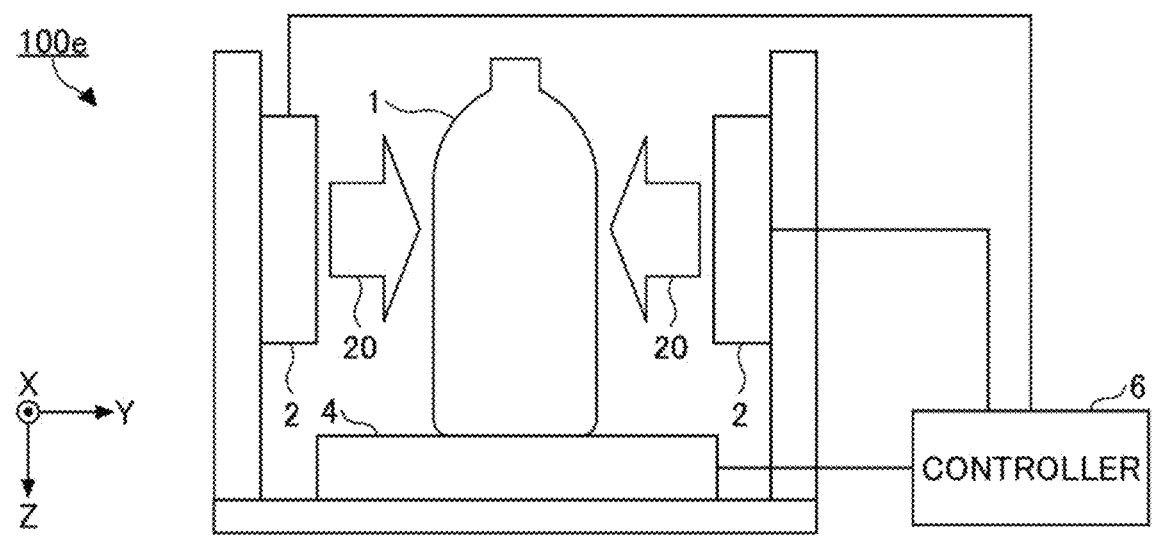
FIG. 31 is a diagram illustrating a configuration example of a manufacturing device (optical marking device) of a container according to a second modification.

FIG. 31 is a diagram illustrating an example of a configuration of a manufacturing device 100e according to a second modification. The manufacturing device 100e holds the container 1 so that the cylindrical axis 10 of the container 1 is directed along the Z direction. One of two laser application units 2 is disposed at a positive Y side and the other is disposed at a negative Y side so that the two laser application units 2 face the body 103 of the container 1 with the container 1 being interposed between the two laser application units 2. The two laser application units 2 apply the processing laser beam 20 from the positive Y side and the negative Y side to the body 103 of the container 1.

The manufacturing device 100e can form a first pattern composed of a collection of second patterns on both the positive Y and the negative Y sides of the body 103 of the container 1. Thus, a rotation mechanism that rotates the container 1 about a cylindrical axis is omitted from the configuration. However, the rotation mechanism may be added to this configuration.

The moving mechanism 4 may be a conveyor or the like that continuously moves, and the holding of the container 1 may be achieved by the weight of the container 1 and the contents, and the holding of the container 1 containing contents may be achieved by being placed. The laser application unit may include two or more lasers.

The manufacturing device 100e is suitable for a method for manufacturing a container product 7, as a mode 1. The method for manufacturing a container product 7 includes
forming an image pattern on a container 1;
subsequently filling the container with contents 9; and
then sealing the container filled with the contents 9 with a sealing member 8.

Specifically, the container 1 before forming the image pattern is mounted on a moving mechanism 4 such as a belt conveyor. A container holder configured to hold the container 1 with the cylindrical axis 10 of the container 1 being directed along the Z-direction may be disposed on the moving mechanism 4, and the container 1 may be held by the container holder. Or the container 1 may be independently placed on the moving mechanism 4.

The container holder may include a recess portion with which the bottom of the container 1 engages so as to hold the container 1. The container 1 may also be held by a linear guide member disposed on an upper side or a lower side of the container 1.

The linear guide members described above may be constructed by placing a pair or three or more guide members on both sides of the container 1. With a plurality of containers 1 arranged in a linear manner on the moving mechanism 4, the moving mechanism 4 sequentially moves the empty containers 1 to the position of the laser application unit 2 through the vicinity of the laser application units 2 (pattern forming units) while being guided by the container holder or the guide unit.

At the positions of the laser application units 2, a laser is applied to form an image pattern on the surface or the back surface of the container 1 or the inside of the container 1. When the image pattern is formed, the contents 9 is not yet present inside the container 1, and the laser application units 2 are not affected by the temperature and thermal conductivity of the contents 9 (see FIG. 20). Accordingly, the laser application units 2 are not required to be controlled by control parameters according to the properties such as the temperature, thermal conductivity, and heat capacity of the contents 9.

When an image pattern is formed, since the container product 1 is not sealed or sealed with the sealing member 8 (see FIG. 20), it is preferable that the dust collector 5 prevent fine powder or gas generated upon an image pattern being formed from entering the container product 1. The dust collector 5 is preferably disposed in the vicinity of the laser application units 2, or in the vicinity of a filler, or in both the vicinities of the laser application units 2 and the filler.

After the image pattern is formed, the moving mechanism 4 sequentially moves the container 1 having the image pattern formed thereon to a position of a filler configured to fill the container 1 with the contents 9. The filler preferably has a nozzle-like shape when the contents 9 is liquid, powder, or granular solid. The nozzle-shaped portion of the filler functions to inject the contents 9 into the inside of the container 1 at a location near the mouth (opening) of the container 1. Further, the moving unit 4 moves the container 1 to a position where a sealer configured to seal the container 1 having the image pattern formed thereon and the contents 9 therein with the sealing member 8. At a position where the sealer is disposed, a sealing member 8, such as a cap member, is inserted into a mouth (opening) of the container 1 on which an image pattern is formed and in which the contents 9 is injected, and the sealing member 8 rotates to seal the mouth (opening) of the container 1, thereby producing the container product 7.

After sealing the container with the sealing member 8, the moving mechanism 4 further moves the container product 7, to a gathering position at which a plurality of the container products 7 is collected, or to a boxing position at which a plurality of the container products 7 is packed, where each container product 7 is produced by filling the container 1 with the contents 9, sealing a mouth (opening) of the container 1 with the sealing member, and forming the image pattern on the container 1.

The manufacturing device 100 illustrated in FIG. 5A, the manufacturing device 100b illustrated in FIG. 26, and the manufacturing device 100d according to the first modification illustrated in FIG. 30 are suitable for a method for manufacturing a container product 7 as a mode 1, which includes forming a pattern on the container 1; subsequently filling the container 1 with the contents 9, and then sealing the container 1 with the sealing member 8.

The manufacturing device 100e according to the second modification illustrated in FIG. 31 is suitable for a method for manufacturing a container product 7 as a mode 2, which includes filling the container 1 with the contents 9; subsequently sealing the container 1 filled with the contents 9 with the sealing member 8; and then forming an image pattern on the container 1.

Specifically, the container 1 before forming the image pattern is mounted on a moving mechanism 4 such as a belt conveyor. The moving mechanism 4 may be provided with a container holder configured to hold the container 1 so that the cylindrical axis 10 of the container 1 is directed along the Z-direction, or the container 1 may be independently placed on the moving mechanism 4 without the container holder. The container holder may have a recess-shape bottom so as to fit a recess-shape bottom of each container 1, or a linear guide member disposed on an upper side or a lower side of the container 1.

Preferably, a pair of or three or more linear guide members are arranged on both sides of the container 1. A plurality of containers 1 are linearly disposed on the moving mechanism 4, and are moved sequentially by means of a container holder or a guide unit to a position at which a filler fills the container 1 with the contents 9. The filler preferably has a nozzle-like shape when the contents 9 is liquid, powder, or granular solid.

The nozzle-shaped portion of the filler functions to accommodate the contents 9 by injecting the contents 9 into the inside of the container 1 at a position near the mouth (opening) of the container 1. The moving unit 4 moves the container 1 filled with contents 9 to a position where the sealer configured to seal the container 1 filled with contents 9 with the sealing member 8. At a position where a sealer is disposed, a sealing member 8, such as a cap member, is inserted into an opening of a container 1 filled with contents 9, and rotates the container to seal the mouth (opening) of the container 1.

Thereafter, the moving unit 4 sequentially moves the container product 7 obtained by filling the container 1 with contents 9 and sealing a mouth (opening) of the container 1 with a sealing member 8 such as a cap member to the position of the laser application unit 2 through the vicinity of the laser application unit 2. At the position of the laser application unit 2, an image pattern is formed in the vicinity of the surface or the inside of the container 1 (inside the wall of the container 1) or the back surface (inner surface of the container 1) by, for example, irradiating the container with a laser.

Since the contents 9 is present inside the container 1 when the image pattern is formed, laser application is affected by the temperature, thermal conductivity, heat capacity, and the like of the contents 9. Accordingly, it is desirable that the laser application be controlled by control parameters according to the properties such as the temperature, thermal conductivity, and heat capacity of the contents 9. That is, in the method for manufacturing a container product 7 as a mode 2, the image pattern is formed on the container filled with the contents 9 using a control parameter different from a control parameter used when the image pattern is formed on the container that is not filled with contents 9.

In the method for manufacturing a container product 7 as the mode 2, the container product 7 is already sealed or sealed with the sealing member 8 at the time of forming the image pattern. Thus, it is possible to prevent fine powder, gas, or the like generated when forming the image pattern from entering and mixing inside of the container product 7.

After forming the image pattern, the moving mechanism 4 further moves a container product 7 to a gathering position at which a plurality of container products 7 are gathered or at a boxing position at which a plurality of container products 7 are packed, where the container products 7 are each filled with contents 9, and the mouth (opening)s of the container products each are sealed with the sealing member 8, and an image pattern is formed on the container products 7.

The manufacturing device 100*b* illustrated in FIG. 25 is suitable for a method for manufacturing a container product 7 as the mode 2. The method includes
 removing the holder 31 or changing the holder 31 to a holder 31 that engages with the sealing member 8 for holding the container 1;
 filling the container 1 with the contents 9;
 subsequently sealing the container 1 with the sealing member 8; and
 then forming an image pattern on the container 1.

The manufacturing device 100*e* according to the second modification illustrated in FIG. 31 is suitable for a method for manufacturing a container product 7 as a mode 3. The method includes
 forming an image pattern on the surface of the container 1 filled with contents 9; and
 then sealing the container 1 with the sealing member 8.

Specifically, the container 1 before forming the image pattern is mounted on a moving mechanism 4 such as a belt conveyor. The moving mechanism 4 sequentially moves the container 1 to the laser application unit 2 from a position near the laser application unit 2. A filler is also provided near the laser application section 2 to accommodate the contents 9 in the container 1. The filler preferably has a nozzle-like shape when the contents 9 is liquid, powder, or granular solid.

The nozzle-shaped portion of the filler functions to inject the contents 9 into the inside of the container 1 at a position near the mouth (opening) of the container 1. The moving mechanism 4 may be provided with a container holder configured to hold the container 1 so that the cylindrical axis 10 of the container 1 is directed along the Z-direction, or the moving mechanism 4 may be provided without the container holder so that the container 1 is placed independently on the moving mechanism 1. The container holder may be in the form of a recessed portion with which the bottom of each container 1 engages, or may be a linear guide member disposed on an upper side or lower side of the container 1.

Preferably, a pair of or three or more of the linear guide members are arranged on both sides of the container 1. A plurality of containers 1 are linearly arranged on the moving mechanism 4, and sequentially moved, by a container holder or a guide unit, to a position at which the laser application units 2 and the filler configured to fill the container 1 with contents 9 are closely arranged from the vicinity of the position at which the laser application units 2 and the filler configured to fill the container 1 with contents 9 are closely arranged.

At the position of the laser application units 2, an image pattern is formed near the surface, the inside (inside the wall of the container 1) of the container 1 or near the back surface (the inner surface of the container 1) by, for example, irradiating the container 1 with a laser, and the like. In addition, in the vicinity of the position of the laser application units 2, a filler is disposed to fill the container 1 with contents 9. After the container 1 is filled with the contents 9, and an image pattern is formed on the container 1, the moving unit 4 moves the resulting container 1 to a position where a sealer seals the resulting container 1 with the sealing member 8.

At a position where the sealer is disposed, a sealing member 8, such as a cap member, is inserted into a mouth (opening) of the container 1, which is filled with the contents 9 and on which an image pattern is formed, and the sealing member 8 is rotated to seal the mouth (opening) of the container 1, thereby manufacturing a container product 7. The moving mechanism 4 further moves the container product 7 to a gathering position at which a plurality of the container products 7 are gathered or to a packing position at which a plurality of the container products 7 are packed. The container products 7 are each filled with contents 9, sealed with the sealing member 8, and formed with the image pattern.

Figure 32:
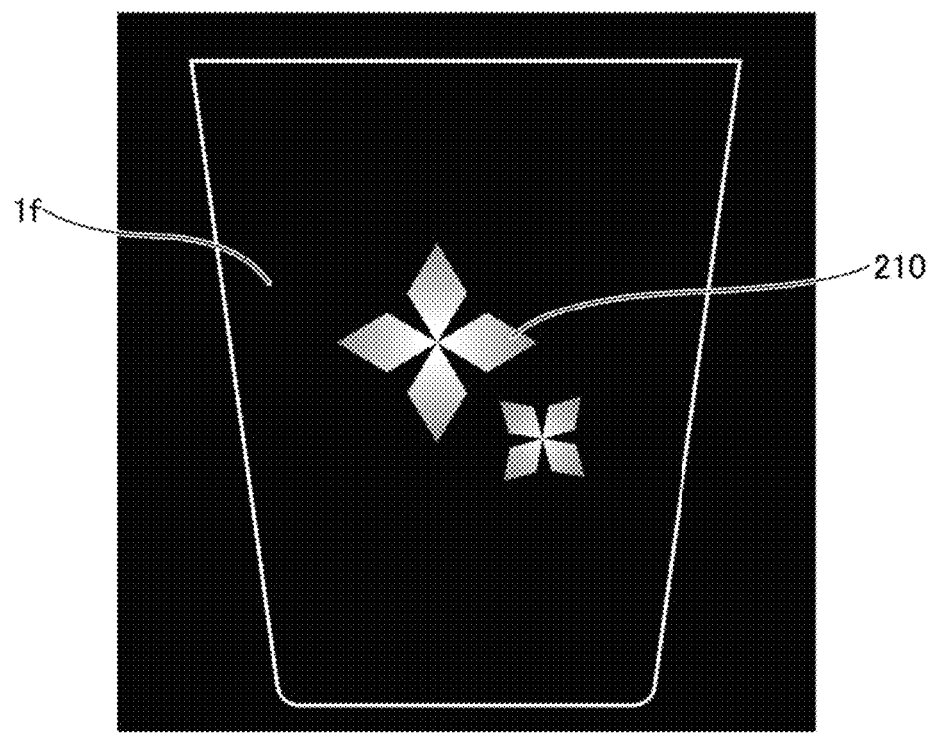
FIG. 32 is a diagram illustrating an example of a container according to a third modification.

In the embodiments described above, a bottle, such as a PET bottle made of a resin, is illustrated as an example of a container, but the container is not limited to this example. The container may be a glass or the like made of glass. FIG. 32 is a diagram illustrating an example of a glass 1*f* as a container according to a third modification. As illustrated in FIG. 32, a cylindrical surface of a glass 1*f* is formed with a first pattern 210 formed by a collection of second patterns.

In the embodiments described above, the container 1 is illustrated as an example made of a base material that is transparent to visible light and is positioned in front of a black screen or the like as a background.

As another example illustrated in FIGS. 33A and 33B, the container 1 is made of resin or glass (transparent resin or transparent glass) that is transparent to visible light and is positioned in front of a white screen as a background. A white background screen is visible through the transparent container 1. Alternatively, white liquid in the transparent container 1 may be seen through the transparent container 1.

A set of letters 22*a* is formed on the surface of the container 1 in FIG. 33A. The letters 22*a* are formed by blackening the surface of the base material of the container 1 with carbide or the like by the application of the processing laser beam. The blackened letters 22*a* are visually perceived in black relative to the white background or the white liquid in the container 1. As described above, by blackening the base material of the container 1, a first pattern such as a set of letters 22a constituted by a collection of the second patterns can be visualized.

As yet another example, in FIG. 33B, the container 1 is made of a transparent resin or transparent glass and is positioned in front of a black screen as a background. A black screen background is seen through the transparent container 1. Alternatively, black liquid in the transparent container 1 may be seen through the transparent container 1. Further, as described above, the container 1 may be a colored base material or a base material having a low light transmittance, and the scattering effect by the first pattern provides contrast with a portion in which the first pattern is not formed, thereby allowing for easy viewing of indications such as letters and barcodes.

On the surface of the container 1 in FIG. 33B, a pattern is formed by the application of a processing laser beam in an area other than a set of letters 22b so as to change the properties of the base material of the container 1.

The area other than the set of letters 22b where the properties of the base material has been changed corresponds to an area of the first pattern composed of the collection of second patterns where the properties of the base material has been changed in FIG. 33A.

The diffusivity of the ordinary light is improved in an area other than the letters 22a, and the area other than the letters 22a is opacified and is visually perceived as whitish opacified area. In the area of letters 22b, a black color of the background screen or a black color of the liquid in the container 1 is visible. In this manner, the first pattern, such as the letters 22b, can be visually perceived.

Also illustrated in the third embodiment are cylindrical containers, but the containers are not limited to the cylindrical containers, and may be box-shaped or cone-shaped.

In the third embodiment, an example is illustrated in which a first pattern is formed on the surface of a container, but a first pattern formed by the collection of the second patterns is formed inside of the base material constituting the container.

In addition, regarding the contents contained in the container 1, a pattern with good visibility and a large amount of information can be formed by increasing the contrast of the first pattern with respect to the color of the contents contained in the container that is transparent to visible light. For example, if the contents are black, forming a whitish opaque first pattern on the container makes the first pattern more visible. If the contents are white, forming a blackened first pattern on the container makes the first pattern more visible.

The container may be of any shape, such as a cylindrical or square column, without a shoulder or an inclined portion. The contents of the container may also be of any color, or whatever is containable in a container, such as cold or warm contents, carbonic acid, or colloid (yogurt, and the like). Examples of contents include, for example, but are not limited to, coffee, tea, beer, water, juice, carbonated beverages, milk, and the like, and may be any kind insofar as the contents are contained in the container.

Market Size of PET Bottles

The container 1 and the container product 7 are produced in enormous quantities because the container products 7, each of which is made up of a container 1 and contents such as a beverage liquid contained within the container 1, are supplied to the market for general consumers.

According to the PET Bottle Recycling Promotion Council, Japan shipped 22.7 billion PET bottles for soft drinks in FY (Fiscal Year) 2016. On a worldwide level, more than 1 million PET bottles are consumed per minute. Moreover, these figures are increasing year by year.

Almost all of the 22.7 billion PET bottles for beverages described above are labelled PET bottles for beverages and these place a large burden on the environment.

Need for a Mass Production Factory for Eco-Bottles

In order to reduce global environmental burdens, it is desirable to eliminate labels with high environmental burdens, and to replace the information provision function such as letters and images provided by labels with the information provision function with low environmental burdens to provide information such as letters and images composed of microscopic patterns and a collection of the microscopic patterns integrally formed on the container.

Accordingly, there is a need for a production method suitable for producing a large quantity of the containers 1 having information such as letters or images formed by a microscopic pattern and a collection of the microscopic patterns, or the container products 7 each composed of the container 1 and contents 9 such as a beverage liquid contained in the container 1, or there is a need for a production system such as a factory.

Technical Issues

A first technical issue for implementing a production method and a production system for efficiently producing the containers 1 or the container products 7 is to bridge the gap between the speed of the labeling process and the speed of forming the low environmental burden information, which integrally forms the information such as letters and images made up of the microscopic patterns and a collection of the microscopic patterns on the surface or inside of the container 1.

A second technical issue is measures against dust, dust particles, dirt, and the like when integrally forming information, such as letters and images, formed by a microscopic pattern and a collection of the microscopic patterns on the surface or inside of the container 1. It is extremely undesirable, from the viewpoint of hygiene, that dust, dust particles, dirt, and the like, which are generated during the process of integrally forming of information such as letters and images, enter the inside of the container 1.

Accordingly, it is necessary to implement a production method or a production system in which dust can be avoided as much as possible from entering the inside of the container 1.

A third technical issue is measures against light energy for processing used in integrally forming information such as letters and images formed by a microscopic pattern and a collection of the microscopic patterns on the surface or the inside surface of the container 1. When a laser is used as a light source for processing, it is extremely important to prevent the leakage of laser light and to prevent false light emission.

Need for Eco-Bottle Production

The order of priority of these multiple technical issues depends on the production volume of the production system, the physical size (size) of the production system, the structure of the manufacturing device (optical marking device) of the container 1, and the type of optical marking unit.

Thus, it is necessary to devise a specific configuration of the production system by appropriately considering a number of technical issues according to the requirements of the intended production system.

Overview of Production Method and Production System (Factory)

FIG. 34 is an overall diagram illustrating a production/manufacturing method and a production/manufacturing system (factory) for mass producing the container 1 and the container product 7.

The production/manufacturing system illustrated in FIG. 34 includes the following areas (units, processes). That is, the production/manufacturing system includes a preform area A1, a molding area A2, an inspection area A3, a pre-filling optical marking area M1, an accumulation area A4, a cleaning area A5, a filling area A6, a sealing area A7, an accumulation area A8, a labeling area A9, a printing area A10, a packing area A11, an inspection area A12, a pallet area A13, and an inspection area A14. Beverage will merge into the filling area A6 from the beverage manufacturing area B.

First, in the preform warming area A1, a preform made of a resin such as PET for forming a container 1 is heated in order to facilitate molding. The warmed preform is placed in a mold in the molding area A2, and then inflated with air to form a PET bottle, which is a container 1. By engraving a pattern for increasing the strength of the container 1, such as ribs, letters, shapes, and the like on the mold to be used, the ribs, letters, shapes, and the like corresponding to the pattern engraved on the inflatable container 1 are inflated with air. In this manner, embossing can be applied to container 1.

Hereinafter, the container 1 is used as a concept including a container having an embossed shape. such as an embossed bottle, an embossed container, or the like.

The PET bottle or embossed bottle made in a molded area A2 is moved to the inspection area A3 where the PET bottle or embossed bottle is checked for scratches or dents by a container inspection machine by a camera.

The resulting PET bottle or the inspected PET bottle is moved to the work area of the next process by a moving unit or manual operation.

Alternatively, the PET bottle may be moved manually or moved by the moving unit to the accumulation area A4 where the PET bottle is temporarily stored or inspected.

External Purchase Method for PET Bottle or Embossed Bottle

FIG. 34 illustrates a container product production system, such as a bottling factory that produces beverage liquids and also produces a PET bottle or an embossed bottle as a container 1. The container product production system includes a preform warming area A1, a molding area A2 having a blow molding machine, and an inspection area A3 having a bottle inspection machine provided directly upstream of a pre-filling optical marking area M1 to produce a container product containing a beverage liquid.

However, the PET bottle or embossed bottle that is the container 1 can be procured externally or produced at a production site, such as another factory of the company. In such cases, since the container 1 is procured externally, there is no need to provide a preform warming area A1, a molding area A2 having a blow molding machine, or the like in the container product production system, thereby reducing the initial cost of constructing the container product production system.

Accordingly, the PET bottle or the embossed bottle which is the container 1 carried in from the outside is transported to the container product production system via the inspection area A3 or directly by the moving unit to the pre-filling optical marking area M1.

Pre-Filling Optical Marking Area

The PET bottle/embossed bottle molded in the molding area A2, the PET bottle/embossed bottle that has been inspected, or the PET bottle/embossed bottle that is imported from outside the container product production system, moves to a pre-filling optical marking area M1 by means of a moving unit such as a belt conveyor.

At least one optical marking device for forming information on the surface of the container 1 is installed in the pre-filling optical marking area M1. The optical marking device performs the work of integrally forming information such as letters and images formed by a microscopic pattern and a collection of the microscopic patterns on the surface of the container 1.

Marking Device 100, 100*d*, and 100*e*

The optical marking device installed in the pre-filling optical marking area M1 is, for example, a manufacturing device (optical marking device) 100 illustrated in FIG. 5A. Alternatively, the optical marking device installed in the pre-filling optical marking area M1 may be an optical marking device, such as a manufacturing device (optical marking device) 100*b*, illustrated in FIG. 26, which is used to integrally form information, such as letters and images, formed by a microscopic pattern and a collection of the microscopic patterns, on the shoulder of the container 1.

Similarly, an optical marking device, such as a manufacturing device (optical marking device) 100*d* of the container 1 according to the first modification illustrated in FIG. 30, may be used. The manufacturing device (optical marking device) 100*d* can integrally form information, such as letters and images, formed by a microscopic pattern, which is a first pattern, and a second pattern, which is a collection of the microscopic patterns, on a side (body area) of the container 1.

Further, an optical marking device, such as a manufacturing device (optical marking device) 100*e* of the container 1 according to the second modification illustrated in FIG. 31, may be used. The manufacturing device (optical marking device) 100*e* can integrally form information such as letters and images formed by a microscopic pattern and a collection of the microscopic patterns on the side (body area) of the container 1 from both sides of the container 1, at the approximately same time.

In the pre-filling optical marking area M1, a container 1, such as a PET bottle molded in the molding area A2, is installed in an optical marking device (100, 100*b*, 100*d*) either manually or by a material handling device (material handling robot). After installation, the optical marking device (100, 100*b*, 100*d*) integrally forms the information, such as letters and images, by an optical processing unit, such as a laser array, on the surface of the container 1.

Optical Marking Device

A specific configuration of another optical marking device will be described with reference to FIG. 35.

Figure 35:
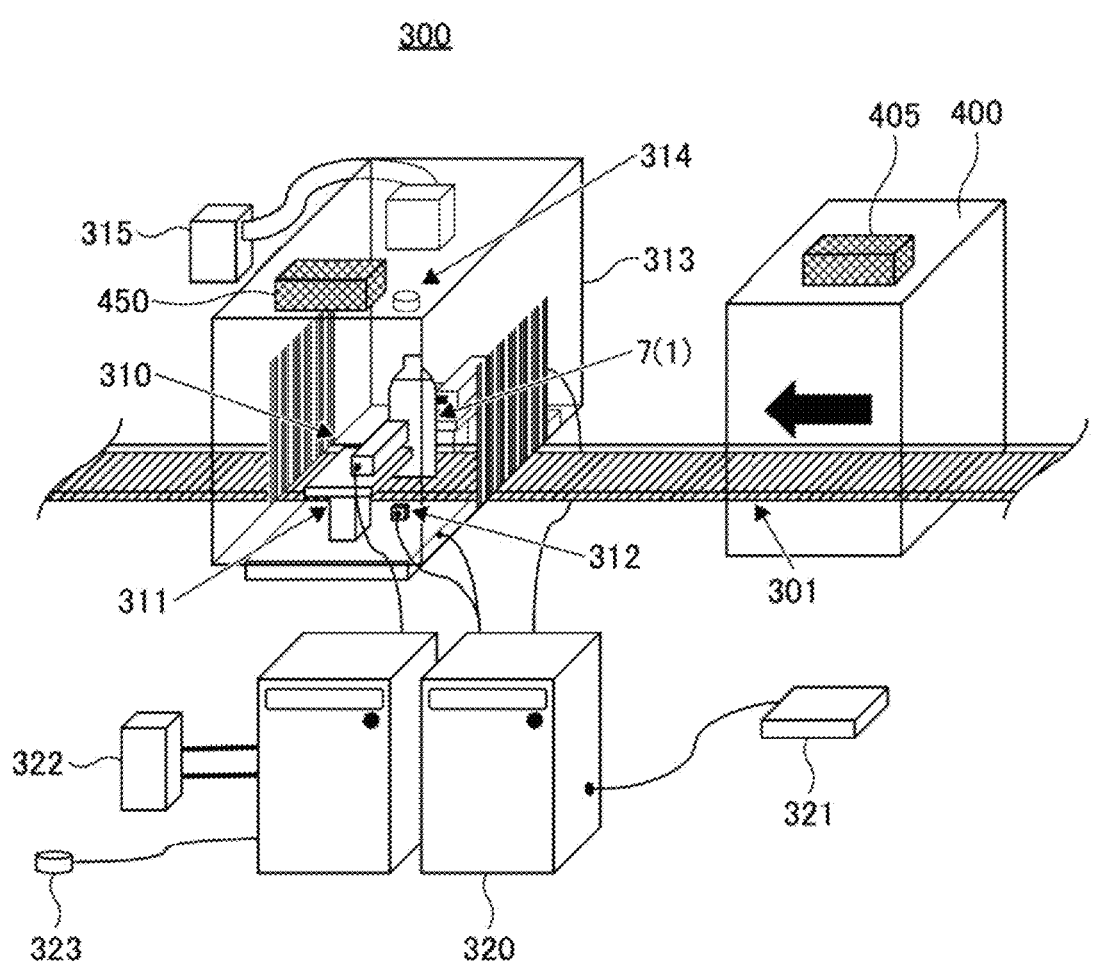
FIG. 35 is a diagram illustrating another manufacturing device (optical marking device) of a container.

FIG. 35 illustrates an optical marking device 300. The optical marking device 300 is positioned near a conveyor 301 which carries a container 1 to move the container 1. A temperature control device 400 is disposed more upstream of the conveyor 301 relative to the optical marking device 300. The optical marking device 300 is an example of a pattern forming device, an information forming device, and a laser processing device.

A temperature control device 400 includes a temperature controller 405 configured to heat or cool the container 1 moved by conveyor 301, and the optical marking device 300 includes a temperature controller 450 configured to cool the container 1 to which the processing laser beam is applied by the laser head 310.

When the temperature controller 405 heats the container 1 moved by the conveyor 301, and the laser application energy of the processing laser beam is under the same condition, the absorbance of the processing laser beam in the container 1 is increased. Thus, the inside and the surface of the base material 1a of the container 1 can be sufficiently foamed and opacified, and the visibility of the pattern 11 is improved.

When the temperature controller 405 cools the container 1 moved by the conveyor 301, the effect of a heat-affected zone (HAZ) during the application of the processing laser beam 20 is reduced, and the visibility of the pattern 11 is improved by ablation. Further, the cooling of the container 1 prevents the growth of foam inside and on the surface of the base material 1a of the container 1 from becoming excessive, and makes the inside and the surface of the base material 1a to foam opacified with fine foaming. As a result, the visibility of the pattern 11 is improved.

Further, a temperature controller 450 configured to cool the container 1 after the application of the processing laser beam 20 to the container 1 is provided. This prevents the growth of foam inside and on the surface of the base material 1a of the container 1 from becoming excessive, and makes the inside and the surface of the base material 1a opacified with fine foaming. As a result, the visibility of the pattern 11 is improved.

The molding area A2 or the inspection area A3 is located further upstream of the conveyor 301. The molded container 1, or the molded and inspected container 1, is transported by the conveyor 301 acting as a container moving unit to an optical marking device 300 where information, such as letters and images composed of a collection of microscopic patterns is integrally formed on the container 1, and is then moved to a next work area. The inside of the container 1 is empty and not filled with any beverage liquid or the like. Further, a sealing member such as a cap is not attached to an opening (mouth) portion of the container 1. In this manner, the container 1 passes through the optical marking device 300.

The next work area downstream of the conveyor 301 is an information inspection area in which the quality of information such as letters and images formed by a collection of microscopic patterns integrally formed on the container 1 is inspected by an imaging device such as a camera.

Laser Controller 320

A plurality of laser drivers including a power supply unit for driving the laser diode, a controller, and 12 laser light sources is disposed inside the laser controller 320. A power controller is also disposed to control the power of the laser light emitted from the laser light sources. The number of laser light sources is not limited to 12, but may be any number. The number of laser drivers contained may be from one to, for example, 16, as desired. A cooling system 322 connected to the laser controller 320 is required because the laser drivers generate considerable heat when writing information onto the container 1. The cooling system 322 includes a pipe that is a first blower for feeding cold air to the laser controller 320 and a pipe that is a second blower for recovering warmed air inside the laser controller 320 to the cooling system 322.

The laser controller 320 is provided with a plurality of coupling fibers and a plurality of laser heads 310 at the ends of the coupling fibers. Each coupling fiber is bundled with a number of optical fibers corresponding to the number of laser light sources, and each optical fiber is capable of guiding laser light emitted from a corresponding laser light source to the end of the laser head 310.

The laser controller 320 is further provided with a sensor 312 for sensing a container 1 which is moved by the conveyor 301. The sensor 312 is provided inside a safety cover 313 to detect the timing at which the most upstream end of the container 1 has passed through between the two facing laser heads 310. The number of sensors 312 may be one or more. The laser controller 320 starts an information forming process of integrally forming predetermined information on the surface of the container 1 at predetermined timing after the sensor 312 has detected the container 1 carried by the conveyor 301. This information forming process involves the formation of the first pattern described above by the relative movement between the container 1 and the laser heads 310.

Fiber Arrangement within the Laser Head 310

Figure 36:
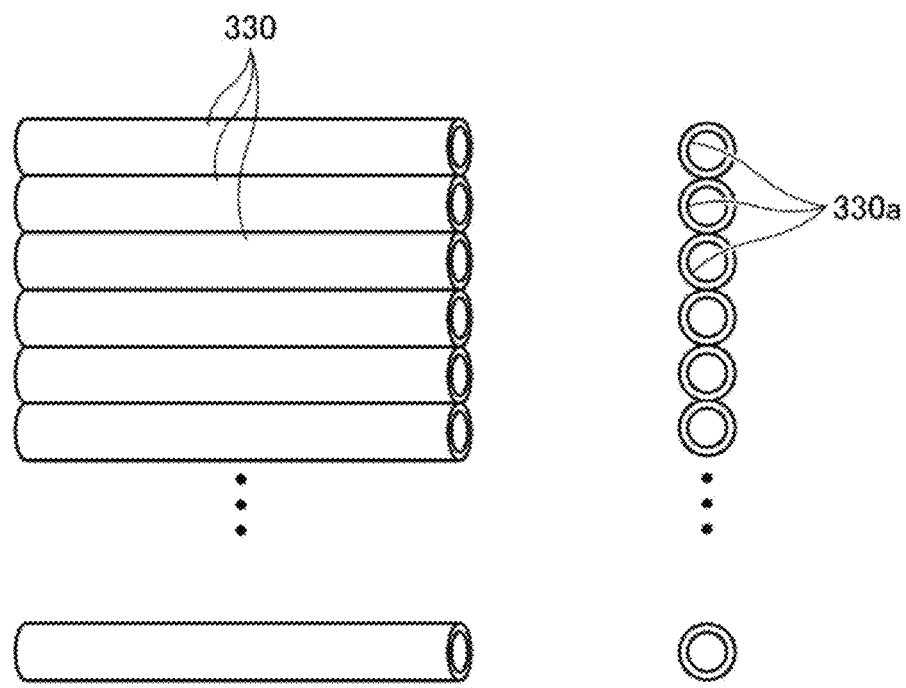
FIG. 36 is a diagram illustrating the arrangement of optical fibers within a laser head.

FIG. 36 is a diagram illustrating arrangement of optical fibers within each laser head 310.

In this example, twelve optical fibers 330 are arranged in groups in a vertical row in the vertical direction. The layout diagram on the left illustrates an arrangement viewed from the side of the laser head 310. The layout diagram on the right illustrates an arrangement viewed from the front of the laser head 310. The front surfaces 330a of the optical fibers are arranged to face an object subjected to laser application for integral formation of information such as letters, images, and the like on the container 1.

Arrangement of the Laser Head 310

In the optical marking device 300 illustrated in FIG. 35, one laser head 310 is adjustably positioned on a laser head fixing base 311.

The laser head 310 is adjustably fixed on a laser head fixing base by means of screws, bolts, or the like in a direction parallel to a moving direction of an object subject to laser application or in a direction of contact with or proximity to an object. When the laser head 310 is used to apply laser to the shoulder of the container 1 such as a PET bottle to integrally form information such as letters and images, the laser head 310 can be fixed to the laser head fixing base 311 by means of screws and bolts so that the angle of the laser head 310 can be adjusted in a manner such that the laser head fixing base 311 has a predetermined height at which the shoulder of the container 1 can be irradiated with a laser, and such that the laser can be applied from the laser head 310 at an angle substantially perpendicular to the shoulder of the container 1.

As described above, in order to integrally form information such as letters and images on the shoulder of the container 1, the optical marking device 300b that includes the laser head 310 fixed to the laser head fixing base 311 with fixing members such as screws or bolts so that the laser head 310 can apply laser to the shoulder of the container 1 at an angle substantially perpendicular to the shoulder of the container 1.

Arrangement of Multiple Laser Heads 340

Figure 37:
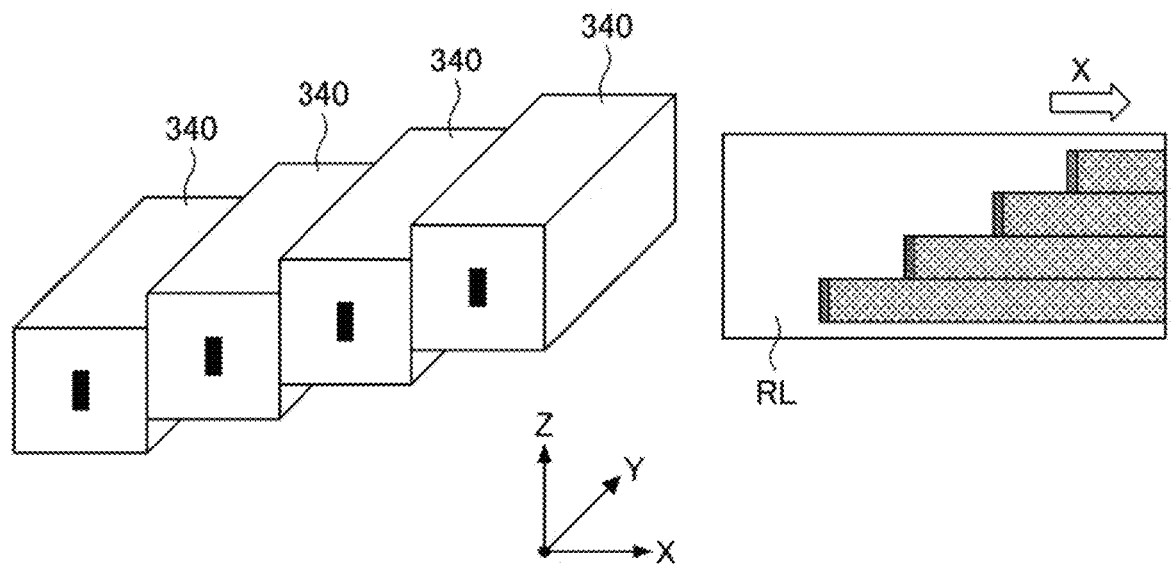
FIG. 37 is a diagram illustrating a state in which a plurality of laser heads is mounted on a laser head fixing base.

FIG. 37 is a diagram illustrating a plurality of laser heads 340 mounted on a laser head fixing base 311. Specifically, as illustrated in FIG. 37, four laser heads 340 are mounted on the laser head fixing base 311 with the positions shifted in the vertical direction (Z-axis direction) by a predetermined amount. The number of laser heads 340 to be mounted can be set to any number. Also, the vertically shifting amount of the laser head 340 may correspond to the number of optical fibers provided in the laser head 340, as illustrated in FIG. 37, thereby broadening the laser application area of the container 1, which is the object of laser application, as illustrated on the right side of FIG. 37.

Figure 38:
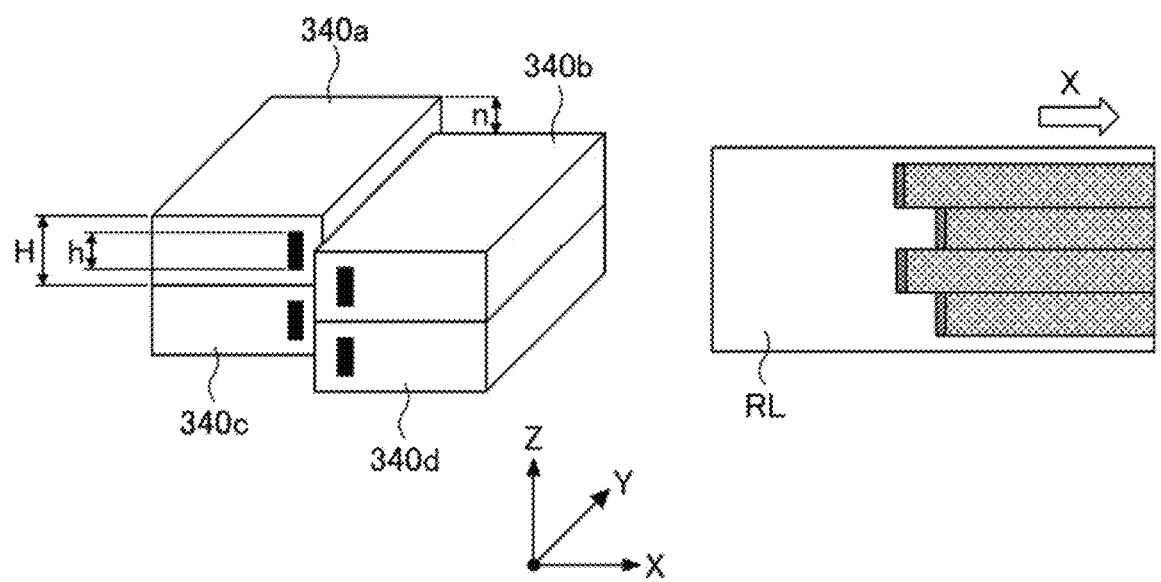
FIG. 38 is a diagram illustrating another state in which a plurality of laser heads is mounted on a laser head fixing base.

In FIG. 38, an arrangement of optical fiber groups on the front surface of the laser head 340 is, as illustrated in FIG. 38, shifted proximate to one side (in the z-axis direction) of the front surface of the laser head 340 rather than the center of the front surface of the laser head 340, and secured to the laser head fixing base 311. The arrangement as in FIG. 38 enables the width required for mounting the laser heads 340 to be narrowed in the X-axis direction (the moving direction of the laser application object), compared to an arrangement similar to that in FIG. 37. The maximum width between each group of optical fibers can also be reduced.

Face-to-Face Arrangement of Two Laser Heads 310

In FIG. 35, two laser heads 310 are positioned so that the front faces of the two laser heads 310 face each other across the centerline of the belt conveyor 301. The laser heads 310 aligned to face each other across the centerline of the belt conveyor 301 are adjustably secured on the respective laser head fixing bases 311. The number of laser heads 310 mounted on the laser head fixing base 311 on each side of belt conveyor 301 may be one or more, and any predetermined number of laser heads 310 mounted on each laser head fixing base 311. Also, the numbers of laser heads 310 mounted on the respective laser head fixing bases 311 on both sides of belt conveyor 301 may be the same or different.

Additionally, the heights and angles of the respective laser heads 310 mounted on the laser head fixing bases 311 on both sides of the belt conveyor 301 may be optionally the same or may be different as desired.

In the optical marking device illustrated in FIG. 35, predetermined numbers of laser heads 310 disposed on the laser head fixing bases 311 are disposed on both sides so as to face each other across the centerline of the moving unit.

Accordingly, information, such as letters and images, formed by a collection of microscopic patterns is integrally formed in parallel at approximately the same time, from both sides of the container 1 conveyed by the moving unit. The contents of the information formed in parallel on the container 1 may be the same or different.

An optical marking device 300*c* is defined as a device, in which predetermined numbers of laser heads 310 disposed on the respective laser head fixing bases 311 are arranged face-to-face on both sides across the centerline of the moving unit for moving the container 1 in this manner.

Two Stage Arrangement of Multiple Laser Heads 310

Next, an arrangement of the laser head 310 and the laser head fixing base 311 of the optical marking device 300 will be described. The optical marking device 300 is designed for forming information, such as letters and images formed by a microscopic pattern and a set of these microscopic patterns, on the side surface of the container 1 and the shoulder portion higher than the side surface of the container 1. In order to integrally form an information on a side of the container 1, a plurality of laser heads 310, such as those illustrated in FIG. 37 or 38, are adjustably secured on a first laser head fixing base 311 with or without a fixing member, such as one or more screws or bolts, where the first laser head fixing base 311 is disposed on one side across the centerline of the moving unit. The number of side application laser heads 310 attached to the laser head fixing base may preferably be large in order to widely and integrally form the information in the vertical direction on the side of the container 1.

Further, zero, one, or more than one laser heads 310 are adjustably fixed to the above-mentioned first laser head fixing base 311 with or without a fixing member, such as screws and bolts. The shoulder application laser heads 310 are designed for integrally forming information, such as letters or images, formed by a collection of microscopic patterns and a microscopic pattern on the shoulder of the container 1 that is positioned higher than the side surface of the container 1. The mounting position of the shoulder application laser head 310 is higher than the mounting position of the side application laser head 310. In order to apply laser light to the shoulder of the container 1, the shoulder application laser head 310 is fixed with a fixing member, such as a screw or a bolt such that the angle of the shoulder application laser head 310 can be adjusted to be substantially perpendicular to an inclined surface forming the shoulder of the container 1.

That is, the laser head fixing base 311 is provided with a predetermined number of a first type of side application laser heads 310 and a predetermined number of a second type of shoulder application laser heads 310.

Thus, an optical marking device 300*d* is defined as a device capable of integrally forming information such as letters or images on the side or the shoulder of the container 1, where the laser head fixing base 311 is provided with a predetermined number of first type side application laser heads 310 for applying laser to the side of the container 1, and a predetermined number of second type shoulder application laser heads 310 for applying laser to the shoulder of the container 1.

Two-Stage, Face-to-Face Arrangement of Multiple Laser Heads 310

A second laser head fixing base 311 is disposed on the side opposite to the first laser head fixing base 311 across the centerline of the moving unit. A predetermined number of laser heads 310 are also mounted on the second laser head fixing base 311, similar to those mounted on the first laser head fixing base 311. That is, a predetermined number (0 or more) of first type side application laser heads 310 for applying laser to the side of the container 1, and a predetermined number (0 or more) of second type shoulder application laser heads 310 for applying laser to the shoulder of the container 1 are also adjustably fixed to the second laser head fixing base 311 by means of a fixing member such as screws or bolts to adjust the position. The second type shoulder application laser heads 310 for applying laser to the shoulder of the container 1 are disposed on the second laser head fixing base 311 at a level higher than first type side application laser heads 310 for applying laser to the side of the container 1.

A first laser head fixing base 311 and a second laser head fixing base 311 are disposed on both sides of the centerline of the moving unit. A predetermined number of first type side application laser heads 310 for applying laser to the side of the container 1, and a predetermined number of second type shoulder application laser heads 310 for applying laser to the shoulder of the container 1 are disposed on the respective laser head fixing bases 311 so that the first type side application laser heads 310 and the second type shoulder application laser heads 310 face each other. Thus, information such as letters or images formed by microscopic patterns and a collection of microscopic patterns is integrally formed on the side or shoulders of the container 1 in parallel at approximately the same time from both sides of the container 1 conveyed by the moving unit. The contents of the information formed in parallel on the container 1 may be the same or different information.

As described above, an optical marking device 300*e* includes the first laser head fixing base 311 and the second laser head fixing base 311 disposed on both sides of the centerline of the moving unit, and a predetermined number of the first type side application laser heads 310 and a predetermined number of the second type shoulder application laser heads 310 are disposed on the respective first and second laser head fixing base 311 such that the first type side application laser heads 310 and the second type shoulder application laser heads 310 face each other.

Safety Cover 313 of the Optical Marking Device 300

The optical marking device 300 illustrated in FIG. 35 is provided with a safety cover 313, acting as a cover unit that can cover both a first laser head fixing base 311 having a predetermined number and type of laser heads 310, and a second laser head fixing base 311 having a predetermined number and type of laser heads 310. The laser light applied from the laser head 310 to process the surface or the inner surface of the container 1 has an intensity that can deform the pet resin. Thus, when such laser light is applied to the human eye or skin, such application of laser light to the human eye or skin cases a disadvantage such as burns. Thus, it is desirable that the laser light emitted from the laser head 310 be shielded by the safety cover 313 so as not to leak to the outside of the safety cover. Accordingly, the inner surface of the safety cover 313 is painted matt black.

Further, in order to prevent diffused reflection of the laser beam, it is more preferable that the inner surface of the safety cover 313 be provided with a large number of micro-projections. The height of the micro-projections should preferably be as high as possible, ranging from a few microns to a few millimeters high. The safety cover 313 is provided with an entrance and an exit for entering and exiting the container 1. Each of an entrance/exit is provided with a laser light leakage prevention unit arranged in a curtain shape to prevent the laser light emitted from the laser head 310 from leaking to the outside of the safety cover 313. The laser light leakage prevention unit illustrated in FIG. 35 is configured such that a large number of strip-like members having a predetermined width (e.g., 5 mm) and a predetermined length (e.g., 40 cm) are hanging vertically. The length of the strip requires a height that permits movement of the container 1 through the entrance/exit of the safety cover 313. A typical 500 ml PET bottle has a height of approximately 210 mm to 230 mm. A typical 2000 ml PET bottle has a height of approximately 280 mm to 350 mm. Accordingly, the strip-like members having the length of approximately 40 cm to act as the laser light leak prevention unit of the safety cover 313 can allow the movement of a typical 500 ml bottle or a typical 2000 ml bottle.

The number of strip members requires a number sufficiently to prevent laser light leakage from the entrance/exit of the safety cover 313. For example, for a 5 mm wide strip-like member, at least 40 strip-like members are required if the entrance/exit is 20 cm wide. The strip-like members are provided in several steps (2 to 4) in the moving direction of the container 1, so that the light shielding function is enhanced.

The door type safety cover 313, which acts as the laser light leakage prevention unit for the optical marking device 300, may have a configuration differing from the configuration illustrated in FIG. 35 (vertically hanging large number of strip-like members). For example, the door type safety cover 313 may be configured to include a pair of double doors or a single door disposed at the entrance/exit of the safety cover 313.

A pair of openable doors or a single openable door is urged to block the entrance/exit to the safety cover 313 by a resilient unit such as a spring. When the moving container 1 abuts a pair of openable doors or a single openable door of the safety cover 313, a force greater than the preload of the aforementioned resilient unit, such as a spring, may be used to push through a pair of openable doors or a single openable door. After the container 1 passes through the entrance/exit, a pair of openable doors or a single openable door is automatically closed by the resilient unit such as a spring described above to prevent the leakage of laser light.

A pair of openable doors or a single openable door can be automatically opened and closed by a door driving unit such as a motor provided on the safety cover 313. In this case, a detector (an optical sensor or a mechanical sensor) is provided for detecting that the container 1 is close to the entrance/exit of the safety cover 1, and the detector drives the aforementioned door driving unit by a detecting signal that detects the proximity of the container 1. Thus, when the detector and the driving unit are provided to enable automatic opening and closing of pair of openable doors or a single openable door, the container 1 moved by the conveyor 301 can pass through the optical marking device 300 without touching pair of openable doors or a single openable door.

Thus, the safety cover 313 of the optical marking device 300 allows for both a laser light leak prevention function to prevent laser light emitted from the laser head 310 provided therein from leaking out of the safety cover 313 and a passing function to allow the container 1 to pass through the entrance/exit of the safety cover 313. The conveyor 301 downstream of the safety cover 313 moves the container 1 to the next work area.

Dust Collector Inside the Safety Cover 313 of the Optical Marking Device 300

Within the safety cover 313 of the optical marking device 300, information such as letters and images formed by microscopic patterns and a collection of microscopic patterns is integrally formed on the surface of the container 1 by laser light applied from the laser head 310. This generates plumes and dust. These plumes or dust can contaminate the inside of the container 1 or the safety cover 313.

Accordingly, a dust collector 315, which is an air suction device and has the same function as a dust collector 5 and a dust collection controller 69 provided in the above-described optical marking device 100, 100$d$, and 100$e$, is disposed inside of the safety cover 313 of the optical marking device 300 or at an opening of the safety cover 313, so as to block the opening of the safety cover 313 of the optical marking device 300 or the safety cover 313.

PC 321 for Controlling the Optical Marking Device 300

Under the control of the control PC 321, the optical marking device 300 emits processing laser light from the laser head 310 to the container 1 to two-dimensionally form a first pattern on at least one of the surface, the back surface or inside of the base material in the container 1.

The hardware configuration of the control PC 321 has the same hardware configuration as that of the block diagram illustrating an example of the hardware configuration of the controller 6 illustrated in FIG. 7. The description of each hardware configuration is the same as that of the controller 6 of the manufacturing device 100.

The functional configuration of the control PC 321 has the same functional configuration as that of the configuration excluding the container rotation controller 67 and the dust collection controller 68 from the block diagram illustrating an example of the functional configuration of the controller 6 illustrated in FIG. 8. The functional configuration of the control PC 321 is the same as that of the controller 6 of the manufacturing device 100, except for the container rotation controller 67 and the dust collection controller 68. Accordingly, the description of the container rotation controller 67 and the dust collection controller 68 is excluded from the description of the functional configuration with respect to the controller 6 of the manufacturing device 100, and the description of the functional configuration with respect to the controller 6 of the manufacturing device 100 is to be used as the description of the functional configuration of the control PC 321.

Emergency Stop Button 314 of the Optical Marking Device 300

An emergency stop button 314 is disposed in the vicinity of the PC 321 for controlling the optical marking device 300. The emergency stop button 314 is used to immediately shut down the optical marking device 300 or the conveyor 301 in order to ensure safety or avoid a failure in the event of an emergency or a failure such as leakage of laser light from the safety cover 313 or the conveyor 301 being out of control. The emergency stop signals from the emergency stop button 314 may be configured to stop only the single optical marking device 300 or the conveyor 301, or may be configured to stop a wider range of equipment may be stopped. For example, a plurality of optical marking devices 300 disposed within a production system (factory) or a plurality of optical marking devices 300 and conveyor 301 disposed within all production systems (factory) may be stopped.

If a wide range of equipment is to be stopped, an emergency stop signal from the emergency stop button 314 is transmitted to a plurality of devices, such as optical marking devices 300 and conveyor 301, to be stopped via a signal path, such as a wire or radio.

Type of Marking Device Installed in the Pre-Filling Optical Marking Area

The optical marking device installed in the pre-filling optical marking area M1 is, for example, a manufacturing device (optical marking device) 100 illustrated in FIG. 5A, a manufacturing device (optical marking device) 100b illustrated in FIG. 26 that is capable of integrally forming information such as letters and images formed by a microscopic pattern and a collection of the microscopic patterns on the shoulder of the container 1, a manufacturing device (optical marking device) 100d of the container 1 according to the first modification illustrated in FIG. 30, a manufacturing device (optical marking device) 100e of the container 1 according to the second modification illustrated in FIG. 31, and an optical marking device 300 illustrated in FIG. 35. Additionally, for the optical marking device 300, there may be a plurality of variations in the arrangement of the laser heads 310 (340), such as FIGS. 37 and 38.

Thus, the pre-filling optical marking area M1 can be equipped with various types of optical marking devices with different functions and configurations. Specifically, any necessary number (one or more) of different types of optical marking device (300) may be located in the pre-filling optical marking area M1. Examples of the different types of optical marking device (300) include optical marking devices (100, 100d, 100e, 300, 300c) suitable for forming information in a side area (a body portion) of the container 1, an optical marking device (100b, 300b) suitable for forming information in an inclined area (a shoulder portion) of the container 1, an optical marking device (100e, 300, 300e) suitable for forming information in a single direction with respect to the container 1, an optical marking device (100e, 300, 300e) having a rotating mechanism for forming information in a plurality of directions with respect to the container 1, an optical marking device (100, 100b, 100d, 100e) having a rotating mechanism for rotating the container 1 to form information on the container 1, an optical marking device (300) suitable for forming information sequentially for a different container 1 in coordination with a moving unit of the container 1, such as a conveyor 301 for moving the container 1.

Layout in Pre-Filling Optical Marking Area

The arrangement of the optical marking devices in the pre-filling optical marking area M1 is described with reference to FIGS. 39A and 39B.

A square mark indicates the optical marking device 100b illustrated in FIG. 26, and the optical marking devices 100b can form information such as letters or images formed on the shoulder of the container 1.

An oval mark indicates the optical marking device 100d illustrated in FIG. 30, and the optical marking devices 100d can form information such as letters or images on the side of the container 1.

A triangle mark indicates the material handling robot 350. The material handling robot 350 can automatically perform work of detecting the container 1 carried by the conveyor 301, which is a moving unit for moving the container 1, with a sensor, picking up, and sets the container 1 in the optical marking device 100b or the optical marking device 100d; removing the marked container 1 from the optical marking device 100b or the optical marking device 100d after completing the optical marking; and then returning the marked container 1 onto the conveyer 301 which is a moving unit.

A rectangle (small) mark indicates the optical marking device 360 similar to the optical marking device 300 illustrated in FIG. 35, which can form information such as letters or images on both sides of the container 1.

A rectangle (large) illustrates an optical marking device 370 capable of forming letters or image information on the side and shoulders from both sides of the container 1.

A circular mark indicates a device (track selector) 380 provided at a branch point of the moving unit (track) of the container 1 or at an intersection point, and configured to select a downstream moving unit (track) to which the container 1 is moved from the upstream side. The track selector 380 is driven by manual power or an electrical driving unit such as an electric motor or an electromagnetic magnet.

Single Line Layout of the Pre-Filling Optical Marking Area

Figure 39A:
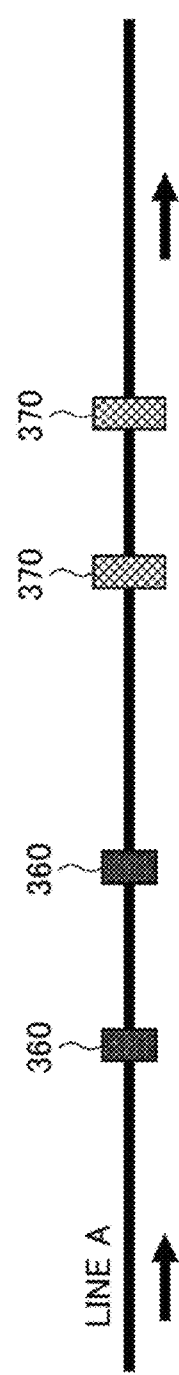
FIGS. 39A and 39B are diagrams illustrating the arrangement of an optical marking device in a pre-filling marking area.

A line A in FIG. 39A corresponds to the conveyor 301, which is the moving unit for moving the container 1 arranged in a single line. The in FIG. 39A illustrates that a plurality of optical marking devices 360 and a plurality of optical marking devices 370 are arranged on the conveyor 301.

It is also possible to place a single optical marking device on line A. However, as illustrated in the line A of FIG. 39A, the speed of the marking process for performing optical marking is faster when a plurality of optical marking devices are disposed. Also, as illustrated in line A of FIG. 39A, the function of the marking process for performing optical marking is higher when different types of optical marking devices are arranged. In the case of the line A, it is possible to form information such as letters or image not only on the side but also on the shoulder of the container 1.

However, when a plurality of optical marking devices is disposed in a single line, as in line A, the larger the number of optical marking devices, the longer the length of line A in the longitudinal direction becomes necessary. In such a case, depending on the size and shape of the pre-filling optical marking area M1, there is a limit to the number of optical marking devices that can be disposed.

A plurality of optical marking devices disposed in a single linear track, such as a line A, can be arranged in the pre-filling optical marking area M1. In this case, the tracks can be arranged in parallel or at an angle to each other.

On the upstream side of the line A, the molding area A2, the inspection area A3, and the accumulation area A4 for temporarily accumulating the resulting or inspected PET bottles are arranged.

On the downstream side of the line A, a work area for the next process, or an accumulation area A4 for temporarily accumulating a container 1, such as a PET bottle on the surface of which information such as letters or images is integrally formed is disposed.

Multitrack Layout of the Pre-Filling Optical Marking Area

Figure 39B:
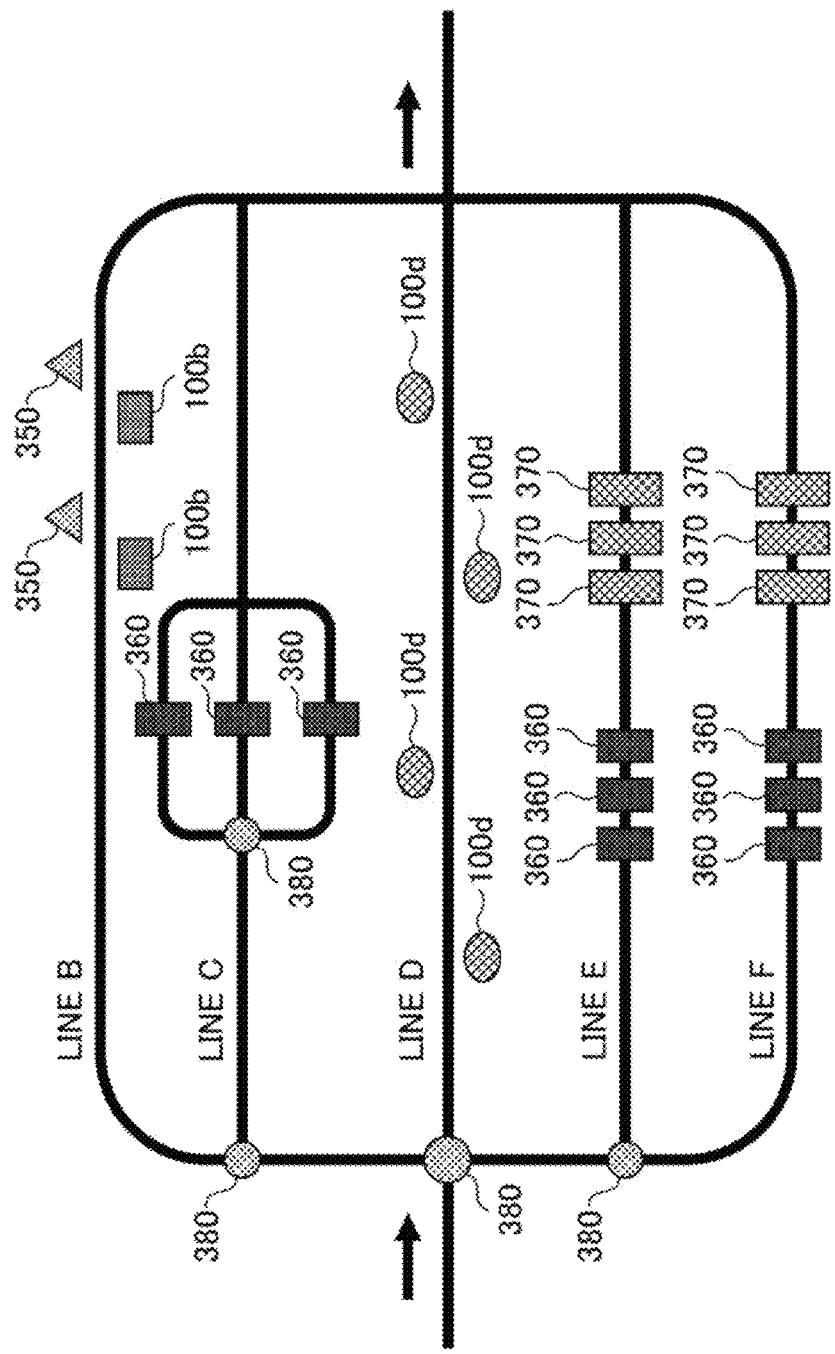

FIG. 39B illustrates an example of a pre-filling optical marking area M1. In FIG. 39B, lines B to F arranged in five tracks correspond to the conveyor 301 which is a moving unit for moving a container 1. The upstream side of each track is joined to another conveyor 301, where a track selector is located. The upstream side of each track need not necessarily be joined to another conveyor 301. The upstream of the track may be open-ended. In that case, a molding area A2 for molding a container 1, an inspection area A3 for inspecting a molded container 1, or an accumulation area for accumulating a molded container 1 or a post-inspected molded container 1 may be located the upstream end of the truck.

In the line B, there are two sets of an optical marking device 100b and a material handling robot that performs operations such as mounting a container 1 from the conveyor 301 to the optical marking device 100b or returning the post-marked container 1 from the marking device 100b to the conveyor 301.

The type of optical marking device or the number of sets of optical marking devices to be disposed may be optionally determined as desired. The material robot in FIG. 39B can be replaced by a person. That is, the container 1 on the conveyor 301 may be mounted on the optical marking device 100b, or the container 1 may be returned to the conveyor 301 from the marking device 100b after the optical marking has been completed.

At a location somewhere along line C, a track selector 380 is arranged at which three tracks are branched. A single optical marking device 360 is positioned in each branch track. The number of branching tracks and the type and number of optical marking devices to be disposed can be selected optionally as needed.

Even when a plurality of optical marking devices must be disposed, the longitudinal length of the conveyor 301, which is a moving unit, may be shortened by installing a plurality of multiple branched tracks, such as the line C.

On line D, four optical marking devices 100d are alternately arranged around the conveyor 301. The type, number, arrangement location, and arrangement side of the optical marking device to be placed can be changed as needed. The work of picking up the container 1 on the conveyor 301 and setting the container 1 to the optical marking device 100d or returning the container 1 from the marking device 100b to the conveyor 301 after the optical marking is completed is performed manually. However, it is possible to perform these tasks automatically by placing a material robot such as the material robot disposed in the example of the line B.

In the line E, three optical marking devices 360 and three optical marking devices 370 are disposed around the conveyor 301. In this arrangement, information, such as letters or images, can be integrally formed in the side area of the container 1 by the three optical marking devices 360 on the upstream side, and information, such as letters or images, can be integrally formed in the inclined area (shoulder) of the container 1 by the three optical marking devices 370 on the downstream side. Different types of optical marking devices can be placed on the same track, and the optical marking functions of each type of optical marking device can be utilized to form different information or the same information at different positions on the container 1. In other words, the line E divides the information to be formed on the container 1 and separately forms the divided information by a different optical marking device. Line F has the same configuration as the line E.

Multitrack Convergence Points in the Pre-Filling Optical Marking Area

On the downstream side of FIG. 39B, there are three convergence points at which a plurality of conveyors 301 carrying a container 1 merge.

Similar convergence points are located at a point slightly downstream from the center of line C. At these convergence points, it is desirable to provide a buffer zone of a predetermined size in order to facilitate the flow or convergence of the containers 1. Further, if the transport speed at the downstream side of the convergence point is higher than the transport speed at the upstream side of the convergence point by a predetermined ratio, smooth convergence can be achieved.

High Speed Layout in the Pre-Filling Optical Marking Area

By providing a plurality of lines having the same arrangement of optical marking devices, such as lines F and E, the information forming process of letters or images on the container 1 can be accelerated.

In particular, when the process of forming letters or images on the container 1 is slower than the downstream process of filling the container 1 with beverage liquid, a plurality of lines having the same arrangement of the optical marking devices can be disposed, thereby reducing the speed difference between the two processes.

If possible, it is desirable to provide a large number of lines in which optical marking devices are disposed so that the speed of the process of forming letters or images on the container 1 is increased to the same extent as, or a higher speed than the speed of the downstream process of filling the container 1 with beverage liquid or the like. When the speed of the filling process is increased to a certain extent, the predetermined number of in lines can be made to be spare lines for speed adjustment when multiple lines are disposed. Or when a failure occurs in a line, the failed line can be stopped and replaced by an alternative line for switching to an alternative line.

Selective Use of Multitrack in the Pre-Fill Marking Area

A plurality of lines having a predetermined number and a predetermined type of optical marking device, as in FIG. 39B, allows selective use of each line.

For example, in the case of the pre-filling optical marking area M1 having five lines B to F as illustrated in FIG. 39B, when it is desired to form information such as letters or images only on the shoulder of the container 1 on the track, it is necessary to use a line having an optical marking device 100b or an optical marking device 370 capable of forming information on the shoulder portion. That is, in the case of FIG. 39B, the line B, the line E, and the line F. To cause the container 1 to flow into the three lines of line B, line E, and line F, it is possible to operate the track selector upstream of each line. Alternatively, a stopper can be inserted near the track selector upstream of the unused line to prevent the container 1 from being conveyed. The stopper insertion can also be performed with an electrically-driven stopper connected to predetermined controller or performed by manual power.

In the embodiment of FIG. 39B, when a stopper is provided at an upstream portion of the line C and the line D, the container 1 flows into three lines B, E, and F, and information is formed on the shoulder of the container 1. The optical marking devices 360 in the line E and line F need not be used if no information need to be formed on the side of the container 1. In this case, the optical marking devices arranged in each of the line E and the line F may be selectively used, rather than using all the optical marking devices in the corresponding line.

Selective use of the optical marking devices is performed by a controller 6 connected to each optical marking device, a network I/F 509 which is a wired or wireless communication unit of the control PC 321, and a host control device which is wired or wirelessly connected to the communication unit. For example, selective use of the optical marking devices can be made by using the communication unit to turn on the power of the three optical marking devices 370 disposed in the line E and the line F while the three optical marking devices 300 disposed in the line E and the line F remain stopped without turning the power on. In this case, three optical marking devices 370 disposed in the line E and three optical marking devices 370 disposed in the line F form the same information in parallel on the containers 1 at approximately the same time.

As described above, when a plurality of lines having a predetermined number and a predetermined type of optical marking devices is disposed, and each line is selectively used, it is possible to adjust the speed of the pre-filling optical marking process or selectively use lines having different functions. In addition, when a part of the lines cannot be used due to a failure of the optical marking device, it is possible to stop the line from being used and switch to another line.

From this pre-filling optical marking area M1, the containers 1 on which information, such as letters or images, is formed by the optical marking device 360 or the like are sequentially or continuously supplied to the downstream work area through a moving unit, such as a conveyor 301.

Specific work areas located downstream include: an accumulation area A4 for temporarily accumulate a container 1 on which information is formed; a filling area A6 for filling a container 1 with liquid beverages, and the like sequentially or continuously moved from a pre-filling optical marking area M1; pre-filling process areas for performing various types of pre-filling processes, such as a disinfection area for disinfecting the container 1 before being filled with liquid beverages, and a cleaning area A5 for cleaning the container 1.

Host Control Device at Bottling Factory

The bottling factory, which is a manufacturing system of container products containing beverage liquids, and the like, is equipped with a host control device. The host control device has the hardware configuration illustrated in FIG. 7, similar to the controller 6 and the control PC 321 described above. The network I/F 509, which is a wired or wireless communication unit of the host control device, is connected directly to all optical marking devices in the bottling system (factory) or via a wired or wireless communication path through a controller 6 of the optical marking device or the control PC 321.

The host control device can be used for each individual optical marking device, such as power control for turning on and off the power supply of the individual optical marking device connected to the host control device, individual functional control on such as the laser head 310, the dust collector 315, the cooling system 322, the control PC 321, the laser controller 320, and the like, control of forming information (pattern data) such as font information, font information of letter information, size information (points) of letter information, image information, and information on the forming position of letter or image information formed on the container 1, control of processing parameters such as laser beam application time and period, laser beam power, stop sequence control, start sequence control, and self-diagnostic function control.

The host control device is also connected to a moving unit for moving the container 1, such as a conveyor 301, and can remotely control the turning on and off of the moving unit or receive an operation status signal regarding the operating status of the moving unit.

The host control device is also connected with a communication unit to a branch point of the moving unit (track) of the container 1 or a device (track selector) disposed at an intersection point to select the moving unit (track) of the downstream side (track selector) to which the container 1 moved from the upstream side of the container 1 should be moved. The host control device can drive a driving unit such as an electric motor of the track selector, an electromagnetic magnet, or the like, and can monitor the status of the track selector.

If the track selector is operated by an operator, the host control device may support the set position of the track selector with a lamp or the like or receive the set position of the track selector from the operator.

Accordingly, the host control device can control the multitrack track path constructed from the track line B illustrated in FIG. 39B to the track line F. For example, the track line C, the track line E, and the track line F may be stopped, and information may be formed on the container 1 in the track line B and the track line D.

The host control device may also control the operation of all the optical marking devices illustrated in FIG. 39B. For example, if information needs to be formed only on the shoulder of container 1, only an optical marking device capable of forming information on the shoulder of the container 1 can be effectively used by closing the track line C and the track line D, and turning off the power of all optical marking devices 300 of the track line E and the track line F.

In this manner, the provision of a host control device allows for selective control of a plurality of the truck lines disposed in the pre-filling optical marking area M1 inside the bottling factory, which is a container product manufacturing system, to selectively utilize or stop a plurality of track lines.

Further, by providing the host control device, it is possible to selectively control the optical marking devices to selectively use or stop the plurality of optical marking devices disposed in the pre-filling marking area M1 inside the bottling factory, which is a container product manufacturing system. In particular, when a plurality of optical marking devices disposed in the pre-filling optical marking area M1 are different types of optical marking devices having different functions, it is possible to perform selective control with respect to the selection of functions of the optical marking devices, the control by type of optical marking devices, the number of driving units of the optical marking device, and the like.

Accumulation Space Downstream of the Pre-Fill Optical Marking Area M1

An Example of the Next Work Area Beyond the conveyor 301 downstream of the pre-filling optical marking area M1 illustrated in FIG. 39A or 39B is the accumulation area A4 illustrated in FIG. 34.

The accumulation area A4 includes an accumulation space in which a large amount of containers 1 on which information such as letters and images formed by a collection of microscopic patterns are integrally formed, can be accumulated.

The containers 1 accumulated in the accumulation area A4 may each be a container 1 that is subject to information formation such as letters or images by the optical marking device 300, and is subsequently subject to quality inspection by an imaging device such as a camera with respect to the formed information such as letters or images. Thus, the containers 1 in the accumulation area A4 may each be a container 1 that has passed a certain level of quality. In addition, these containers 1 may also be accumulated in a standing state in the accumulation space with a predetermined size. These containers 1 may be packed in boxes such as cardboard boxes in tens of units and accumulated in accumulation space with the cardboard boxes stacked in stages.

From the accumulation area A4, the containers 1 having information such as letters or images formed by the optical marking device 300 or the like can be fed to the filling area A6 via a moving unit such as the conveyor 301.

Multiple Accumulation Spaces

A plurality of accumulation spaces may be disposed in the accumulation area A4. By increasing the number of accumulation spaces disposed, more containers 1 can be accumulated. The plurality of accumulation spaces may be arranged in a plane on the same plane. In this case, access to the accumulated containers 1 is facilitated.

A plurality of accumulation spaces may also be arranged in three dimensions. The accumulation spaces may be disposed on multiple planes of different heights. In such a case, the floor area of the entire accumulation area A4, in which a large amount of the containers 1 is accumulated, can be reduced, and the area of the entire production system (factory) in which the container products 7 filled with beverage liquids are produced, can be reduced.

Each accumulation space is connected with a moving path composed of a conveyor belt, conveyor roller, or the like for carrying the container 1. Further, the conveyor belt or the conveyor roller is connected to each accumulation space, if necessary, for moving the container 1 from the accumulation space to the next work area.

In the accumulation area A4, branches may be provided at a plurality of locations in a moving path composed of a conveyor belt, a conveyor roller, or the like for moving the container 1. One or more moving paths branched from this moving path is provided. The branched moving paths are connected to predetermined destinations so that the container 1 is moved to the predetermined destinations through the branched moving paths. One of the predetermined destinations is an accumulation space. Another destination is one of the work areas which are various types of pre-filling processing areas downstream of the accumulation space or the accumulation area A4. The pre-filling processing areas are areas in which pre-filling processing is performed before filling the container 1 with liquid beverages. The pre-filling processing areas includes a disinfecting area for disinfecting container 1 and a cleaning area A5 for cleaning container 1.

Still another destination is one of the work areas downstream of the accumulation space, which is a filling area A6. In the filling area A6, the filler A6 is installed to fill the container 1 with liquid beverage or the like.

Function of the Accumulation Space Downstream of the Pre-Filling Optical Marking Area M1

A large amount of the containers 1 accumulated in the accumulation area A4 serve as a buffer function to bridge the gap between a filling speed and information formation speed. This gap or difference between the filling speed and the information formation speed is a first technical issue. The filling speed is a speed to fill the container 1 with contents such as beverages, and the information formation speed is a speed to integrally form information such as letters and images formed by microscopic patterns and a collection of these microscopic patterns on the surface or inner surface of the container 1. That is, if, before the filler A6 fills the containers 1 with contents, a large number of empty containers on which information such as letters and images is integrally formed are prepared and accumulated in the accumulation area A4, it is possible to send to the filler A6 a number of containers 1 commensurate with the filling speed of the filler A6.

Post-Processing of Marking Area M1

After the information is integrally formed on the container 1, the container 1 is removed from the optical marking device (100, 100b, 100d) either manually or by a material handling device (material handling robot) and transferred to a moving unit, such as a belt conveyor or a roller conveyor.

In a case of the optical marking device 300 illustrated in FIG. 35, the conveyor 301 moves the container 1 to the desired location. The moving destination of the container 1 by means of a moving unit such as a belt conveyor or a roller conveyor may be an accumulation area A4 for temporarily accumulating a large amount of the containers 1 or storing the containers 1 in a cardboard box or the like. Or the moving destination of the container 1 may be an inspection area where a camera or a test robot with a camera inspects the formation status of letters, images, or the like formed by means of an optical marking device or the molding results (presence or absence of scratches or dents) in the aforementioned molding area A2.

This inspection area is a separate inspection area from the inspection area A3 that exists prior to (upstream of) the pre-filling optical marking area M1 described above. The inspection area A3 may be omitted if the molding results in the molding area A2 can be inspected (scratches or dents present) in this inspection area.

The inspection area disposed downstream of the pre-filling optical marking area M1 may be omitted when the information forming quality by the optical marking device is expected to be above a predetermined level or when a more downstream inspection is performed. However, if the molding defect in the molding area A2 and the marking defect in the pre-filling optical marking area M1 are overlooked, the quality defective container 1 becomes a defective product at the level of the container product that is already filled with the liquid beverage or the like, and thus waste is increased.

Accordingly, it is desirable to provide an inspection area downstream of the pre-filling optical marking area M1 and upstream of the filler A6 for filling the container 1.

If the inspection area is provided upstream of the accumulation area A4 which accumulates the containers 1 downstream of the pre-filling optical marking area M1, it is possible to accumulate in the accumulation area A4 the high quality containers 1 which have passed the inspection of the formed state of information such as letters and images by the optical marking device and the inspection of the molding result in the molding area A2 (presence or absence of scratches and dents).

Description of Filling Area

The filling area A6 illustrated in FIG. 34 is described below. A container 1 is fed to the filling area A6 from a work area, such as the inspection area and the accumulation area A4, by means of a moving unit, such as a conveyor 301, in sequence or on an ongoing basis.

The filling area A6 is provided with a disinfector for disinfecting the container 1 on which information such as letters and images is integrally formed by spraying disinfecting solution on the container 1. The filling area A6 is also provided with a cleaning device for cleaning the container 1 by blowing clean water into the inside of the container 1 on which information such as letters and images is integrally formed and spraying clean water on the surface of the container 1.

When the information is integrally formed on the container 1 by the optical marking device, dust or dirt is generated. Therefore, it is very effective to perform cleaning of the container 1 by the cleaning device after the information is integrally formed on the container 1 by the optical marking device. In other words, it is important that the information formation process of integrally forming the information on the container 1 by the optical marking device or the like is disposed upstream of the cleaning process of cleaning the container 1 by the cleaning device or the like.

As illustrated in FIG. 34, the filling area A6 includes a filler A6 for filling a container 1 with contents such as a liquid beverage, and a sealing area A7, which includes a sealer for sealing the container 1 filled with contents 9 such as a liquid beverage with a cap, which is a sealing member.

Description of Liquid Beverage Manufacturing Line

A liquid beverage manufacturing line B illustrated in FIG. 35 will now be described. The liquid beverage manufacturing line B has a preparation tank in which undiluted liquids and other necessary ingredients of black tea, Japanese tea, coffee, various juices, mineral water, carbonated beverages, and the like are formulated in a determined ratio to form a product. The product liquid is fed from the preparation tank through pipes to the sterilizer in the next process, which sterilizes the product liquid at high temperatures from 120° C. to 140° C. Depending on the type of product liquid and the sterilization method, the product liquid may be delivered to the next process through a sterilized storage tank while being kept at a high temperature, or the product liquid may be delivered to the next process through a sterilized storage tank after being sterilized by rapid cooling from a high temperature. In the former case, the filler A6 in the next process performs high-temperature filling, while in the latter case, the filler A6 in the next process performs low-temperature filling or ordinary-temperature filling.

The sterile storage tank and filler A6 are connected by pipes and the sterilized product liquid is fed from the sterilized storage tank to filler A6.

Description of Filling Process: Filler A6

A filler A6 disposed in the filling area A6 receives the cleaned container 1 supplied from the cleaner and a product liquid such as liquid beverages supplied from the sterile storage tank, and fills the container 1 with the product liquid via the filling nozzle of the filler. To increase the speed of the filling process, a number of filling nozzles are provided (e.g., 20 to 30 nozzles) to simultaneously fill a plurality of the containers 1 with product liquid in parallel. The speed of the filling process is high enough, for example, to allow filling of approximately 1,000 containers per minute.

If hygienic considerations are important, the filler A6 receives the product liquid from the sterile storage tank at a high temperature (e.g., 85° C.), and fills the container 1 with the product liquid. High temperature filling has the advantage of maintaining a sterile condition, but since the container is filled with the product liquid at a high temperature, the heat resistant container 1 having the heat resistance is required. Thus, the molding process is complicated by the fact that the heat resistant container 1 is more costly, thicker, and heavier than the non-heat resistant container. For example, the preform itself is very bulky, and the preform for heat resistant containers is very large.

Accordingly, ordinary-temperature filling is often used to fill the container 1 with the product liquid at an ordinary temperature (e.g., 30° C.) by the filler A6.

Description of Filling Process: Sealing Area A7

A sealing area A7 is disposed downstream of the filler A6 in the filling area A6 to securely attach a cap that is a sealer to the product liquid-filled container 1.

The sealing area A7 is supplied with a large number of sterilized caps. In the case of high temperature filling, the cap may be supplied or fitted in a non-sterile condition. Instead, the container 1 filled with the product liquid and capped while it is at a high temperature is tilted to a predetermined time, e.g., 90 degrees for 30 seconds or more, and the heat of the high temperature product liquid is used to sterilize the inside of the container product 7, particularly the mouth (opening) of the container 1 and the cap. In the case of high-temperature filling, cooling to about room temperature is performed by the cooling unit after rollover sterilization.

The filling area A6 should preferably be located entirely within a sterile room. In addition, it is preferable that each of the disinfectant, cleaning equipment, filler A6, and sealing area A7 be shielded and have a sterile room inside the shield.

Description of Post-Filling Process: Accumulation Area A8

As illustrated in FIG. 34, downstream of the filling area A6, an accumulation area A8 is provided in which a container product 7 filled with product liquid and fitted with a cap conveyed by a moving unit such as a conveyor 301 is temporarily accumulated. The accumulation area A8 has a predetermined size so that the flow of the container product 7 filled with product liquid on the line and capped can be adjusted.

Description of Post-Filling Process: Labeling

A labeling area A9 is optionally disposed downstream of the accumulation area A8 to attach a film-like label to the container product 7 and then heat with steam to shrink the label so that the film-like label is tightly affixed to the surface of the container product 7.

For environmental reasons, it is preferable that there be no label attached to the container 1 in order to recycle the container 1 efficiently. Furthermore, in this embodiment, since information such as letters and images are integrally formed on the container 1, the label is basically unnecessary.

Thus, the labeling area A9 may be omitted if environmental measures are to be prioritized. However, even if the container 1 includes information such as letters and images that is advantageous for environmental measures, it may be worthwhile to use labels to further enhance the appeal.

The container product 7 includes hybrid information including a first information member, such as letters or images, which are integrally formed on the container 1, and a second information member, such as letters or images, which are indicated on a label.

For example, environmental defects can be minimized by reducing the area of the label or by creating a shape with easy-to-peel material or wavy cut lines.

In the case of the hybrid container product 7 having the hybrid information composed of the first information member, such as letters and images integrally formed on the container 1, and the second information member, such as letters and images indicated on the label, it is desirable that important information regarding the contents such as the name of the contents (tea, water, coffee, and the like), information on raw materials (domestically produced green tea, and the like), indication of the ingredients of the contents, the name of the manufacturer, the name of the seller, the address of the customer, telephone number, Internet access information (URL information), product name, trademark of the product, date and time of manufacture, best-before date, and the like be integrally formed on the container 1.

Even if the label is removed from the hybrid container product 7, the important information described above remains on the container product 7.

Description of Post-Filling Process: Cap Printing Area A10

As illustrated in FIG. 34, a cap printer A10 for printing the best-before date and the manufacturing date and time on the cap of the container product 7 is provided in the printing area A10, which is located downstream of the filling area A6. The cap printer A10 may be an ink jet printer type printer that ejects ink onto the cap to print the best-before date or the manufacturing date and time.

The cap printer A10 may be an information forming device such as the optical marking device 300 illustrated in FIG. 35. That is, information such as numbers, letters, and images relating to the best-before date and the manufacturing date and time can be integrally formed on the cap, which is a sealing member for sealing the container 1, in a non-contact manner. The information is formed by a first microscopic pattern and a collection of the second patterns.

After the information required for the cap is recorded or integrally formed on the cap, the container product 7 including the container 1 filled with the contents 9 is shipped to the outside from a factory, and the like, which is a container product production system, through the following areas, which includes: a packing area A11 in which the container product 7 is packed in a box such as a corrugated board or plastic case; a weight inspection area A12 in which the weight of a predetermined number of the container products 7 packed in a box is checked to inspect whether the correct numbers of the container products 7 and the contents, such as a beverage liquid; and a pallet area A13 in which a palletizer A13 on which a predetermined number of boxes packed with container products 7 are placed side by side in order to move the palletizer A13 by a forklift.

Description of Post-Filling Process: Records of Best-Before Date and Manufacturing Date and Time A variety of information is recorded or formed on the container 1. Namely, on the container 1 integrally formed information is displayed in any size; for example, information on the material of the container 1, the recycling properties of the container 1, the name of the contents such as beverage stored in the container 1 (tea, water, coffee, carbonated water, and the like), information on the raw materials of the storage item (domestic green tea, and the like), the ingredients of the storage item, the name of the manufacturer, the name of the seller, the address of the contact destination such as the customer center, and the like, the telephone number, access information via the Internet (URL information), the product name, the trademark of the product, the manufacturing date and time, the best-before date, and the like, or other information on the container 1 or the storage item, are displayed using Arabic numerals, alphabetical letters, hiragana letters, katakana letters, or the like, or unique letters such as kanji letters, as well as digital marks such as barcodes and QR codes, or marks in a predetermined shape such as the recycling mark on the container 1 and the cap.

Examples of various types of information recorded or formed on the container 1 include fixed information that is unlikely to be changed for a certain period of time, and variable information that varies by date and time.

Examples of the fixed information include information on the material of the container 1 and the recycling properties of the container 1, the name of the contents (tea, water, coffee, carbonated water, and the like), information on the raw materials of the contents (domestic green tea, and the like), information on the ingredients of the contents (domestic green tea, and the like), the name of the manufacturer, the name of the seller, the address and the telephone number of the customer center, the access information via the Internet (URL information), the product name, the product trademark, and other information on the container 1 and the contents.

Those belonging to the variable information that varies in units of date and time are, for example, the date and time of manufacture, the best-before date, and the like.

The container manufacturing systems, such as bottling factories, that produce large quantities of container products filled with beverage liquids often require a long period of time between the start of the process and the final stage of the process. The process may often spread across two days.

Thus, it is desirable that the information recorded or formed on the container product, which varies on a date-time basis, be done close to the final stage of the container product production process performed in the container product manufacturing system. Specifically, it is preferable that variable information be recorded or formed on the container product after the container is filled with the contents such as beverage liquid.

Information Formation Process: Pre-Filling Information Formation and Post-Filling Information Formation In the optical marking device illustrated in FIG. 34, a pre-filling optical marking area M1 is provided upstream of the filling area A6.

In the container product manufacturing system of FIG. 34, a plurality of optical marking devices or an accumulation area A4 is provided to produce a large number of containers 1 on which information such as letters, images, or the like formed so as to match the speed of the filling process performed in the filling area A6. Therefore, a certain amount of time is required to complete the process.

Thus, it is desirable to integrally form the fixed information, which is unlikely to change for a certain period of time before the filling process, on the container 1, and additionally arrange the optical marking device after the filling process in order to integrally form the variable information which varies in time of day, and the like on the filled container by the additional optical marking device. In this embodiment, it is preferable that the additional optical marking device is disposed downstream of the sealing area A7 or the accumulation area A8.

In this embodiment, upstream and downstream of the filling process, a container product manufacturing system for manufacturing a container product containing a beverage liquid such as a bottling factory for forming information on the container product is described.

Specifically, this embodiment is a container manufacturing system or a container manufacturing method for manufacturing a container containing a beverage liquid or the like in a bottling factory or the like, wherein a first information forming unit is provided upstream of the filler configured to fill the container with contents, a second information forming unit is disposed downstream of the filler, information about the container is formed by the first information forming unit so as to form a fixed information which is not subject to change for a certain period of time, and information about the container is formed by the second information forming unit so as to produce a container product containing a beverage liquid or the like in a bottling factory or the like. Recording of Information Formation Process: Post-Filling Information Formation Next, a production method and a production system (a factory) for producing the container product 7 suitable for the method for manufacturing a container product 7, which is a mode 2 (a method for manufacturing a container product 7 including filling the container with the contents 9, sealing the container with a sealing member 8, and then forming a pattern on the container 1), will be described.

Figure 40:
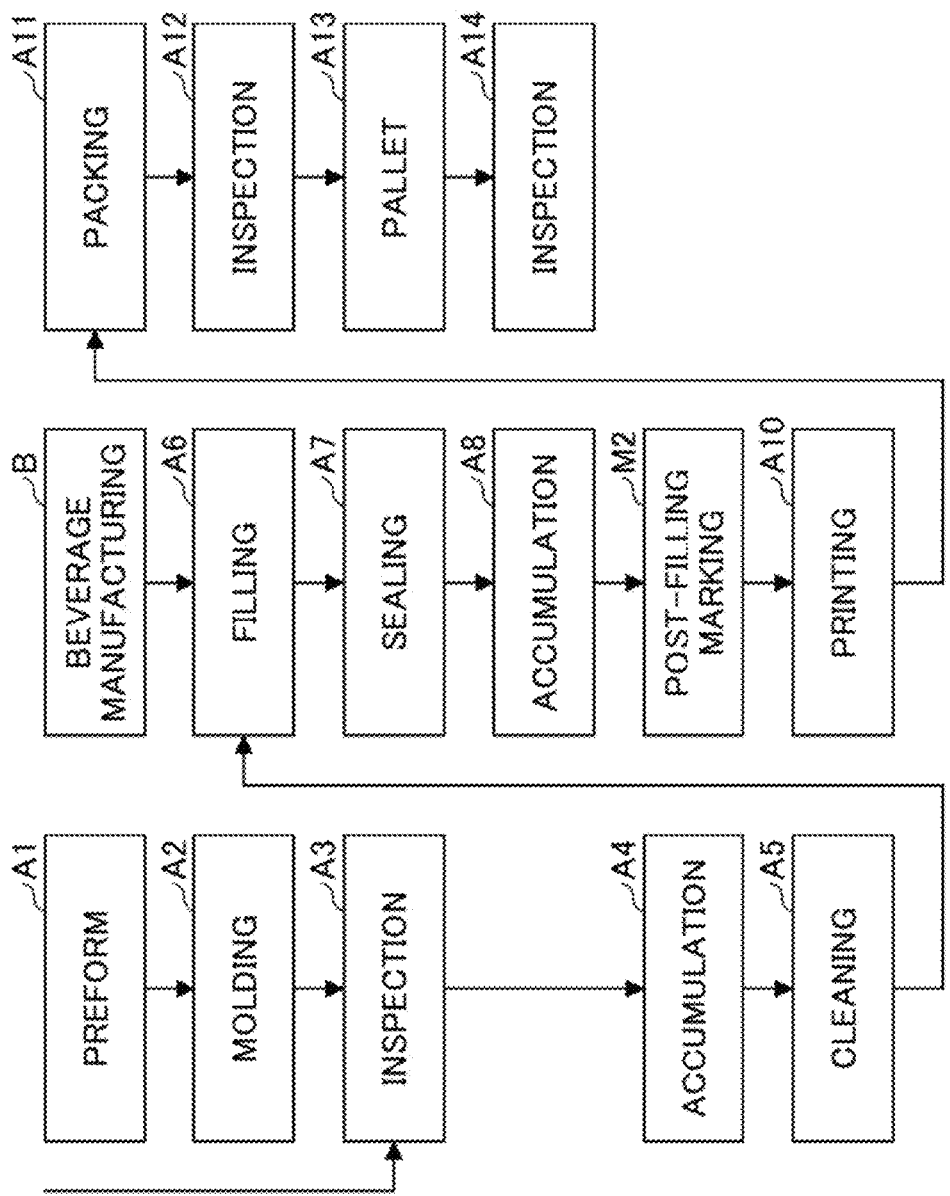
FIG. 40 is a diagram illustrating a production method and an entire production system (factory) for mass production of container products.

FIG. 40 is a diagram illustrating a production method and a production system (factory) for mass producing a container product 7 suitable for the method for manufacturing a container product 7, which is a mode 2 (a method for manufacturing a container product 7 in which the container 1 is filled with the contents 9, sealed with the sealing member 8, and then a pattern is formed on the container 1).

A major difference from the production system (factory) of the container product 7 illustrated in FIG. 34 is that at least one optical marking device is installed in which information is formed on the surface of the container 1, and a marking area in which information is formed integrally with a microscopic pattern on the surface of the container 1 and a letter or image formed by the collection of the microscopic patterns is formed is disposed downstream, not upstream, of the filling area A6.

Specifically, in the production method of mass producing the container product 7 and the production system (factory) illustrated in FIG. 40, a post-filling optical marking area M2 for integrally forming information such as letters and images on the container 1 is disposed downstream of the filling area A6, the sealing area A7, and the accumulation area A8. The configuration illustrated in FIG. 40 downstream of the preform warming area A1, the molding area A2, the inspection area A3, the filling area A6, the liquid beverage manufacturing line B, and the printing area A10 is the same as the configuration corresponding to the production system (factory) of the container product 7 illustrated in FIG. 34.

The post-filling optical marking area is provided with one or more optical marking devices that form information on the surface of the container 1. Multiple types of optical marking devices with different functions may be provided, as in the embodiment illustrated in FIG. 34.
Optical Marking Device in the Post-Filling Information Forming Mode The post-filling optical marking area M2 may have the same configuration as line A illustrated in FIG. 39A or the same configuration from line B to line F illustrated in FIG. 39B.

However, the holder 31 of the manufacturing device 100b, which is an optical marking device disposed on line B, and the manufacturing device 100d disposed on line D must be changed to a gripper 31b. The holder 31 holds the container 1 by inserting one end thereof into the mouth (opening) of the container 1. However, the cap member, which is a sealing member 8, is attached to the container 1 and cannot insert one end of the holder 31 into the mouth (opening) of the container 1 in the container product 7 which moves to post-filling optical marking area.

Accordingly, the changed gripper 31b grips the cap member or the periphery thereof that is the sealing member 8 attached to the container 1, and when the gripper 31b is rotated by a driving unit such as a motor, the container product 7 gripped by the gripper 31b can be rotated about the cylindrical axis 10. A rotatable container product 7 contains a liquid beverage as contents of the container product.

Thereafter, the manufacturing device 100b2 is defined as the manufacturing device in which the holder 31 of the manufacturing device 100b is changed to the gripper 31b, and the holder 31 of the manufacturing device 100d is changed to the gripper 31b and will be described as 100d2 of the manufacturing device.

It should be noted that the optical marking device 360 and the optical marking device 370 illustrated in FIGS. 39A and 39B can be used as an optical marking device disposed in the post-filling optical marking area M2 illustrated in FIG. 40.

Figure 41:
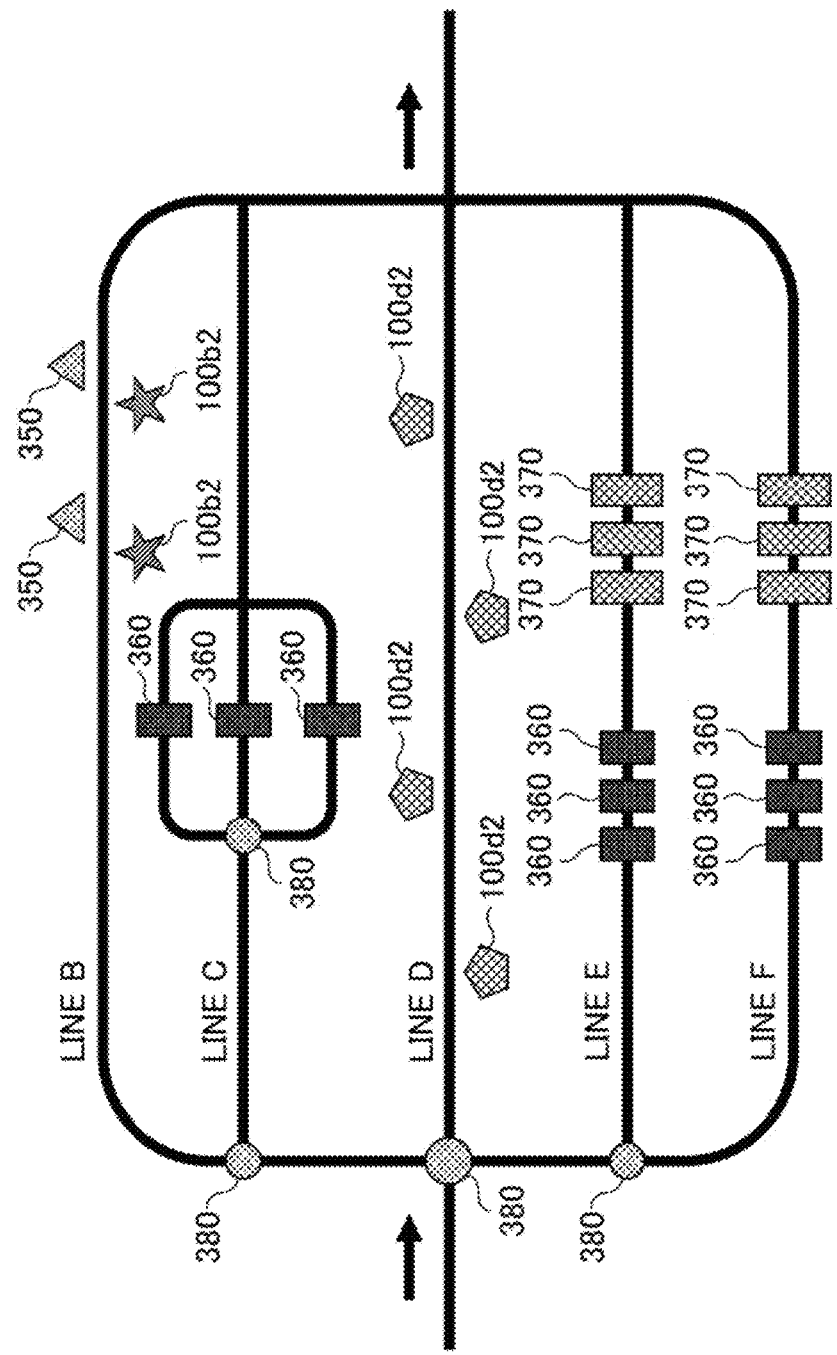
FIG. 41 is a diagram illustrating the arrangement of an optical marking device in a post-filling marking area.

In FIG. 41, there is illustrated a multitrack path constructed from track line B to track line F similar to the multitrack path constructed from track line B to track line F illustrated in FIG. 39B, and an optical marking device arranged in each line. In FIG. 41, a star mark indicates the optical marking device 100b2, so that information such as letters or images can be formed on the shoulder of the container 1. In FIG. 41, a pentagonal mark indicates the optical marking device 100d2, and information on letters or images can be formed on the side of the container 1.

Accordingly, in the post-filling optical marking area M2 illustrated in FIG. 40, a line A illustrated in FIG. 39A, a multitrack track path constructed from a track line B illustrated in FIG. 41 to a track line F, and an optical marking device arranged in each line are arranged.
Optical Marking Devices 360 and 370 in Post-Filling Optical Marking Area FIG. 42 illustrates an optical marking device 300 in a case where each of the optical marking device 360 and there optical marking device 370 illustrated in FIGS. 39A and 39B is installed in a post-filling optical marking area M2 illustrated in FIG. 40.

Figure 42:
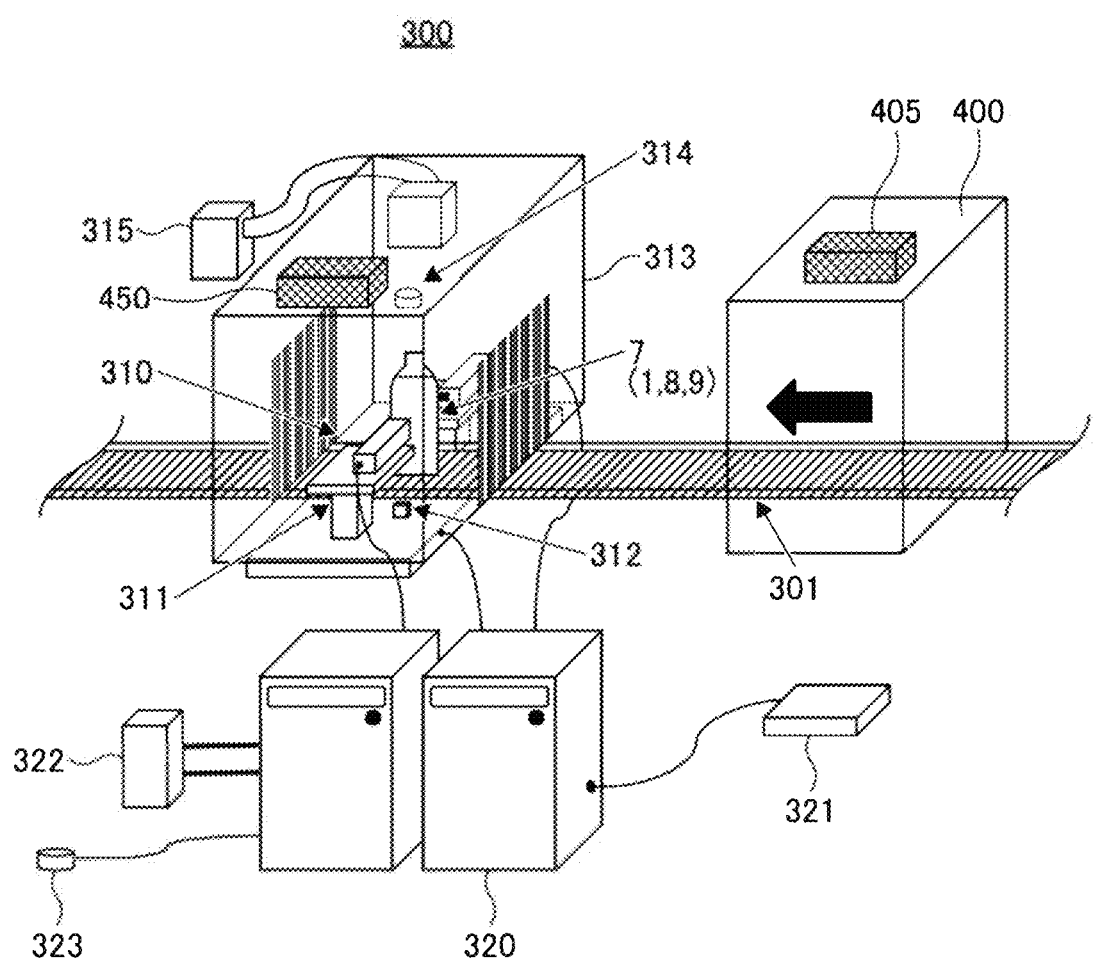
FIG. 42 is a diagram illustrating the structure of an optical marking device installed in a post-filling marking area.

The difference between FIG. 35 and FIG. 42 is that in FIG. 35, an empty container 1 having no contents 9 therein is mounted on the conveyor 301 and the empty container 1 and the laser head 310 are relatively moved by the conveyor 301, while in FIG. 42, a container product 7 containing contents 9 therein and sealed with the sealing member 8 is mounted on the conveyor 301 and the container product 7 containing the contents 9 and the laser head 310 are relatively moved by the conveyor 301.

As illustrated in FIG. 42, the container product 7 including the container 1 filled with contents 9 and sealed with the sealing member 8 may be placed on a conveyor 301, as is the case with an empty container 1 without contents 9 therein, and may enter through the entrance of the safety cover 313 and exit from the exit of the safety cover 313. As in the case of the container 1 of FIG. 35, the container product 7 including the container 1 that is filled with contents 9 and sealed with the sealing member 8 moves relative to the laser head 310 by a conveyor 301 which is a moving unit, and information such as letters, numbers or images is formed on the container 1 during the relative movement by the conveyer 301.

Important Features of the Post-Filling Information Formation: Weight

A technical difference exists between the information formation before the container 1 is filled with the contents and the information formation after the container 1 is filled with the contents and deals with a sealing member 8. The information formation before the container 1 is filled with the contents indicates a case where the information such as letters, numbers and images is integrally formed on an empty container 1 before the container 1 is filled with contents 9. the information formation after the container 1 is filled with the contents and deals with a sealing member 8 indicates a case where the information such as letters, numbers and images is integrally formed on a container product 7 obtained after a container 1 filled with contents 9 is sealed with a sealing member 8.

The first technical difference is the difference between the weight of the empty container 1 and the weight of the container product 7 including the container 1 containing (or filled with) the contents 9 and the sealing member 8 sealing the container product 7. Generally, the latter weighs more than the former by the sum of the weight of the contents 9 and the weight of the sealing member 8. This weight difference is considerably greater because it includes the weight of the contents 9, such as a liquid beverage. A difference of about 500 grams occurs for a volume of 500 cc for a container 1 and about 2000 grams for a volume of 2000 cc for the container 1.

In FIG. 42, a container 1 mounted on a conveyor 301 contains (or is filled with) contents 9, which is then sealed with a sealing member 8 to produce a container product 7. However, the container product 7 is considerably heavier than an empty container 1, so that the container product 7 is more stable than the empty container 1 while moving on the conveyor 301. Accordingly, the quality of the information formed on the container product 7 can be improved by integrally forming the information such as letters, numbers, images and the like on the container 1 after the container 1 is filled with the contents 9 using the manufacturing method and the manufacturing system of a container product as illustrated in FIG. 42, as compared to the case where the information such as letters, numbers, images and the like is integrally formed on the container 1 before the container 1 is filled with the contents 9.

Further, in a case where information such as letters, numbers, and images are integrally formed on the container 1 after being filled with contents, a transfer speed of the conveyor 301, which is a moving unit for moving the container 1 or the container product 7, can be expected to be faster than a case where information such as letters, numbers, and images is integrally formed on the container 1 before being filled with contents. If the transfer speed is increased, the production speed of the container product 7 is improved. This results in a significant effect.

In addition, when information such as letters, numbers, images, and the like is integrally formed on the container 1 after the container is filled with contents, the following special effects may be obtained. One of the special effects may be that the adjusting of temperature of the container may not be necessary. That is, the container product after being filled with a liquid or the like has a relatively large volume of the contents as compared with the state of the container in the empty state, and thus has a large heat capacity. Thus, the heat dispersion of the container product can be made faster by laser application. This indicates the laser application enhances faster heat dispersion of the container product, and hence, the information forming quality of letters, numbers, images, and the like is improved.

Further, the temperature of the beverage or the like to be filled may be controlled. By filling the temperature-controlled beverage, the temperature of the enclosure is also substantially controlled. The temperature controller of the present invention does not impose any limitation on the temperature control method and may also be configured to control the desired temperature of the filled beverage. That is, due to the characteristic of controlling the temperature of the beverage to be filled, the container integrated with the beverage filled in the container is in a state of being controlled by the desired temperature. As a result, the quality of information formation such as letters, numbers, and images is improved.

Important Features in Post-Filling Information Formation: Dust Measures

A second technical difference is the dust and dirt control. The dust or dirt is generated when the information such as numbers and images is integrally formed on the container 1 due to the act of light energy such as a laser.

When the information such as letters, numbers and images is integrally formed on the container 1 after the container 1 is filled with the contents 9 and subsequently sealed with the sealing member 8 using the container product manufacturing method and the container product manufacturing system as illustrated in FIG. 42, there is practically no risk for dust or dirt generated during information formation to enter the container 1.

Accordingly, it is advantageous to use an information formation method or system as illustrated in FIG. 42 which includes filling the container 1 with the contents 9, subsequently sealing the container 1 with a sealing member 8, and then integrally forming information, such as letters, numbers, images, or the like on the resulting container 1 to produce a container product 7, is extremely advantageous from the viewpoint of preventing dust and dirt.

Important Feature in Post-Filling Information Formation: Variable Information

A third technical difference is the recording or formation of variable information. On the container 1, information is integrally formed in any size using information about the material of the container 1, the recycling properties of the container 1, the name of the contents (tea, water, coffee, and the like), the raw material information of the contents (domestic green tea, and the like), the ingredient labeling of the contents, the name of the manufacturer, the name of the distributor, the address of the customer contact point, the telephone number, access information via the Internet (URL information), the product name, the trademark of the merchandise, the manufacturing date and time, the best before date, and the like, or information about the contents or the container 1, such as Arabic numerals, alphabetical letters, hiragana letters, katakana letters, and the like, or symbols in a predetermined shape, such as kanji, and marks in a predetermined shape, such as barcodes or QR codes, digital marks, such as recycling marks, and the like Of the information formed on the container 1, variable information such as the manufacturing date and time and best-before date is more accurate if it is formed on the container 1 as downstream as possible of the container manufacturing process.

Accordingly, when information such as letters, numbers, and images is integrally formed on the container 1 after the container 1 is filled with the contents 9 and sealed with the sealing member 8 using the method and the manufacturing system illustrated in FIG. 42, both the aforementioned fixed information and the variable information can be formed on the container 1 as downstream as possible from the container manufacturing process, and the variable information such as the manufacturing date and time, the best-before date, and the like can be effective as correct information reflecting the facts.

Important Feature in Post-Filling Information Formation: Temperature Effect from Contents 9

As described above, the property changes of the base material of the container 1 when the processing laser beam is applied into the container 1 has been described with reference to FIGS. 15A to 15F.

In fact, when the container 1 is filled with the contents 9, these property changes illustrated in FIGS. 15A to 15F are affected by the presence of the contents 9 and the light energy from the processing laser beam.

When information such as numbers, letters, and images is integrally formed on the container 1 using the light energy of the processing laser beam, greater whitening level or greater opacification level is achieved by forming the information, such as numbers, letters, and images on the container 1 filled with the contents 9, compared to forming the information such as numbers, letters, and images on the empty container 1. In addition, the adjustable range of light energy power, application time, and the like is wider and the whitening or whitish opacification with higher visibility is achieved by integrally forming the information such as numbers, letters, images, and the like on the container 1 filled with the contents 9 by using the light energy of the processing laser beam, compared to integrally forming the information such as numbers, letters, images, and the like on the empty container 1. It is conceivable that the heat capacity of the contents 9 contained in the container 1 are affected.

Accordingly, in the manufacturing method and the manufacturing system of the container product as illustrated in FIG. 42, when information such as letters, numbers, images, and the like is integrally formed on the container 1 after the container 1 is filled with the contents 9 and sealed with the sealing member 8, the heat capacity of the contents 9 can be utilized. Thus, it is possible to integrally form information on the container more stably in the manufacturing method and the manufacturing system illustrated in FIG. 42, compared to the manufacturing method and the manufacturing system illustrated in FIG. 34, in which the information such as letters, numbers, images, and the like is integrally formed on the empty container 1.

High Temperature Filling Process and Information Forming Process

As previously described, when hygiene is important, the filler A6 receives the product liquid in a high temperature state (for example, 85° C.) from the sterile storage tank and fills the container 1 with high temperature product liquid.

In addition, while high-temperature filling has the advantage of maintaining a sterile condition, the heat-resistant container 1 is required for filling the container 1 with high temperature contents, and the molding process is complicated, and is more costly due to heat-resistant container being thicker, and heavier than the non-heat-resistant container.

The high-temperature filling is performed by filling the container 1 with the contents 9 in a sterilizable high-temperature state. Thus, a certain high-temperature state is maintained even when the cap, which is the sealing member 8, is attached to the container 1 filled with contents 9 by the filler A6 and sealed with the sealing member in the sealing area A7.

Accordingly, when high temperature filling is performed, it is desirable that information such as letters, numbers, images, and the like be formed integrally on the container 1 before the container 1 is filled with the contents 9 by the filler A6.

That is, in the case of high-temperature filling of filling the container 1 with predetermined high-temperature contents, an optical marking device disposed in the pre-filling optical marking area M1 upstream of the filling area A6, as illustrated in FIG. 34, can be used to integrally form information such as letters, numbers, images, and the like on the container 1.

However, even in the case of high-temperature filling of filling the container 1 with predetermined high temperature contents 9, it may be desirable to integrally form information such as letters, numbers, images, and the like onto the container 1 using an optical marking device in the post-filling optical marking area M2 located downstream of the filling area A6, as illustrated in FIG. 40, depending on the arrangement and configuration of the bottling factory. In such a case, instead of the temperature control device 400 illustrated in FIG. 42, a temperature controller may be disposed between the sealing area A7 downstream of the filling area A6 and the post-filling optical marking area M2 to cool the container filled with the contents 9 and sealed with a sealing member 8 to a predetermined temperature (e.g., 30° C.). Accordingly, even in a case of high-temperature filling of filling the container 1 with predetermined high temperature contents 9, it is possible to integrally form information such as letters, numbers, images, and the like onto the container 1 using an optical marking device disposed in the post-filling optical marking area M2 downstream of the filling area A6.

The temperature controller includes four thermostatic tanks for storing water of a plurality of temperatures as a heat exchange liquid, and an outlet such as a nozzle. The temperature controller sprays high temperature water of, for example, 70° C., to cool the container product 7 one step down from the outside, then gradually decrease the temperature of the sprayed water, and at the final stage, sprays the low temperature water of, for example, 30° C., to the container product 7, thereby cooling the container product 7.

The multi-stage cooling method used in the temperature controller has the effect of preventing a change in the flavor of the contents 9, such as a beverage liquid contained in the container product 7.

It is preferable that the temperature of the liquid contained in the first tank of the temperature controller be 70° C. or less. At 70° C. or below, heat damage to the container 1 can be reduced by cooling the container product 7.

Ordinary Temperature Filling Process and Low Temperature Environment Information Formation Process As previously described, with reference to FIGS. 12A to 12D, the properties of the base material of the container 1 is changed upon the application of a processing laser beam onto the container 1.

In fact, when the container 1 is filled with the contents 9, these property changes illustrated in FIGS. 12A to 12D are affected not only by the light energy from the processing laser beam but also by the temperature conditions of the contents 9.

When information, such as numbers, letters, and images is integrally formed on the container 1 using the light energy of the processing laser beam, the greater whitening level or whitish opacification level is obtained by forming the information on a container 1 filled with low temperature (for example, 20° C. or less) contents 9, compare to forming the information on a container 1 filled with higher temperature (for example, 30° C.) contents 9. In addition, the adjustable range of light energy power, laser application time, and the like will be wider, and whitening or whitish opacification with higher visibility will be easily achieved by forming the information on a container 1 filled with the low temperature (e.g., 20° C. or less) contents 9, compared to forming the information on a container 1 filled with the higher temperature (e.g., 30° C.) contents 9. This result obtained appears to be affected by the temperature of the contents 9 contained in the container 1.

Accordingly, in the manufacturing method and the manufacturing system of the container product such as those illustrated in FIG. 40, it is desirable to form information such as numbers, letters, images, and the like on the container 1 that has been filled with low temperature (e.g., 20° C. or less) contents 9 even when the filler A6 fills the container 1 with ordinary temperature (e.g., 30° C.) contents 9. In such a case, instead of the temperature control device 400 illustrated in FIG. 42, in FIG. 40, the above-described temperature controller may be disposed between the sealing area A7 and the post-filling optical marking area M2 downstream of the filling area A6 to cool the container product filled with the contents 9 sealed by the sealer to a predetermined temperature (e.g., 20° C.). As a result, information such as letters, numbers, images, and the like can be integrally formed on the container 1 using an optical marking device disposed in the post-filling optical marking area M2 downstream of the filling area A6 even in the case of an ordinary temperature filling of filling the container with the contents 9 is performed at a predetermined ordinary temperature (e.g., 30° C.).

The temperature controller includes, for example, two to four thermostatic tanks for storing water of a plurality of temperatures as a heat exchange liquid, and an outlet such as a nozzle. The temperature controller initially sprays low temperature water (e.g., 28° C.) to cool the container product 7 down one step down from the outside, then gradually lowers the temperature of the sprayed water, and finally sprays low temperature water (e.g., 20° C. to 18° C.) to the container product 7, thereby cooling the container product 7.

Summary

As described above, a method for manufacturing a container product 7 according to an embodiment of the present invention includes
a filling step A6 of filling a container 1 with contents 9;
an information forming step of forming information such as numbers, letters, images or the like on the container 1; and
temperature controlling steps of heating or cooling the container 1 performed by the temperature controllers 405 and 450 before or after forming of information such as numbers, letters, images or the like on the container 1. The information forming step may be performed either in a pre-filling optical marking step M1 or a post-filling optical marking step M2. The information, such as numbers, letters, and images, is an example of the pattern 11 formed on the container 1.

Specifically, the method for manufacturing a container product 7 includes
a temperature controlling step, by a temperature controller 405, of heating the container 1 before forming of information, such as numbers, letters, and images, on the container 1 by the application of a processing laser beam using the laser head 310. Accordingly, when the laser application energy of the processing laser beam is the same, the absorbance of the processing laser beam on the container 1 increases. Thus, the inside and the surface of the base material 1a of the container 1 can be sufficiently foamed and opacified, and the visibility of the pattern 11 is improved.

Alternatively, the method for manufacturing a container product 7 includes
a temperature controlling step, by a temperature controller 405, of cooling the container 1 before forming of information, such as numbers, letters, images, or the like, on the container 1 by the application of a processing laser beam using the laser head 310. This method can reduce the effect of HAZ during application of the processing laser beam, and the visibility of the pattern 11 can be improved by ablation. Further, this method can prevent the growth of foam inside and on the surface of the base material 1a of the container 1 from becoming excessive, and make the inside and the surface of the base material 1a opacified with fine foaming. As a result, the visibility of the pattern 11 is improved.

The method for manufacturing a container product 7 includes a temperature controlling step, by a temperature controller 450, of cooling the container 1 after forming information such as numbers, letters, and images on the container 1 by the application of a processing laser beam applied using the laser head 310. This method can prevent the growth of foam inside and on the surface of the base material 1a of the container 1 from becoming excessive, and make the inside and the surface of the base material 1a opacified with fine foaming. As a result, the visibility of the pattern 11 is improved.

A manufacturing method according to an embodiment of the present invention is a method for manufacturing a container product 7. The method includes
an information forming step of forming information, such as numbers, letters and images, on a container 1; and
a filling step A6 of filling the container 1 with contents 9, wherein the filling step A6 is performed after a pre-filling optical marking step M1, which is an example of the information forming step.

A manufacturing method according to an embodiment of the present invention is a method for manufacturing a container product 7. The method includes
an information forming step of forming information, such as numbers, letters, images, and the like, on the container 1;
a filling step A6 of filling the container 1 with contents 9; and
a sealing step A7 of sealing the container 1 filled with the contents 9, wherein the filling step A6 is performed after the pre-filling optical marking step M1, which is an example of the information forming step.

A manufacturing method according to an embodiment of the present invention is a method for manufacturing a container product 7. The method includes
an information forming step of forming information such as numbers, letters, images or the like on a container 1;
a cleaning step A5 of cleaning the container 1;
a filling step A6 of filling the container 1 with contents 9; and
a sealing step A7 of sealing the container 1 filled with the contents 9, wherein the filling step A6 is performed after the cleaning step A5 and before the sealing step A7.

A manufacturing method according to an embodiment of the present invention is a method for manufacturing a container product 7. The method includes a filling step A6 of filling a container 1 with contents 9; and an information forming step of forming information such as numbers, letters, images, and the like on the container 1, wherein a post-filling optical marking step M2 which is an example of the information forming step is performed after the filling step A6.

A manufacturing method according to an embodiment of the present invention is a method for manufacturing a container product 7. The method includes a filling step A6 of filling a container 1 with contents 9; and an information forming step of forming information such as numbers, letters, images or the like on the container 1, wherein the information forming step is performed both before and after the filling step A6. The pre-filling optical marking step M1, which is an example of the information forming step, is performed before the filling step A6, and the post-filling optical marking step M2, which is another example of the information forming step, is performed after the filling step A6.

A manufacturing method according to an embodiment of the present invention is a method for manufacturing a container product 7. The method includes a pre-filling optical marking step M1, which is an example of a first information forming step of forming numbers, letters, images, or the like on a container 1;

a filling step A6 of filling the container 1 with contents 9; and a post-filling optical marking step M2, which is an example of a second information forming step of forming information such as manufacturing date and time and best-before date on the container 1.

A manufacturing system of a container product 7 according to an embodiment of the present invention includes a filler configured to fill a container 1 with the contents 9 in the filling step A6;

an optical marking device 300, which is an example of an information forming unit configured to form information including numbers, letters, images, and the like on a container 1; and temperature controllers 405 and 450, each of which is an example of a temperature controller configured to heat or cool the container 1 before or after forming the information including numbers, letters, images, and the like on the container 1. The information forming unit may be disposed in either the pre-filling optical marking step M1 or the post-filling optical marking step M2. The optical marking device 300 is also an example of a pattern forming unit configured to form the pattern 11 on the container 1.

Specifically, the manufacturing system of a container product 7 includes a temperature controller 405 configured to heat the container 1 before forming of information such as numbers, letters, images, or the like on the container 1 by the application of a processing laser beam using the laser head 310. Accordingly, when the laser application energy of the processing laser beam is the same, the absorbance of the processing laser beam on the container 1 is increased. Thus, the inside and the surface of the base material 1a of the container 1 can be sufficiently foamed and opacified, and the visibility of the pattern 11 is improved.

Alternatively, the manufacturing system of a container product 7 includes a temperature controller 405 configured to cool the container 1 before forming of information, such as numbers, letters, images, or the like, on the container 1 by the application of a processing laser beam using the laser head 310. This system can reduce the effect of HAZ upon application of the processing laser beam 20, and the visibility of the pattern 11 is improved by ablation. Further, this system can prevent the growth of foam inside and on the surface of the base material 1a of the container 1 from becoming excessive, and make the inside and the surface of the base material 1a opacified with fine foaming. As a result, the visibility of the pattern 11 is improved.

The manufacturing system of the container product 7 includes a temperature controller 450 configured to cool the container 1 after forming information such as numbers, letters, and images on the container 1 by the processing laser beam 20. This prevents the growth of foam inside and on the surface of the base material 1a of the container 1 from becoming excessive, and makes the inside and the surface of the base material 1a opacified with fine foaming. As a result, the visibility of the pattern 11 is improved.

A manufacturing system according to an embodiment of the present invention is a system for manufacturing a container product 7 composed of a container 1 filled with contents 9. The manufacturing system includes an optical marking device 300, which is an example of an information forming unit configured to form information such as numbers, letters, images, and the like in a container 1; and a filler configured to fill a container 1 with contents 9 in a filling step A6, wherein the filler is disposed downstream of an optical marking device 300 in a pre-filling optical marking step M1.

A manufacturing system according to an embodiment of the present invention is a system for manufacturing a container product 7 composed of a container 1 filled with contents 9. The manufacturing system includes an optical marking device 300, which is an example of an information forming unit configured to form information such as numbers, letters, images, and the like on a container 1;

a filler configured to fill the container 1 with contents 9 in a filling step A6; and a sealer configured to seal the container 1 filled with the contents 9 in a sealing step A7, wherein the filler is disposed upstream of the sealer and downstream of an optical marking device 300 in a pre-filling optical marking step M1.

A manufacturing system according to an embodiment of the present invention is a system for manufacturing a container product 7 composed of a container 1 filled with contents 9. The manufacturing system includes an optical marking device 300 as an example of an information forming unit configured to form information such as numbers, letters, images, and the like on a container 1 in a pre-filling optical marking step M1;

a cleaning unit configured to clean the container 1 in a cleaning step A5; and a filler configured to fill the container 1 with contents 9 in a filling step A6, wherein the optical marking device 300 is provided upstream of the cleaning unit.

A manufacturing system according to an embodiment of the present invention is a system for manufacturing a container product 7 composed of a container 1 filled with contents 9. The manufacturing system includes a filler configured to fill the container 1 with the contents 9 in step A6; and an optical marking device 300, which is an example of an information forming unit configured to form information about the container 1, such as numbers, letters, images, and the like in a post-filling optical marking step M2 after filling step A6, wherein the optical marking device 300 is disposed downstream of the filler.

A manufacturing system according to an embodiment of the present invention is a system for manufacturing a container product 7 composed of a container 1 filled with contents 9. The manufacturing system includes
- a first information forming unit configured to form information including numbers, letters, images, and the like, on a container 1;
- a second information forming unit configured to form information including numbers, letters, images, and the like, on a container 1; and
- a filler configured to fill the container 1 with contents 9 in a filling step A6, wherein the filler is disposed downstream of the first information forming unit and is disposed upstream of the second information forming unit. The optical marking device 300 in the pre-filling optical marking step M1 is an example of the first information forming unit, and the optical marking device 300 in the post-filling optical marking step M2 is an example of the second information forming unit.

A manufacturing system according to an embodiment of the present invention is a system for manufacturing a container product 7 composed of a container 1 filled with contents 9. The manufacturing system includes
- a first information forming unit configured to form information such as numbers, letters, images, and the like on a container 1;
- a filler configured to fill the container 1 with contents 9 in a filling step A6; and
- a second information forming unit disposed downstream of the filler and configured to form information such as manufacturing date and time, best-before date, and the like on the container 1.

The optical marking device 300 in the pre-filling optical marking step M1 is an example of the first information forming unit, and the optical marking device 300 in the post-filling optical marking step M2 is an example of the second information forming unit.

Effects of the Invention

According to embodiments of the present invention, the visibility or the viewability of information formed on the container is improved.

What is claimed is:

1. A method for manufacturing a container, the method comprising:
   filling the container with contents; and
   forming information on the container which is filled with the contents,
   wherein the forming is performed on a surface of the container by applying a laser beam so as to integrally form a second pattern on the surface, a collection of the second patterns forming a first pattern representing the information including at least one of a number, a letter, and an image,
   wherein the information to be formed on the container is formed by:
   obtaining a name of a parameter file by reading a correspondence table which includes multiple parameter file names,
   reading the parameter file, and
   forming the information on the container in correspondence with processing parameters which are included in the parameter file,
   wherein the processing parameters included within the parameter file include:
   a type of the second pattern,
   a periodicity,
   an interval,
   a thickness, and
   a processing depth.

2. The method according to claim 1, further comprising:
   sealing the container filled with the contents.

3. The method according to claim 2, further comprising:
   cleaning the container,
   wherein the filling is performed after the cleaning and before the sealing.

4. The method according to claim 1, wherein the forming further comprises:
   forming first information on the container, the first information including at least one of the number, the letter, and the image; and
   forming second information on the container, the second information including manufacturing date, manufacturing time, and best-before date.

5. The method according to claim 1, wherein:
   the filling is performed by filling the contents which have a temperature of 20 degrees C., or less.

6. The method according to claim 1, wherein the obtaining the name of the parameter file includes:
   obtaining the name of the parameter file by determining the parameter file name which corresponds to identification information.

7. The method according to claim 6, wherein the processing parameters included within the parameter file include:
   a processing width, and
   a processing thickness.

8. The method according to claim 1, wherein:
   the correspondence table includes the multiple parameter file names which correspond to different types of the information to be formed.

9. The method according to claim 8, wherein:
   the different types of patterns to be formed include a letter type, a barcode type, a QR code type, and a photo type.

10. The method according to claim 1, further comprising:
    cooling the container after the information is formed on the container.

11. The method according to claim 1, further comprising:
    cooling the container, after the filling and before the forming, using a multi-stage cooling method including at least four stages of cooling.

12. The method according to claim 1, wherein the processing parameters included within the parameter file include:
    density information.

13. A manufacturing system, comprising:
    a filler to fill a container with contents; and
    information forming circuitry configured to form information on the container which is filled with the contents,
    wherein the information forming circuitry is configured to perform the forming on a surface of the container by applying a laser beam so as to integrally form a second pattern on the surface, a collection of the second patterns forming a first pattern representing the information including at least one of a number, a letter, and an image, wherein the information forming circuitry generates the information to be formed on the container by:
obtaining a name of a parameter file by reading a correspondence table which includes multiple parameter file names,
reading the parameter file, and
forming the information on the container in correspondence with processing parameters which are included in the parameter file,
wherein the processing parameters included within the parameter file include:
a type of the second pattern,
a periodicity,
an interval,
a thickness, and
a processing depth.

14. The manufacturing system according to claim 13, further comprising:
a sealer to seal the container which is filled with the contents.

15. The manufacturing system according to claim 14, further comprising:
a cleaner to clean the container,
wherein the filler operates to fill the container after the cleaner performs the cleaning and before the sealer performs the sealing.

16. The manufacturing system according to claim 13, wherein the information forming circuitry is further configured to:
form first information on the container, the first information including at least one of the number, the letter, and the image; and
form second information on the container, the second information including manufacturing date, manufacturing time, and best-before date.

17. The manufacturing system according to claim 13, wherein the obtaining the name of the parameter file includes:
obtaining the name of the parameter file by determining the parameter file name which corresponds to identification information.

18. The manufacturing system according to claim 13, wherein:
the correspondence table includes the multiple parameter file names which correspond to different types of the information to be formed.

19. The manufacturing system according to claim 13, further comprising:
a cooler to cool the container after the information is formed on the container.

20. The manufacturing system according to claim 13, further comprising:
a cooler to cool the container, after the filling and before the forming, using a multi-stage cooler including at least four stages of cooling.

21. The manufacturing system according to claim 13, wherein the processing parameters included within the parameter file include:
density information.

* * * * *